(12) United States Patent
Takayama et al.

(10) Patent No.: US 7,865,431 B2
(45) Date of Patent: Jan. 4, 2011

(54) PRIVATE ELECTRONIC VALUE BANK SYSTEM

(75) Inventors: Hisashi Takayama, Tokyo (JP); Kyoko Kawaguchi, Tokyo (JP); Takao Isogawa, Sagamihara (JP)

(73) Assignee: Panasonic Corporation, Kadoma-shi (JP)

( * ) Notice: Subject to any disclaimer, the term of this patent is extended or adjusted under 35 U.S.C. 154(b) by 1657 days.

(21) Appl. No.: 10/416,065

(22) PCT Filed: Nov. 7, 2001

(86) PCT No.: PCT/JP01/09740

§ 371 (c)(1),
(2), (4) Date: May 7, 2003

(87) PCT Pub. No.: WO02/39342

PCT Pub. Date: May 16, 2002

(65) Prior Publication Data

US 2004/0103063 A1    May 27, 2004

(30) Foreign Application Priority Data

Nov. 8, 2000    (JP) .............................. 2000-341062

(51) Int. Cl.
*G06Q 40/00* (2006.01)
(52) U.S. Cl. ......................................... 705/39; 705/35
(58) Field of Classification Search .................. 705/35, 705/39

See application file for complete search history.

(56) References Cited

U.S. PATENT DOCUMENTS

| | | | |
|---|---|---|---|
| 5,590,197 A | 12/1996 | Chen et al. | |
| 5,909,485 A | 6/1999 | Martin et al. | |
| 6,101,378 A | 8/2000 | Barabash et al. | |
| 6,105,008 A | * | 8/2000 | Davis et al. ................... 705/41 |

(Continued)

FOREIGN PATENT DOCUMENTS

AU    199869230 B2    10/1998

(Continued)

OTHER PUBLICATIONS

A future without cash is in the cards; [Final Edition] Alison MacGregor. The Gazette. Montreal, Que.: Jul 26, 1999. p. A.1.FRO.*

(Continued)

*Primary Examiner*—Lalita M Hamilton
(74) *Attorney, Agent, or Firm*—Day Pitney LLP

(57) ABSTRACT

To make an electronic value usable for both service on a network and service in the real world while ensuring security, convenience and economical efficiency, the electronic value issued for a user is controlled on an electronic wallet of a private electronic value bank, the electronic value controlled on the electronic wallet of a bank is cached in a mobile electronic wallet on a smart card of a user's portable terminal 5, and the electronic wallet is linked such that it is operated via the network when the mobile electronic wallet is operated. When the electronic value on the smart card is used for the service provided in a real environment such as a ticket gate of a train station, on-line transaction does not occur every time it is used, but the electronic wallet of the bank is updated when the portable terminal and the bank communicate later.

11 Claims, 86 Drawing Sheets

U.S. PATENT DOCUMENTS 6,112,984 A 9/2000 Snavely

FOREIGN PATENT DOCUMENTS

| EP | 0 794 651 A1 | 9/1997 |
|---|---|---|
| FR | 2761840 | 10/1998 |
| FR | 2 776 454 | 9/1999 |
| JP | 10-162088 A | 6/1998 |
| JP | 2000-067140 A | 3/2000 |
| WO | WO 97/45814 | 12/1997 |
| WO | WO 98/34393 | 8/1998 |
| WO | WO 98/42173 | 10/1998 |
| WO | WO 99/04548 | 1/1999 |
| WO | WO 99/24891 | 5/1999 |
| WO | WO 99/24892 | 5/1999 |

OTHER PUBLICATIONS

Four-Way Easy Card to Be Tested in L.A. Pilot Program As Method of Utility-Bill Cash Payment by Nonbanking Consumers Using Self-Service Terminals Business Editors. Business Wire. New York: Nov 5, 1998. p. 1.*

* cited by examiner

PRIVATE ELECTRONIC VALUE BANK SYSTEM

TECHNICAL FIELD

The present invention relates to a private electronic value bank system, a portable terminal, a smart card, an electronic wallet and a private electronic value bank, which are designed for a user to use tickets, money, prepaid money, coupons, credit cards, royalty points and membership cards, which have been transformed into electronic information, and furthermore, not limited to the electronic tickets and the electronic money but electronic values including various kinds of information (music, images, movies, software programs, rights, and the like, for example) owned by individuals on a network.

BACKGROUND ART

FIG. 6 shows a conventional prior art system that downloads the electronic value to a user's portable terminal (built-in memory) and controls it, and the system is constituted that an electronic value issuing server 2, a service server 3, and a user's portable terminal 5 are connected via a network 1. The service server 3 is on the network 1 and provides service via the network 1 corresponding to the electronic value used by the user, and a service terminal 4 on a site where the service is actually provided and provides the service corresponding to the electronic value used by the user, which is a POS terminal, an automatic vending machine, an automatic ticket gate, or the like, for example.

In the prior art system shown in FIG. 6, ①② show the procedure to obtain the electronic value, ③④ show the use procedure of the electronic value for the service server 3, and ⑤⑥ show the use procedure of the electronic value for the service terminal 4. Specifically, ① when the portable terminal 5 requests the electronic value issuing server 2 to issue (purchase) the electronic value, ② the electronic value issuing server 2 issues (downloads) the electronic value for the portable terminal 5 in response.

③ When the portable terminal 5 purchases the service from the service server 3 using the electronic value, ④ the service server 3 provides the service for the portable terminal 5 in response.

⑤ Further, when the portable terminal 5 purchases the service from the service terminal 4 using the electronic value, ⑥ the service terminal 4 provides the service for the portable terminal 5 in response.

FIG. 7 shows another prior art system that controls the electronic value on a server, and the system is configured so that the electronic value issuing server 2, the service server 3, the user's portable terminal 5, and an electronic wallet server 6 that controls the electronic value are connected via the network 1.

In the system shown in FIG. 7, ①② show the procedure to obtain the electronic value, ③④⑤ show the procedure to use the electronic value by the service server 3, and ⑥⑦⑧ show the procedure to use the electronic value by the service terminal 4. Specifically, ① when the portable terminal 5 requests the electronic value issuing server 2 to issue the electronic value, ② the electronic value issuing server 2 transfers the electronic value to the electronic wallet server 6 in response.

③ When the portable terminal 5 instructs the electronic wallet server 6 to use the electronic value in order to purchase the service from the service server 3, ④ the electronic wallet server 6 uses the electronic value for the service server 3 in response, and then, ⑤ the service server 3 provides the service for the portable terminal 5 in response.

⑥ Further, when the portable terminal 5 instructs the electronic wallet server 6 to use the electronic value in order to purchase the service from the service terminal 4, ⑦ the electronic wallet server 6 uses the electronic value for the service terminal 4 in response, and then, ⑧ the service terminal 4 provides the service for the portable terminal 5 in response.

However, in the system that downloads the electronic value to the user's portable terminal 5 (built-in memory) and controls it as shown in FIG. 6, there is a security deficiency because the user loses the electronic value as well when he/she loses or damages the portable terminal 5.

On the other hand, in the system that controls the electronic value on the server (electronic wallet server 6) as shown in FIG. 7, the above-described security problem can be solved. However, when the electronic value is used for the service provided in a real environment such as a ticket gate of a train station, an on-line transaction occurs every time the value is used, and there is a deficiency in the communication cost and the processing speed.

The object of the present invention, in view of the deficiencies in the above-described conventional examples, is to provide the private electronic value bank system, the portable terminal, the smart card, the electronic wallet and the private electronic value bank, which are capable of using the electronic value for both the service on the network and the service in the real world while ensuring security and economical efficiency.

DISCLOSURE OF THE INVENTION

In order to achieve the above-described object, the private electronic value bank system of the present invention comprises the private electronic value bank having a first electronic wallet for controlling the electronic value issued in response to a user's request and the portable terminal having a second electronic wallet where at least one or more electronic value values out of the electronic values base controlled on the first electronic walled are controlled, in which the system is configured that the wallets are linked such that the first electronic wallet is operated via the network when the second electronic wallet is operated.

Since the user's electronic value is controlled by the private electronic value bank with the above-described configuration, in the case where the user uses the electronic value to purchase the service in the real world, he/she uses the electronic value controlled on the second electronic wallet, and the electronic values on the first and second electronic wallets are associated by the updates when the private electronic value bank and the portable terminal communicate afterwards, and thereby he/she can use the electronic value to purchase both the service on the network and the service in the real world while ensuring security and economical efficiency.

The private electronic value bank system of the present invention is characterized in that authentication is mutually performed between the first and second electronic wallets when the electronic value controlled on the first electronic wallet is operated.

With the above-described configuration, it is possible to match the value controlled on the user's portable terminal and the electronic value controlled on the private electronic value bank, and unauthorized use can be prevented.

The private electronic value bank system of the present invention is also characterized in that the electronic value controlled on the first electronic wallet is used via the network and the electronic value controlled on the second electronic wallet is updated via the network when the user uses the electronic value for the service on the network.

With the above-described constitution, the user can use the electronic value for the service on the network while ensuring security and economical efficiency.

The private electronic value bank system of the present invention is also characterized in that, in the case where the user uses the electronic value to purchase the service in the real world, he/she uses the electronic value controlled on the second electronic wallet, and the electronic values on the first and second electronic wallets are associated by updates when the private electronic value bank and the portable terminal communicate afterwards.

With the above-described constitution, the user can use the electronic value to purchase the service in the real world while ensuring security and economical efficiency.

The private electronic value bank system of the present invention further comprises the electronic value issuing server that issues the electronic value in response to the user's request and transfers it to the private electronic value bank, and is characterized in that the private electronic value bank does not issue the electronic value but only controls the electronic value.

With the above-described constitution, the invention can be applied to various types of business since the electronic value issuing server and the private electronic value bank are independent.

The private electronic value bank system of the present invention also comprises the private electronic value bank having the first electronic wallet that controls the electronic value, the electronic value issuing server that issues the electronic value in response to a request, and the portable terminal having the second electronic wallet that corresponds one-to-one to the first electronic wallet, and configuration is made such that the electronic value that the electronic value issuing server has generated is transmitted to the first electronic wallet for an issue request to the electronic value, which the second electronic wallet generates, the first electronic wallet receives the electronic value from the electronic value issuing server, and controls it.

With the above-described configuration, security in issuing the electronic value via the network and control of the electronic value can be improved.

The private electronic value bank system of the present invention is also characterized in that when the user purchases the electronic values from the electronic value issuing server, settlement of payment for the price is performed between the private electronic value bank and the electronic value issuing server.

With the above-described configuration, security in issuing the electronic values via the network and its settlement can be improved.

The private electronic value bank system of the present invention is also characterized in that the portable terminal transmits an electronic value issue request message including issue instruction information and purchase instruction information, which has been cryptographically enveloped as an electronic document to be transmitted to the first electronic wallet of the private electronic value bank, to the electronic value issuing server in order for the user to purchase from the electronic value issuing server, the electronic value issuing server selects the purchase instruction information that has been transferred as a cryptographically enveloped electronic document and transmits it to the private electronic value bank, the private electronic value bank opens and verifies the purchase instruction information that has been cryptographically enveloped as an electronic document and performs settlement of payment for the price of the electronic value with the electronic value issuing server when the purchase instruction information is correct, the electronic value issuing server issues the electronic value to the private electronic value bank, and the content of the second electronic wallet is updated based on the content of the first electronic wallet corresponding to the issued electronic value.

With the above-described configuration, security in issuing the electronic value via the network and its settlement can be improved.

BEST MODE FOR CARRYING OUT THE INVENTION

First Embodiment

Figure 1:
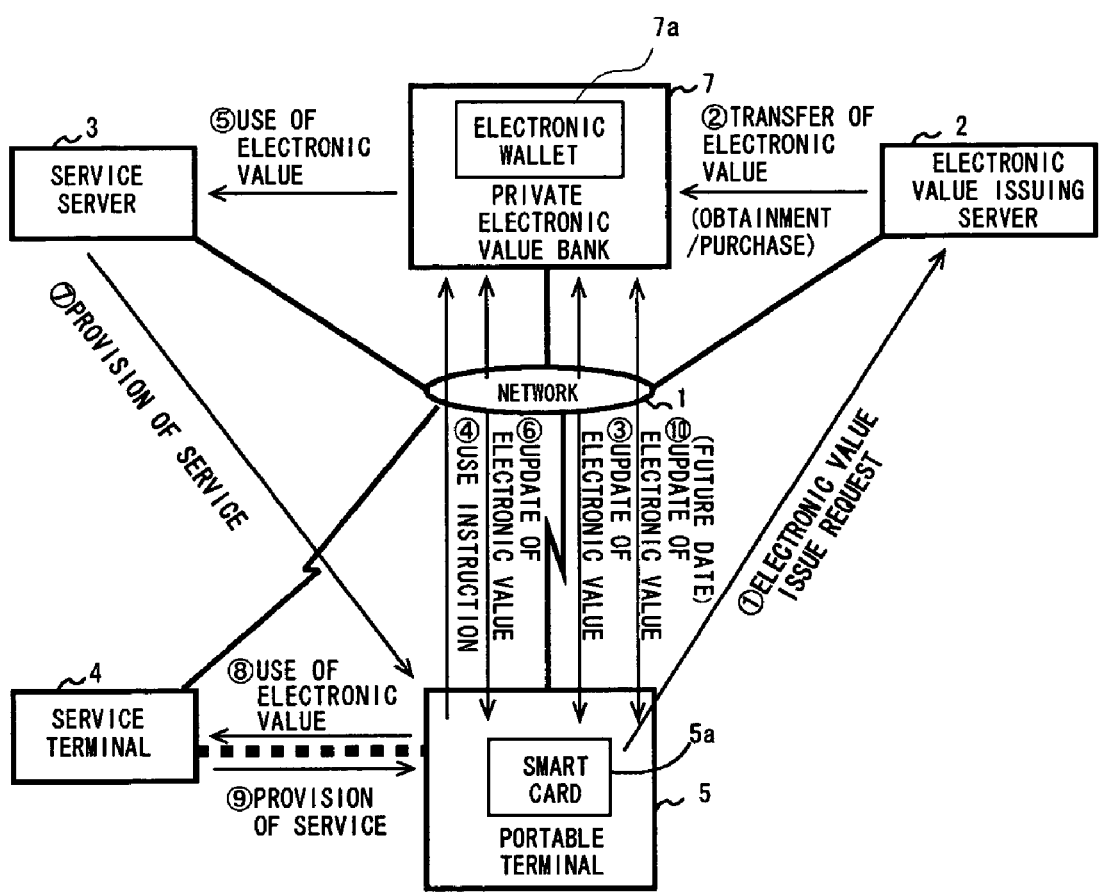
FIG. 1 is a block diagram showing an embodiment of the private electronic value bank system according to the present invention.
Figure 2:
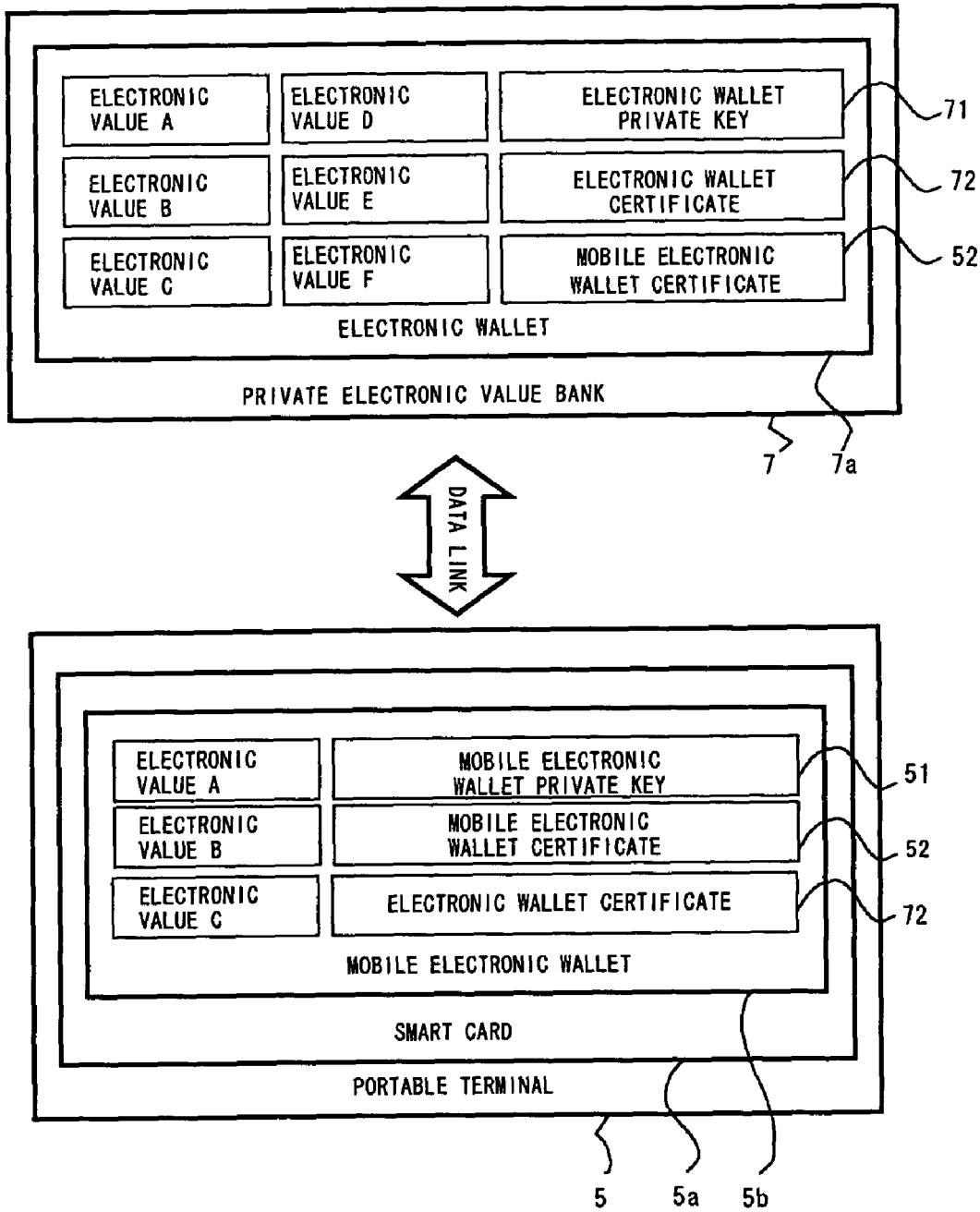
FIG. 2 is an exemplary view showing an example of the configuration and the corresponding relationship between the electronic wallet and a mobile electronic wallet of FIG. 1.
Figure 3:
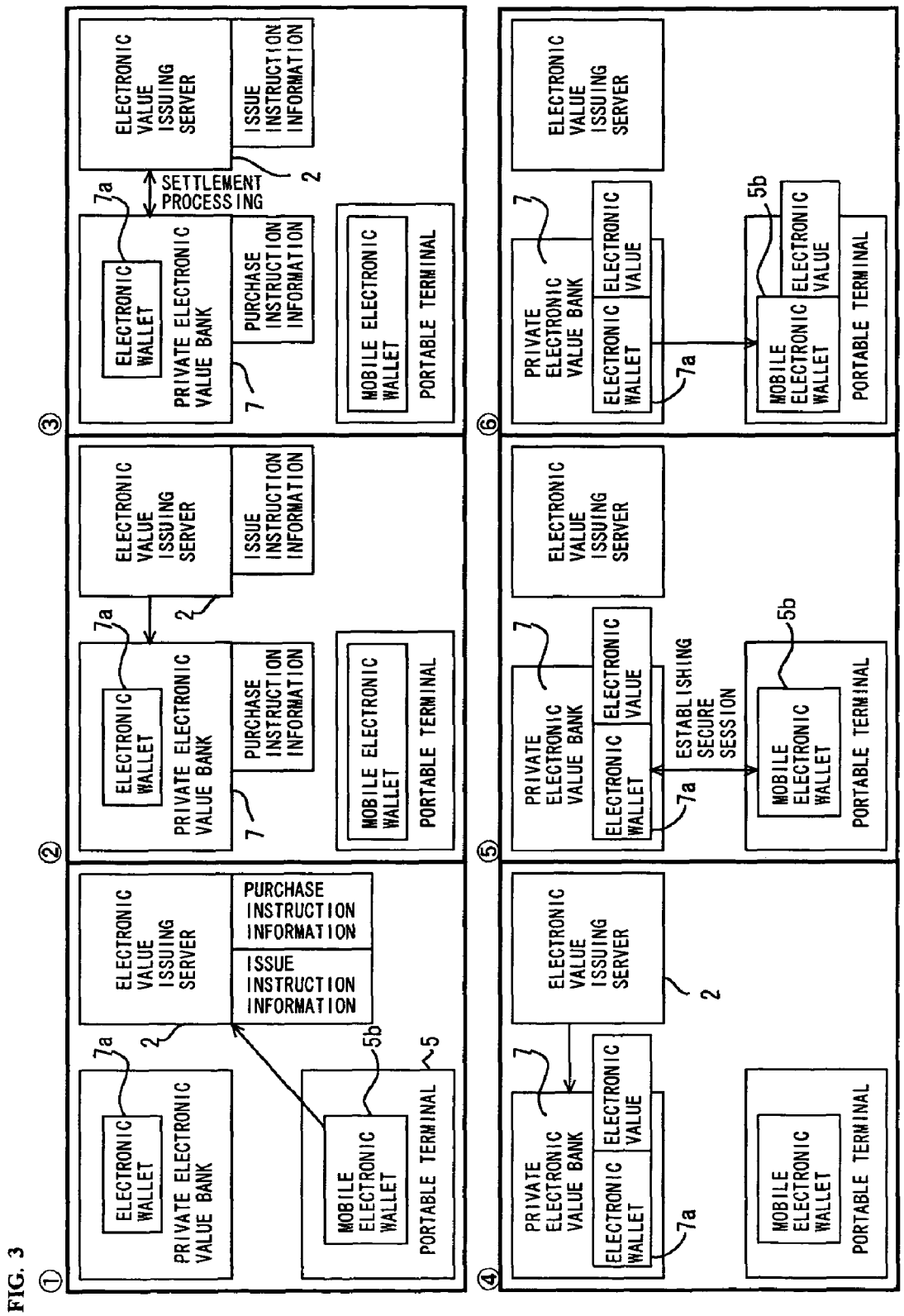
FIG. 3 is an exemplary view showing an electronic value purchasing procedure of FIG. 1 in detail.
Figure 4:
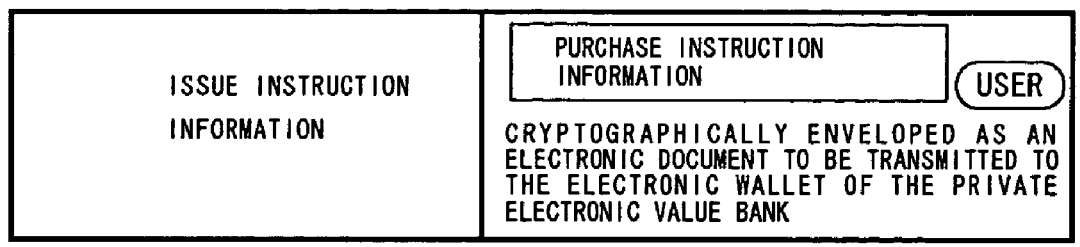
FIG. 4 is an exemplary view showing a data structure of an electronic value issue request message.
Figure 5:
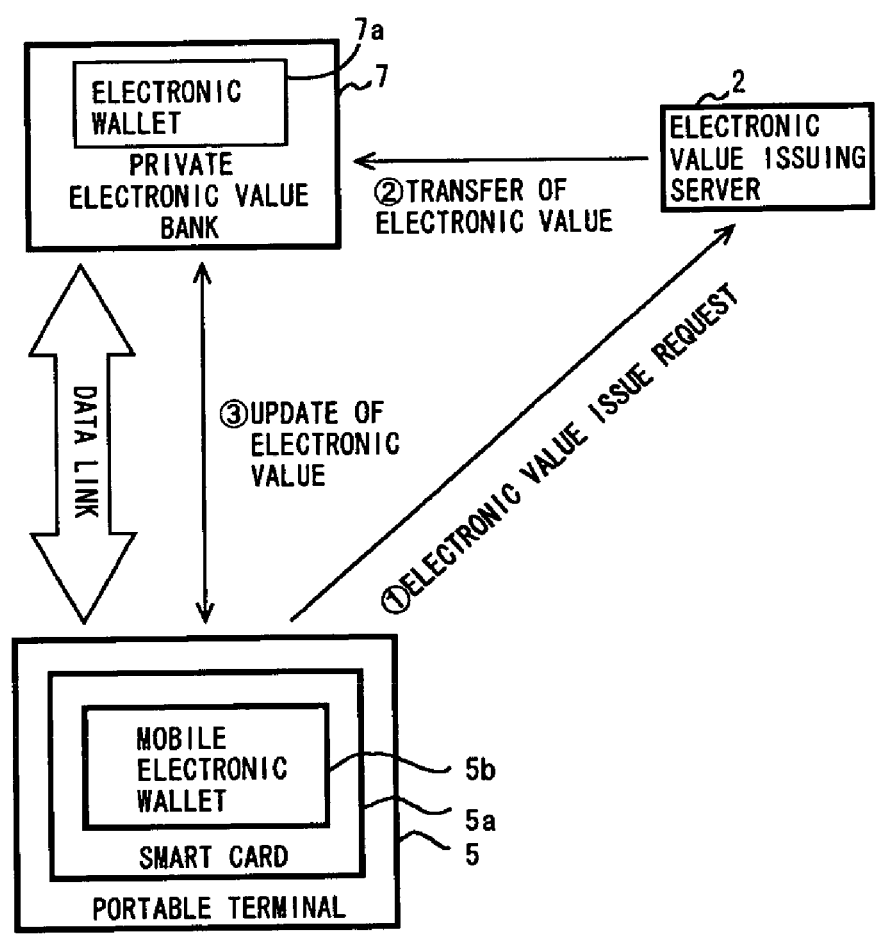
FIG. 5 is a view for explaining the timing of an electronic value purchase processing.
Figure 6:
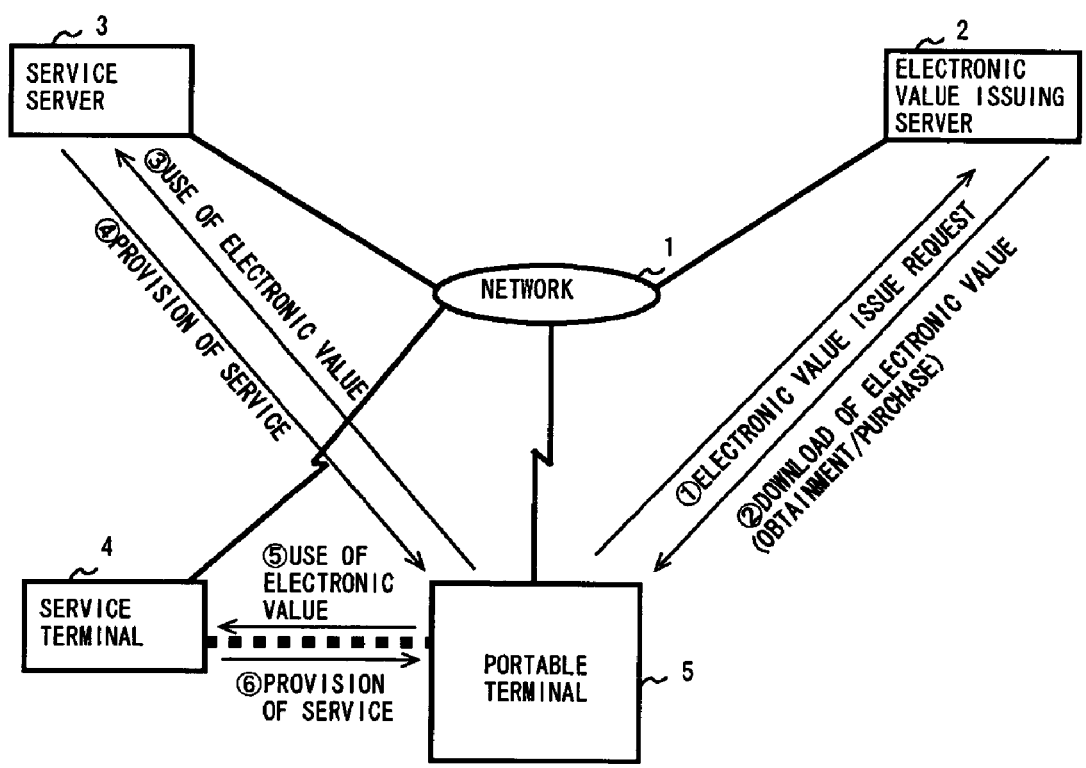
FIG. 6 is a block diagram showing a prior art private electronic value bank system.
Figure 7:
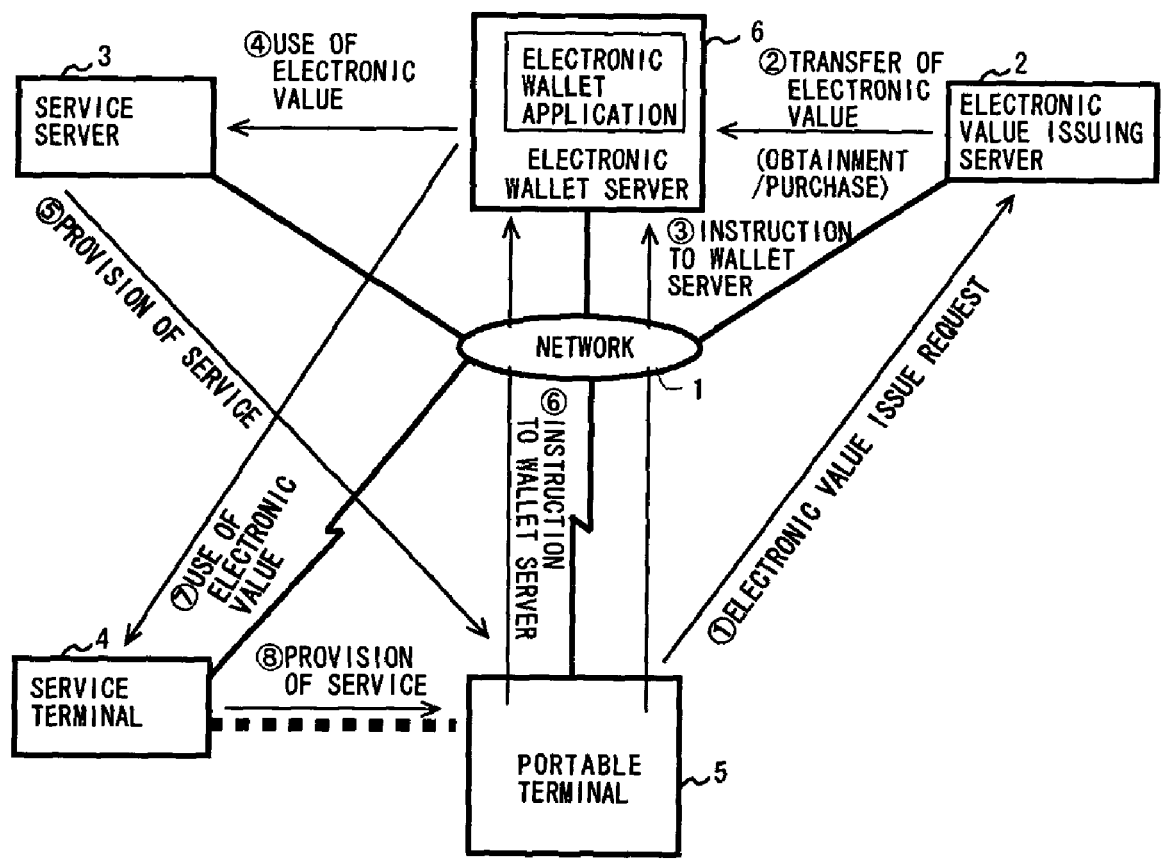
FIG. 7 is a block diagram showing another prior art private electronic value bank system.

Referring to the drawings, the embodiments of the present invention will be described as follows. FIG. 1 is the block diagram showing an embodiment of the private electronic value bank system according to the present invention, FIG. 2 is the exemplary view showing an example of the configuration and the corresponding relationship between the electronic wallet and the mobile electronic wallet of FIG. 1, FIG. 3 is the exemplary view showing the electronic value purchasing procedure of FIG. 1 in detail, FIG. 4 is the exemplary view showing the data structure of the electronic value issue request message, and FIG. 5 is the view for explaining the timing of the electronic value purchase processing.

The system shown in FIG. 1 is configured by connecting the electronic value issuing server 2, the service server 3, the user's portable terminal 5 and a private electronic value bank (hereinafter, also simply referred to as a bank) 7 via the network 1. The portable terminal 5 includes public wireless communication means such as a cell phone and local wireless communication means such as Bluetooth and infrared rays, communicates with the electronic value issuing server 2, the service server 3 and the bank 7 using the public wireless communication means, and communicates with the service terminal 4 using the local wireless communication means.

The bank 7 has an electronic wallet 7a (application) that controls the electronic value that the user (customer) has, and the electronic wallet exists for each user. On the other hand, (that is, how much money has been credited to the account, or, alternatively how much credit is available) the portable terminal 5 has a freely detachable smart card (this may be a smart card module such as a USIM: Universal Subscriber Identity Module) 5a having a processing system such as a memory and a CPU, and a mobile electronic wallet 5b (FIG. 2) as an application is installed in the smart card 5a. The mobile electronic wallet 5b corresponds one-to-one to one electronic wallet 7a in the electronic wallet on the bank 7, and the electronic value controlled on the electronic wallet 7a is cached in the mobile electronic wallet 5b. An owner of the electronic value that the mobile electronic wallet 5b caches, that is, the user (customer) of the bank 7 owns the smart card 5a to which the mobile electronic wallet 5b has been installed, and uses it by attaching to the portable terminal 5. Personal authentication information (PIN (Personal Identity Number), for example) is controlled in the mobile electronic wallet 5b (not shown in FIG. 2), and the mobile electronic wallet 5b authenticates the user by using the personal authentication information when the user operates the mobile electronic wallet 5b (it verifies the PIN that the user inputs, for example).

An electronic credit card or a debit card as one type of the electronic value is controlled in the electronic wallet 7a of the bank 7, and the card information is used for settlement of the price when purchasing the electronic value from the electronic value issuing server 2. Further, in the mobile electronic wallet 5b of the portable terminal 5, an electronic wallet certificate 72 that is a digital certificate of the electronic wallet 7a in a corresponding bank 7, a mobile electronic wallet private key 51 that is a private key unique to the mobile electronic wallet 5b and the digital certificate thereof, and a mobile electronic wallet certificate 52 are controlled. On the other hand, the mobile electronic wallet certificate 52 that is the digital certificate of the mobile electronic wallet 5b, an electronic wallet private key 71 that is a private key unique to the electronic wallet 7a and the digital certificate thereof, and the electronic wallet certificate 72 are controlled in the electronic wallet 7a of the bank 7 corresponding to the mobile electronic wallet 5b. In the case of communication between the mobile electronic wallet 5b of the portable terminal 5 and the electronic wallet 7a of the bank 7, mutual authentication is performed using the private keys and certificates, session keys are exchanged, and a secure session is always established.

The user, using the portable terminal 5 attached with the smart card 5a, can operate the electronic value cached in the mobile electronic wallet 5b and the electronic value controlled in the electronic wallet 7a of the bank 7. In such a case, authentication is always necessary by the mobile electronic wallet 5b of the private terminal that the user owns. In this system, in the case of obtaining/purchasing the electronic value from the electronic value issuing server 2, the mobile electronic wallet 5b generates the issue request for the electronic value first and transmits it to the electronic value issuing server 2, the electronic value that the electronic value issuing server 2 has issued based on the issue request for the electronic value is transmitted to the electronic wallet 7a of the bank 7, and then, cached from the electronic wallet 7a to the mobile electronic wallet 5b of the portable terminal 5. Specifically, all the electronic values issued are controlled in the electronic wallet 7a of the bank 7, and the electronic value that is likely to be used is controlled in the mobile electronic wallet 5b as well.

Furthermore, in the case of using the electronic value for the service (on-line shopping, on-line live transmission, or the like) that the service server 3 provides, the mobile electronic wallet 5b generates a use instruction for the electronic value first, transmits it to the electronic wallet 7a of the bank 7, the electronic value that the electronic wallet 7a controls is used for the service server 3, and the service server 3 provides the service. At this point, the electronic value cached in the mobile electronic wallet 5b is updated as well.

Further, in the case of using the electronic value for the service (payment of the price for a POS terminal, automatic ticket examiner, or the like) that the service terminal 4 provides, the electronic value cached in the mobile electronic wallet 5b is used for the service terminal 4, and the service terminal 4 provides the service. Since the electronic value cached in the mobile electronic wallet 5b is used, processing to use the electronic value can be performed at a high-speed. Update of the electronic value controlled in the electronic wallet 7a is performed when the electronic wallet 7a and the mobile electronic wallet 5b communicate afterwards. Therefore, on-line transaction does not occur every time when the electronic value is used. However, in the case where the electronic value to be used is not cached in the mobile electronic wallet 5b, it communicates with the electronic wallet 7a to cache the electronic value to be used, and uses it.

Further, the service server 3 and the service terminal 4 regularly transmit use history information of the electronic value to the bank 7. The electronic wallet 7a of the bank 7 verifies consistency between the electronic value controlled and its use history information.

Still further, all the electronic values that the user owns are controlled in the electronic wallet 7a of the bank 7, so that when the user loses or damages the smart card 5a to which the mobile electronic wallet 5b has been installed, the bank 7 performs strict user authentication to restore the electronic value based on the electronic value controlled in the electronic wallet 7a and the use history information of the electronic value.

FIG. 2 shows an example of the configuration and the corresponding relationship between the electronic wallet 7a and the mobile electronic wallet 5b of FIG. 1. A plurality of electronic values (A to F) that the user owns are controlled in the electronic wallet 7a on the private electronic value bank 7. In the mobile electronic wallet 5b that corresponds one-to-one to the electronic wallet 7a, a few electronic values (A to C) (cache of electronic value) out of the electronic values (A to F) controlled in the electronic wallet 7a are controlled (when the mobile electronic wallet 5b has enough capacity, all of the electronic values (A to F) controlled in the electronic wallet 7a may be controlled). Each of the electronic values (A to F) includes actual electronic value data and identification information to specify the data (electronic value identification information: URL or URI of the electronic value, for example). Then, in the case where the electronic values D cached in the mobile electronic wallet 5b, for example, which is not cached from the electronic wallet 7a to the mobile electronic wallet 5b in FIG. 2, the electronic value D is specified by the above-described electronic value identification information after mutual authentication is performed between the electronic wallet 7a and the mobile electronic wallet 5b.

In FIG. 1, ① to ③ show the procedure for obtaining the electronic value from the electronic value issuing server 2, ④ to ⑦ show the usage procedure of the electronic value for the service server 3, and ⑧ to ⑩ show the usage procedure of the electronic value for the service terminal 4. Specifically, ① when the portable terminal 5 requests the electronic value issuing server 2 to issue the electronic value (typically a credit to increase the amount of purchasing available), ② the electronic value issuing server 2 transfers the electronic value to the bank 7 in response, then ③ the bank 7 and the portable terminal 5 intercommunicate to update the electronic value on the electronic wallet 7a and the mobile electronic wallet 5b.

④ When the portable terminal 5 instructs the bank 7 to use the electronic value in order to purchase the service from the service server 3, ⑤ the bank 7 uses the electronic value for the service server 3 in response, and ⑥ the bank 7 and the portable terminal 5 intercommunicate to update the electronic value on the electronic wallet 7a and the mobile electronic wallet 5b, and further, ⑦ the service server 3 provides the service for the portable terminal 5.

⑧ Furthermore, when the portable terminal 5 uses the electronic value for the service terminal 4 in order to purchase the service from the service terminal 4, ⑨ the service terminal 4 provides the service for the portable terminal 5 in response.

⑩ Then, when the bank 7 and the portable terminal 5 communicate afterwards, the electronic value on the electronic wallet 7a and the mobile electronic wallet 5b are updated.

FIG. 3 shows the obtaining procedure (purchasing procedure) of the electronic value in ① to ③ described above in detail. FIG. 4 shows the data structure of the electronic value issue request message sent from the portable terminal 5 to the electronic value issuing server 2 in ① of FIG. 3, and the message includes the issue instruction information and the purchase instruction information. The issue instruction information is information to instruct the electronic value issuing server 2 to perform settlement processing of the price of the electronic value with the electronic wallet 7a of the bank 7 and to issue the electronic value for the electronic wallet 7a of the bank 7, and the following information is included in detail.

- electronic value to be issued
- settlement method of the price and settlement amount
- URL or URI of the electronic wallet that performs settlement processing for the price
- URL or URI of the electronic wallet that delivers the electronic value
- session number Note that the URLs or URIs of the electronic wallet that performs settlement processing for the price and the electronic wallet that delivers the electronic value are generally the same. In addition, a case where they are different may be written.

The purchase instruction information is information to instruct purchase processing of the electronic value for the electronic wallet 7a of the bank 7 (settlement of the price and obtaining the electronic value), where a user's electronic signature has been signed by the mobile electronic wallet 5b, and the information is further cryptographically enveloped as an electronic document to be transmitted to the electronic wallet 7a of the bank 7. The electronic value issuing server 2 transmits the purchase instruction information to the electronic wallet 7a of the bank 7, and the electronic wallet 7a of the bank 7 performs purchase processing (settlement of the price and obtainment of the electronic value) with the electronic value issuing server based on the received purchase instruction information.

Specifically, the content of the purchase instruction information is unknown to the electronic value issuing server 2. The purchase instruction information includes the following information.

- the price of the goods or services to be purchased
- settlement method of the price and settlement amount
- URL or URI of the electronic value issuing server (merchant)
- session number Then, the electronic value issuing server 2 and the electronic wallet of the private electronic value bank 7, based on the issue instruction information and the purchase instruction information respectively, perform settlement of the price for the electronic value and delivery with each other. Accordingly, it is not necessary to install various kinds of programs for settlement processing of price in the portable terminal 5. In addition, the electronic value is controlled in the electronic value issuing server 2 simultaneously with its purchase, and there is no possibility of losing the value.

The purchase processing shown in FIG. 3 is shown in detail as follows.

① The portable terminal 5 generates the electronic value issue request and transmits it to the electronic value issuing server 2. The mobile electronic wallet 5b signs an electronic signature on the purchase instruction information and transfers it as an electronic document to the electronic wallet 7a.

② The electronic value issuing server 2 interprets the issue instruction information in the received electronic value issue request, and transmits the purchase instruction information to the electronic wallet 7a of a specified private electronic value bank 7 based on the issue instruction information.

③ The electronic wallet 7a of the private electronic value bank 7 opens the received electronic document of the purchase instruction information and verifies the signature. When the signature is correct, the wallet performs settlement processing for the price of the electronic value with the electronic value issuing server 2 based on the purchase instruction information as well.

④ The electronic value issuing server 2 generates the electronic value, and transmits it to the electronic wallet 7a of the private electronic value bank 7.

⑤ The electronic wallet 7a of the private electronic value bank 7 and the mobile electronic wallet 5b exchange the session keys to establish the secure session.

⑥ The content of the mobile electronic wallet 5b is updated based on the content of the electronic wallet 7a of the private electronic value bank 7.

Specifically, the purchase instruction information is transmitted to the electronic wallet 7a on the network, which is linked to the mobile electronic wallet 5b via the merchant (electronic value issuing server 2), settlement processing of the price and delivery of merchandise (electronic value) are performed between the merchant 2 and the electronic wallet 7a on the network.

Next, description will be made for the timing of the purchase processing for the electronic value referring to FIG. 5. Timing of the processing for ① electronic value issue request, ② transfer of the electronic value and ③ update of the electronic value in FIG. 5 is determined by:

- content of the electronic value issue request;
- content of the electronic value;
- settings of the electronic wallet; and the like.

The case where the timing is determined by the content of the electronic value issue request:

This is a case where the timing for the processing of ②③ is defined directly or indirectly in the issue instruction information and the purchase instruction information, and the user can specify a time when the electronic value is downloaded to the mobile electronic wallet 5b, for example.

The case where the timing is determined by the content of the electronic value:

This is a case where the timing for the processing of ③ is defined as information included in the electronic value, the issuer of the electronic value can limit a period when the electronic value is controlled in the mobile electronic wallet 5b, for example.

The case where the timing is determined by the settings of the electronic wallet:

This is a case where the timing for the processing of ③ is controlled by the settings of the electronic wallet, and the user can pre-specify a time when the electronic value is downloaded to the mobile electronic wallet 5b according to the type of the electronic value, for example (electronic prepaid money is immediately downloaded but an electronic ticket whose date is in the future will be downloaded when a performance is near, for example).

The following configuration is assumed as an actual implementation configuration of the private electronic value bank system. The user is a customer of the private electronic value bank 7, the private electronic value bank 7 is operated as a bank or another financial institution, a communication business company, another third-party organization, or their joint investment company, and the smart card 5a to which the application of the mobile electronic wallet 5b has been installed is issued from the private electronic value bank 7 to the user. The user, by attaching the issued smart card 5a to the portable terminal 5, is provided with a service, which enables him/her to purchase and control a high-security electronic value and to use the electronic value for a network service and a real service, from the private electronic value bank 7. The private electronic value bank 7, by providing a platform on which the user safely purchases/uses the electronic value for an event company, a ticket issuing company, a retail sales company, a prepaid card issuing company or the like, who operates the electronic value issuing server 2, can gain commission from these corporations. Further, the private electronic value bank 7, by providing opportunities, where they provide the service for the customer using the electronic value, for the corporations who operate the service server 3 and the service terminal 4, can gain commission from the corporations. Furthermore, the private electronic value bank 7 can provide a portal service based on the electronic wallet 7a for the user, and can gain profit from advertisements posted on the portal site. Still further, by anonymously taking statistics for the user's use of the electronic value, it is also possible to sell the statistical information as marketing information to other corporations. Since the private electronic value bank 7 can intensively control value information that the user owns, the bank can use it as a node for various kinds of information services related to the user (customer). Specifically, it can be used for retaining a customer and valueadded service for a customer, for example, in the case of a bank.

Note that the corporations that operate the private electronic value bank 7, the electronic value issuing server 2, the service server 3 and the service terminal 4 do not need to be different corporations, but may be the same corporation in various combinations.

Second Embodiment

Figure 8:
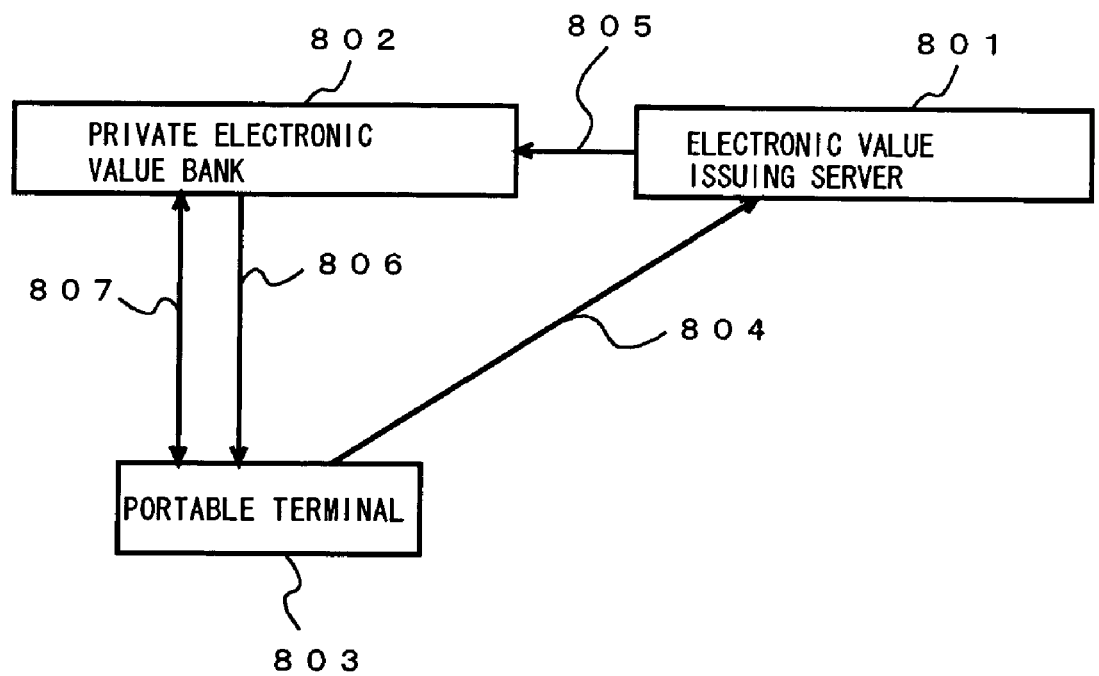
FIG. 8 is a view showing a second embodiment of the private electronic value bank of the present invention.

FIG. 8 is the view showing the constitution of the private electronic value bank system according to the second embodiment of the present invention. In this embodiment, the private electronic value bank system includes an electronic value issuing server 801, a private electronic value bank 802, and a portable terminal 803. In this embodiment, the portable terminal 803 outputs the electronic value issue request to the electronic value issuing server 801 (arrow 804), the electronic value issuing server 801 transfers the electronic value to the private electronic value bank 802 (arrow 805), the private electronic value bank 802 transmits the electronic value to the portable terminal 803 (arrow 806), and the private electronic value bank 802 and the portable terminal 803 share the electronic value (arrow 807).

Figure 9:
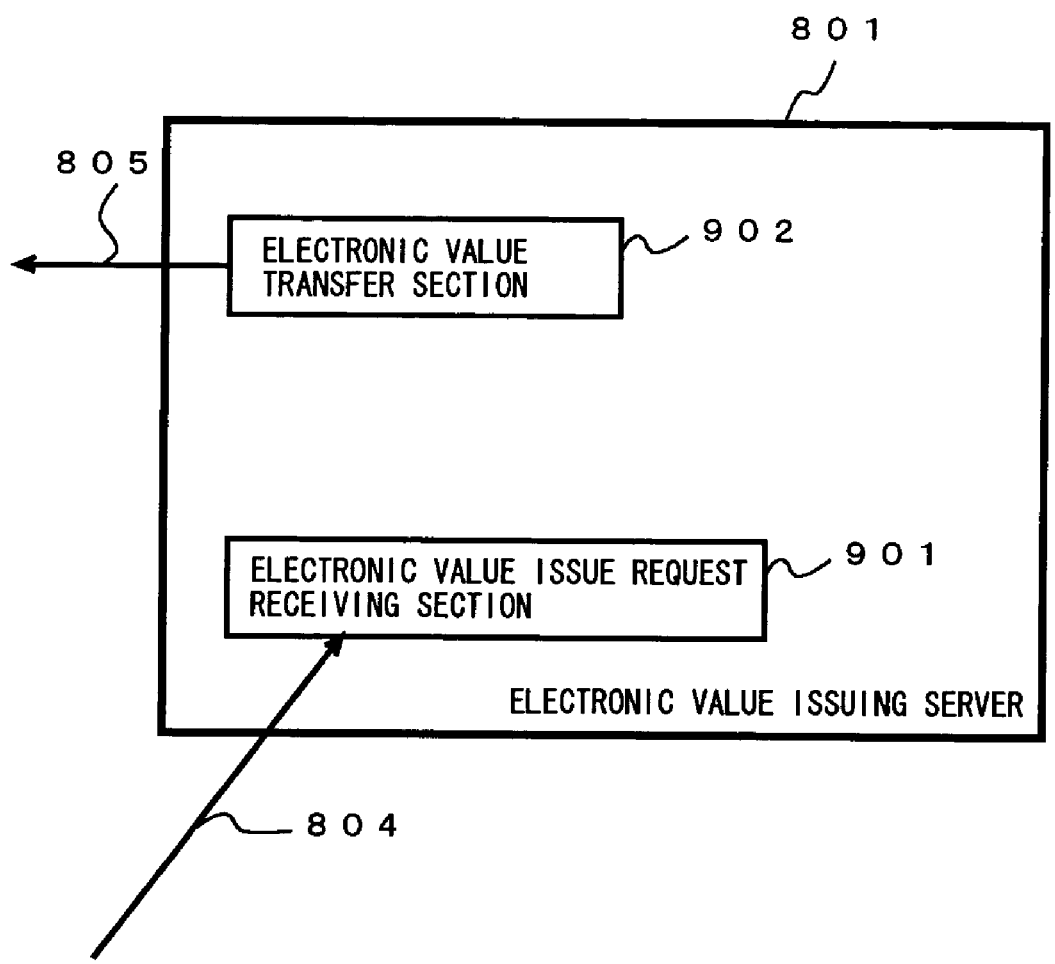
FIG. 9 is a functional block diagram of the electronic value issuing server in the second embodiment of the present invention.

FIG. 9 exemplifies the functional block diagram of the electronic value issuing server 801. The electronic value issuing server 801 has an electronic value issue request receiving section 901 and an electronic value transfer section 902. The server also has an electronic value generation section (not shown).

The electronic value issue request receiving section 901 receives the electronic value issue request from the portable terminal 803. The 'electronic value issue request' is a request for the electronic value issuing server 801 to issue the electronic value, and includes the type of the electronic value, the quantity of the electronic value, and information necessary for settlement processing of issuance of the electronic value. The electronic value generation section copies the electronic value, which has already existed, or creates a new electronic value in response to the electronic value issue request that the electronic value issue request receiving section 901 has received, and thus generates the electronic value.

The electronic value transfer section 902 transfers the electronic value (typically in the form of a credit to increase the purchasing power available) to the private electronic value bank 802 in response to the electronic value issue request that the electronic value issue request receiving section 901 has received. 'In response to the electronic value issue request' means that the electronic value generation section generates the electronic value as the electronic value issue request has specified. The electronic value transfer section 902 transfers the electronic value, which has been specified by the electronic value issue request received by the electronic value issue request receiving section 901 and has been generated by the electronic value generation section, to the private electronic value bank 802. Further, the electronic value may be transferred upon confirming that the processing for settlement has finished before the transfer of the electronic value.

Figure 10:
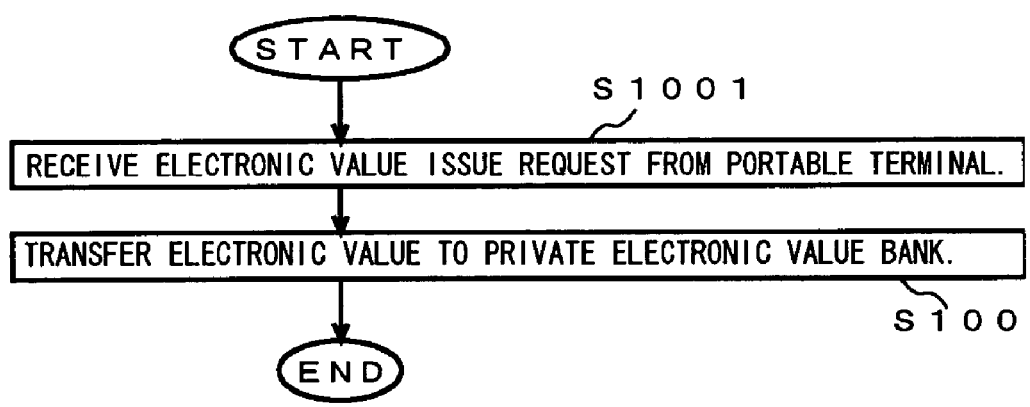
FIG. 10 is a flowchart explaining an operation of the electronic value issuing server in the second embodiment of the present invention.

FIG. 10 is the flowchart explaining the operation of the electronic value issuing server 801. The electronic value issue request receiving section 901 receives the electronic value issue request from the portable terminal 803 first (step S1001). Next, the electronic value generation section generates the electronic value in response to the electronic value issue request, and the electronic value transfer section 902 transfers the electronic value to the private electronic value bank 802 (step S1002).

Figure 11:
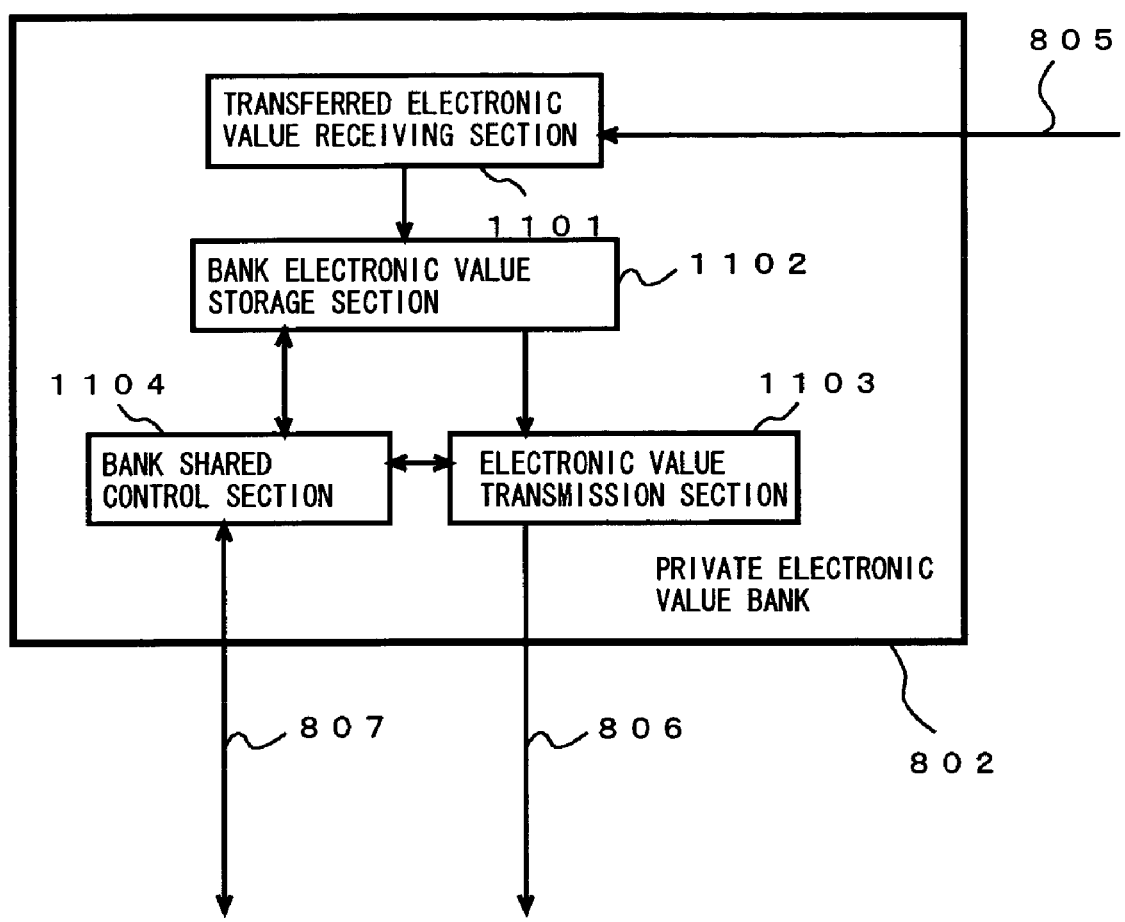
FIG. 11 is a functional block diagram of the private electronic value bank in the second embodiment of the present invention.

FIG. 11 exemplifies the functional block diagram of the private electronic value bank 802. The private electronic value bank 802 has a transferred electronic value receiving section 1101, a bank electronic value storage section 1102, an electronic value transmission section 1103 and a bank shared control section 1104.

The transferred electronic value receiving section 1101 receives the electronic value transferred from the electronic value issuing server 801.

The bank electronic value storage section 1102 stores the electronic value.

The electronic value transmission section 1103 transmits the electronic value in the bank electronic value storage section 1102 to the portable terminal 803. The 'electronic value in the bank electronic value storage section 1102' is an electronic value stored in the bank electronic value storage section 1102. The electronic value transmission section 1103 may either transmit all the electronic values stored in the bank electronic value storage section 1102 or transmit a part of the electronic values.

Figure 12:
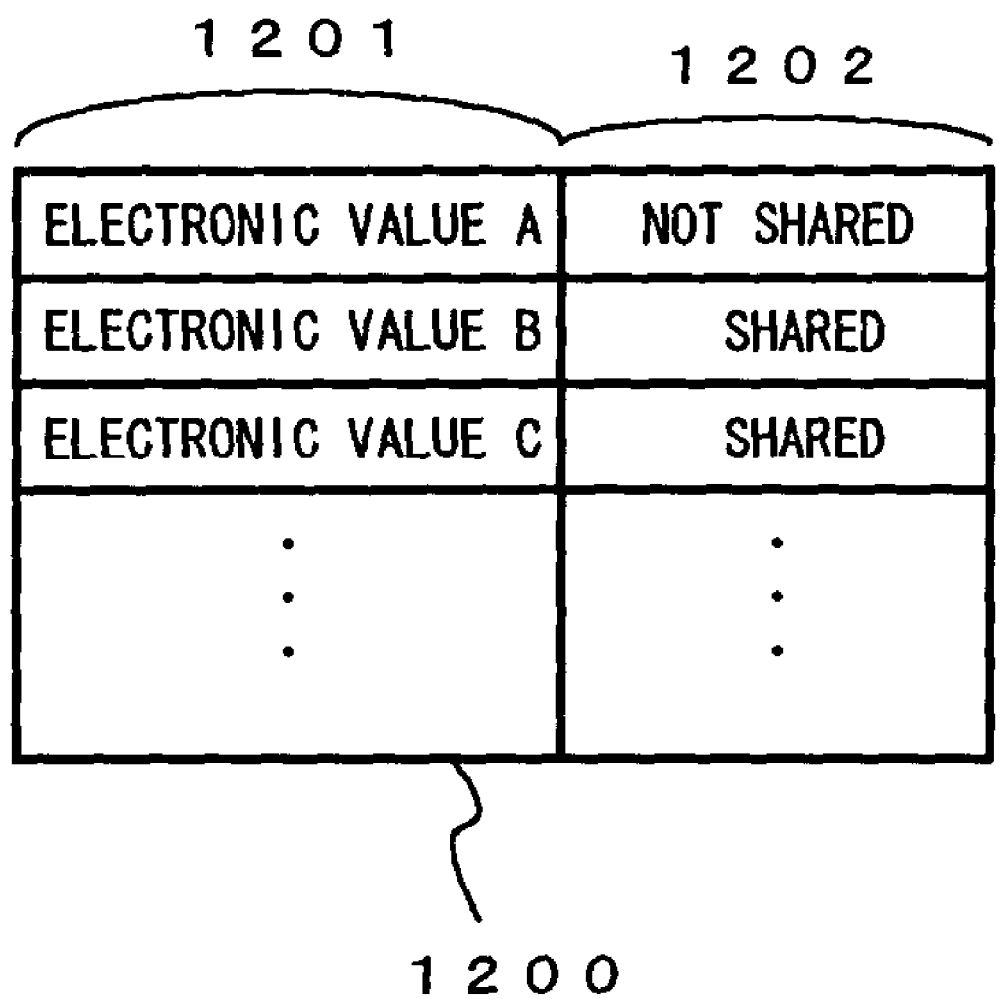
FIG. 12 is a view showing an example of a table controlled in a bank shared control section.

The bank shared control section 1104 controls the electronic value stored in the bank electronic value storage section 1102 and the electronic value stored in the portable terminal 803 such that they are shared. The 'electronic value stored in the portable terminal 803' is electronic value that the electronic value storage section of the portable terminal 803 (described later) has, and the 'shared' means that the electronic value stored in the bank shared control section 1104 and the electronic value stored in the portable terminal 803 have a common portion. Particularly, the electronic value stored in the portable terminal 803 may be a part of the electronic value stored in the bank electronic value storage section 1102. 'Controls such that they are shared' is to make it possible to discriminate by table 1200 exemplified in FIG. 12 which electronic value out of the electronic values stored in the bank electronic value storage section 1102 are stored by the portable terminal 803 as well (Each row of the table 1200 shows whether or not each electronic value is shared. When the electronic value shown in a column 1201 of each row is shared with the portable terminal 803, the value in a column 1202 is 'shared', and the value in the column 1202 is 'not shared' when the value is not shared), to delete the electronic value stored in the portable terminal 803 (or to change the status of the electronic value into 'used') when the private electronic value bank 802 has used the electronic value stored by both the bank electronic value storage section 1102 and the portable terminal 803, or to the contrary, to delete the electronic value stored in the bank electronic value storage section 1102 (or to change the status of the electronic value into 'used') when the private terminal 803 has used the electronic value.

Figure 13:
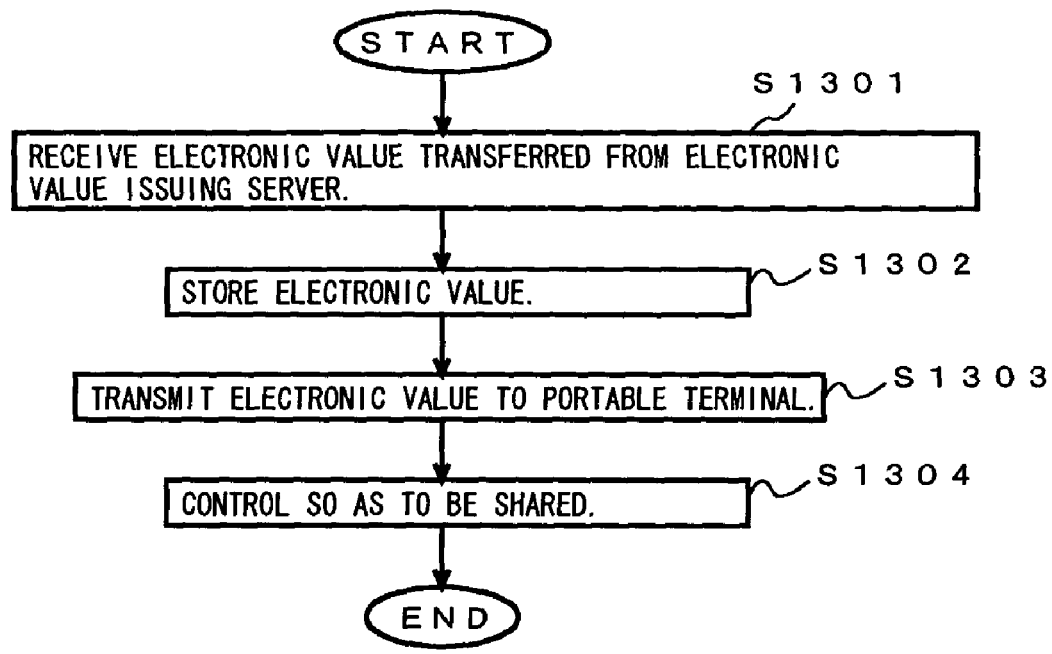
FIG. 13 is a flowchart explaining an operation of the private electronic value bank in the second embodiment.

FIG. 13 is the flowchart explaining the operation of the private electronic value bank 802. The transferred electronic value receiving section 1101 receives the electronic value transferred from the electronic value issuing server 801 first (step S1301). The bank electronic value storage section 1102 stores the received electronic value (step S1302). The electronic value transmission section 1103 transmits a part or all of the electronic values stored in the bank electronic value storage section 1102 to the portable terminal (step S1303). Then, the bank shared control section 1104 controls the electronic values such that they are shared (step S1304). For example, the section records which electronic value is shared and which electronic value is not shared in the table 1200 shown in FIG. 12.

Figure 14:
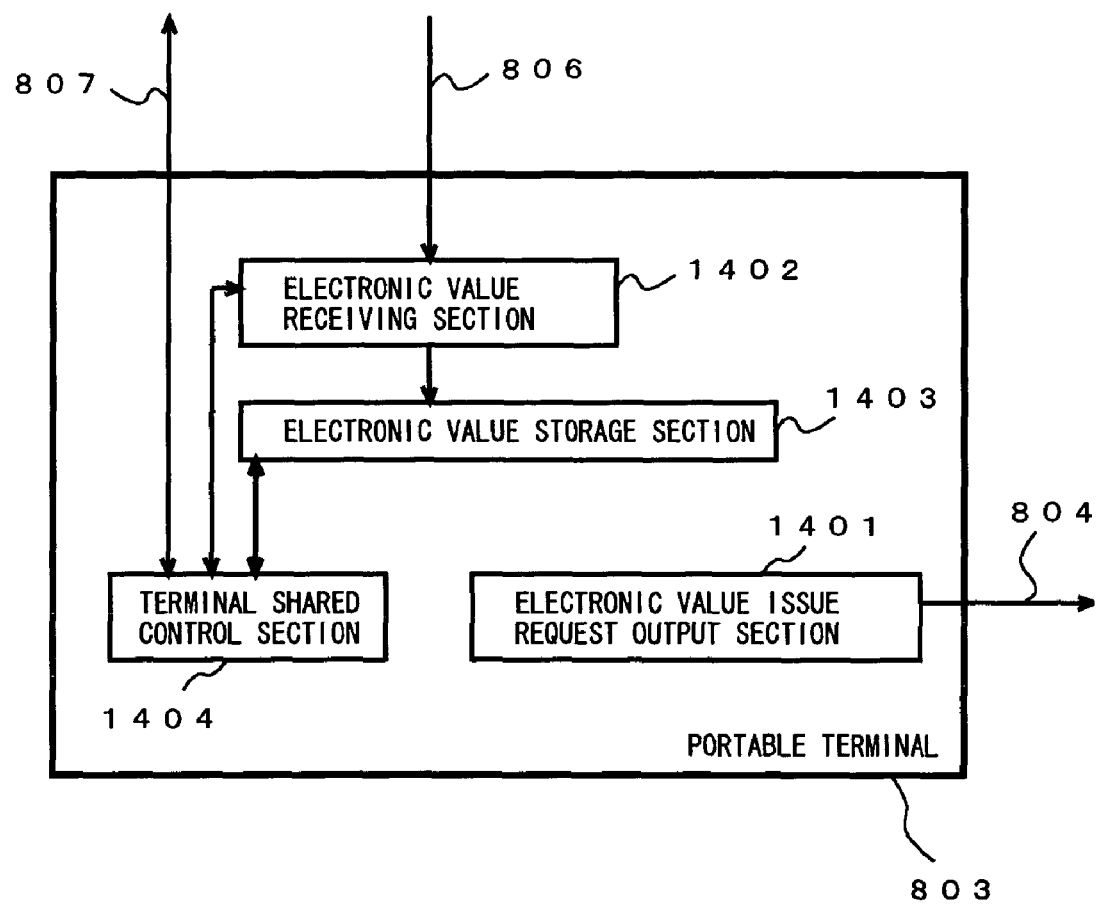
FIG. 14 is a functional block diagram of the portable terminal in the second embodiment of the present invention.
Figure 15:
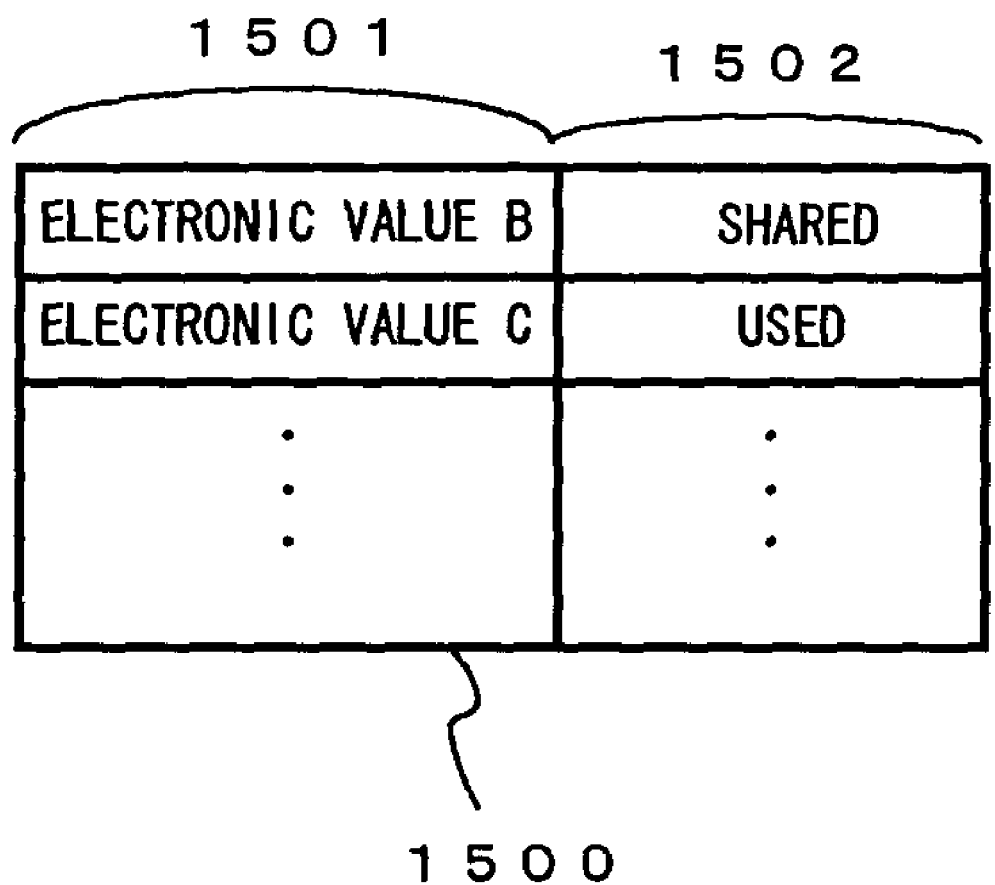
FIG. 15 is a view showing an example of a table controlled in a terminal shared control section.

FIG. 14 exemplifies the function block diagram of the portable terminal 803. The portable terminal has an electronic value issue request output section 1401, an electronic value receiving section 1402, an electronic value storage section 1403 and a terminal shared control section 1404.

The electronic value issue request output section 1401 outputs the electronic value issue request to the electronic value issuing server 801.

The electronic value receiving section 1402 receives the electronic value transmitted from the private electronic value bank 802.

The electronic value storage section 1403 stores the electronic value.

The terminal shared control section 1404 controls the electronic values stored in the bank electronic value storage section 1102 and the electronic values stored in the portable terminal 803 such that they are shared. The 'electronic values stored in the portable terminal 803' are electronic values that the electronic value storage section 1403 has, and 'controls such that they are shared' is to make it possible to discriminate which electronic values out of the electronic values stored in the electronic value storage section 1403 are stored by the bank electronic value storage section 1102, to delete the electronic value, which has been used, from the electronic value storage section 1403 (or to change the status of the electronic value into 'used') when the private electronic value bank 802 has used the electronic value, which is stored in the electronic value storage section 1403 and also stored in the bank electronic value storage section 1102, or to request the bank shared control section 1104 to delete the electronic value by the bank electronic value storage section 1102 (or to change the status of the electronic value into 'used') when the portable terminal 803 has used the value. Further, the terminal shared control section 1404 may control the status of the electronic value that appears in column 1501 by column 1502 of table 1500, and may request the bank shared control section 1104 to delete the electronic value, where the status as 'used' has been recorded in the column 1502, from the bank electronic value storage section 102 (or to change the status of the electronic value into 'used').

Figure 16:
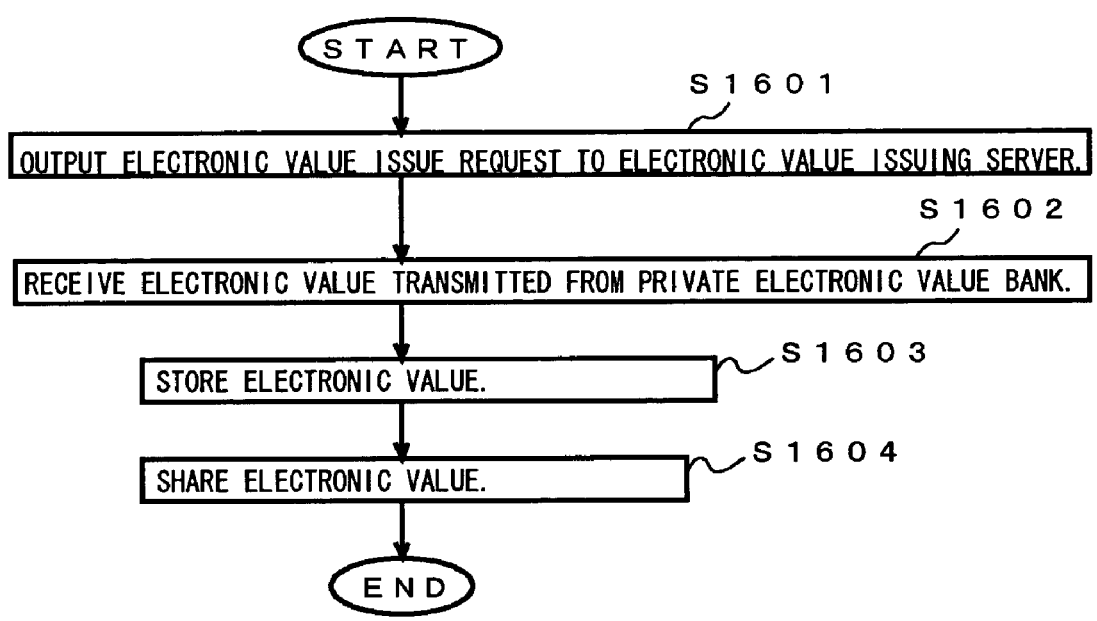
FIG. 16 is a view explaining an operation of the portable terminal in the second embodiment of the present invention.

FIG. 16 is the flowchart explaining the operation of the portable terminal 803, in which the electronic value issue request output section 1401 outputs the electronic value issue request to the electronic value issuing server (step S1601).

Next, the electronic value receiving section 1402 receives the electronic value transmitted from the private electronic value bank 802 (step S1602). The electronic value storage section 1403 stores the received electronic value (step S1603). Then, the terminal shared control section 1404 controls the electronic value so as to be shared (step S1604). Note that step S1602 may not be executed immediately after step S1601 has been executed, but step S1602 may be executed a brief period of time after step S1601 has been executed. This is because the portable terminal 803 and the private electronic value bank 802 are not always in a state where they can communicate with each other.

Figure 17:
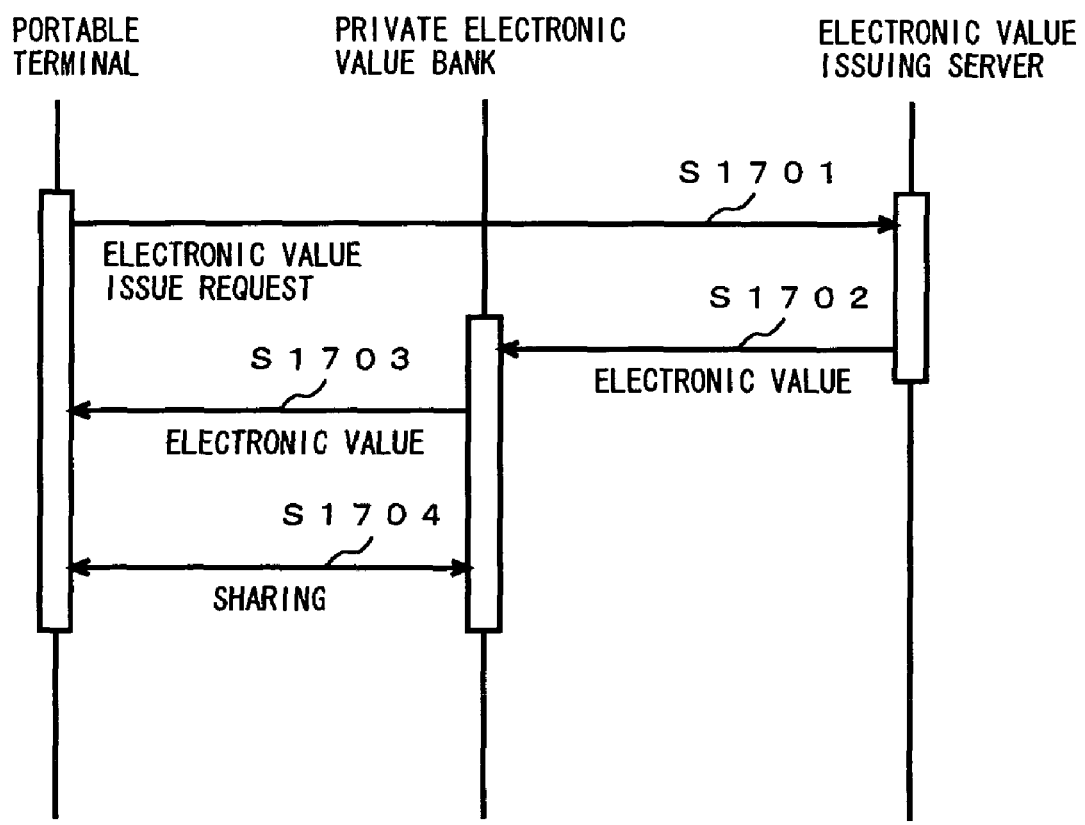
FIG. 17 is a sequence diagram explaining an interaction among the electronic value issuing server, the private electronic value bank, and the portable terminal in the second embodiment of the present invention.

FIG. 17 is the sequence diagram explaining with passage of time an interaction between the electronic value issuing server 801, the private electronic value bank 802, and the portable terminal 803. The portable terminal 803 outputs the electronic value issue request to the electronic value issuing server 801 first (step S1701), and the electronic value issuing server 801 transfers the electronic value to the private electronic value bank 802 (step S1702). The private electronic value bank 802 transmits the electronic value to the portable terminal 803 (step S1703). Then, control for sharing the electronic value is performed between the private electronic value bank 802 and the portable terminal 803 (step S1704).

With this embodiment, the portable terminal 803 sends the electronic value issue request to the electronic value issuing server 801, the electronic value is sent to the private electronic value bank 802 as a result, the private electronic value bank 802 stores the electronic value, and thus the private electronic value bank 802 and the portable terminal 803 share the electronic value. As a result, the private electronic value bank 802 has a backup of the electronic value, and there is no possibility to lose the electronic value even if a situation occurs where the user loses the portable terminal 803.

Third Embodiment

Figure 22:
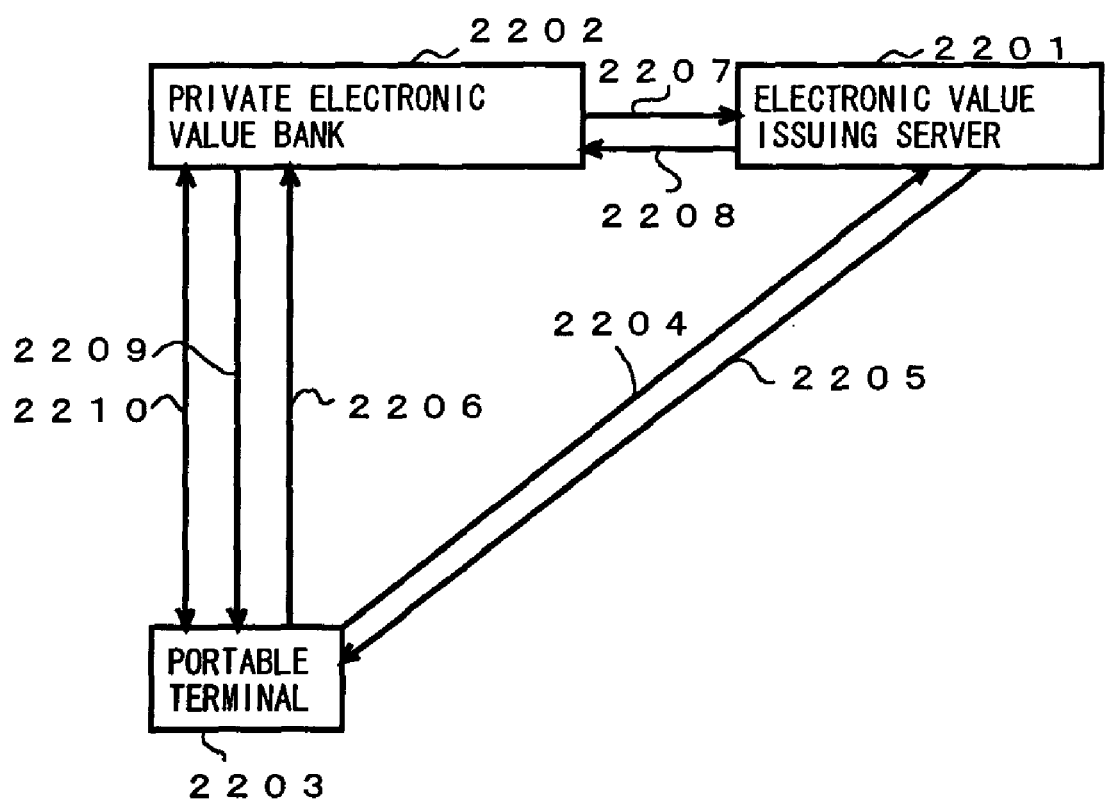
FIG. 22 is a view showing a configuration of the private electronic value bank system in a third embodiment of the present invention.

FIG. 22 is the view showing the constitution of the private electronic value bank system according to the third embodiment of the present invention. In this embodiment, the private electronic value bank system includes an electronic value issuing server 2201, a private electronic value bank 2202 and a portable terminal 2203. In this embodiment, the portable terminal 2203 outputs an electronic value purchase order to the electronic value issuing server 2201 (arrow 2204), and the electronic value issuing server 2201 transmits a purchase instruction 2205. The portable terminal 2203 transmits the electronic value purchase instruction to the private electronic value bank 2202 (arrow 2206), the private electronic value bank 2202 transmits the electronic value purchase request to the electronic value issuing server 2201 (arrow 2207), the electronic value issuing server 2201 transfers the electronic value to the private electronic value bank 2202 (arrow 2208), the private electronic value bank 2202 transmits the electronic value to the portable terminal 2203, and then, control for sharing the electronic value is performed between the private electronic value bank 2202 and the portable terminal 2203 (arrow 2210).

Figure 23:
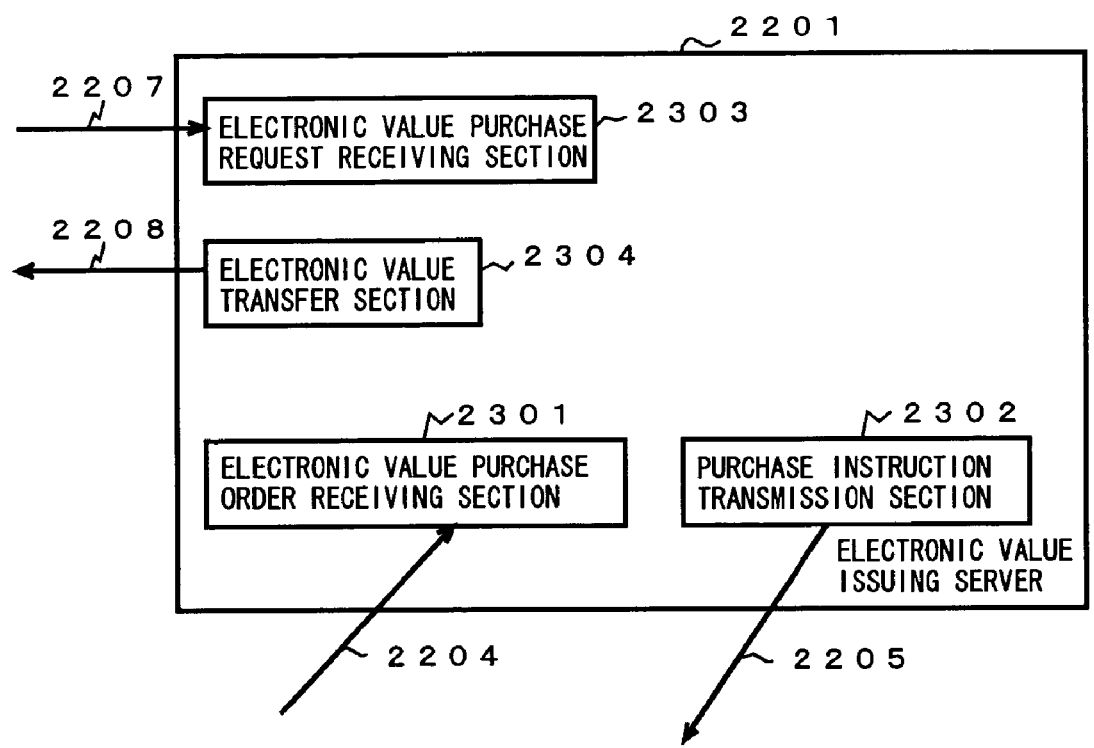
FIG. 23 is a functional block diagram of the electronic value issuing server in the third embodiment of the present invention.

FIG. 23 exemplifies the functional block diagram of the electronic value issuing server 2201. In this embodiment, the electronic value issuing server 2201 has an electronic value purchase order receiving section 2301, a purchase instruction transmission section 2302, an electronic value purchase request receiving section 2303, and an electronic value transfer section 2304. Further, the server also has the electronic value generation section (not shown).

The electronic value purchase order receiving section 2301 receives the electronic value purchase order from the portable terminal 2203. The 'electronic value purchase order' is data showing that the owner of the portable terminal 2203 wants the electronic value to be issued.

The purchase instruction transmission section 2302 transmits the purchase instruction to the portable terminal 2203. The 'purchase instruction' is information to obtain the electronic value from the electronic value issuing server 2201, and information that should identify the electronic value issuing server 2201 such as an IP address, a port number and URL of the electronic value issuing server 2201, what kind of electronic value the electronic value issuing server 2201 can issue, a settlement method with the issue of the electronic value, or the like can be cited, for example.

The electronic value purchase request receiving section 2303 receives the electronic value purchase request that is a purchase request for the electronic value from the private electronic value bank 2202 based on the purchase instruction transmitted from the purchase instruction transmission section 2302. 'Based on the purchase instruction' means that the request has been generated according to the content of the purchase instruction transmitted from the purchase instruction transmission section 2302.

The electronic value generation section copies the electronic value, which already exists, or creates a new electronic value in response to the electronic value purchase request received by the electronic value purchase request receiving section 2303.

The electronic value transfer section 2304 transfers the electronic value to the private electronic value bank in response to the electronic value purchase request received by the electronic value purchase request receiving section 2303. 'In response to the electronic value purchase request' means that the electronic value is generated in the electronic value generation section as the electronic value purchase request has specified. The electronic value generation section generates the type of the electronic value and the number of the electronic value, which the electronic value purchase request has specified, and the electronic value transfer section 2304 transfers it to the private electronic value bank.

Figure 24:
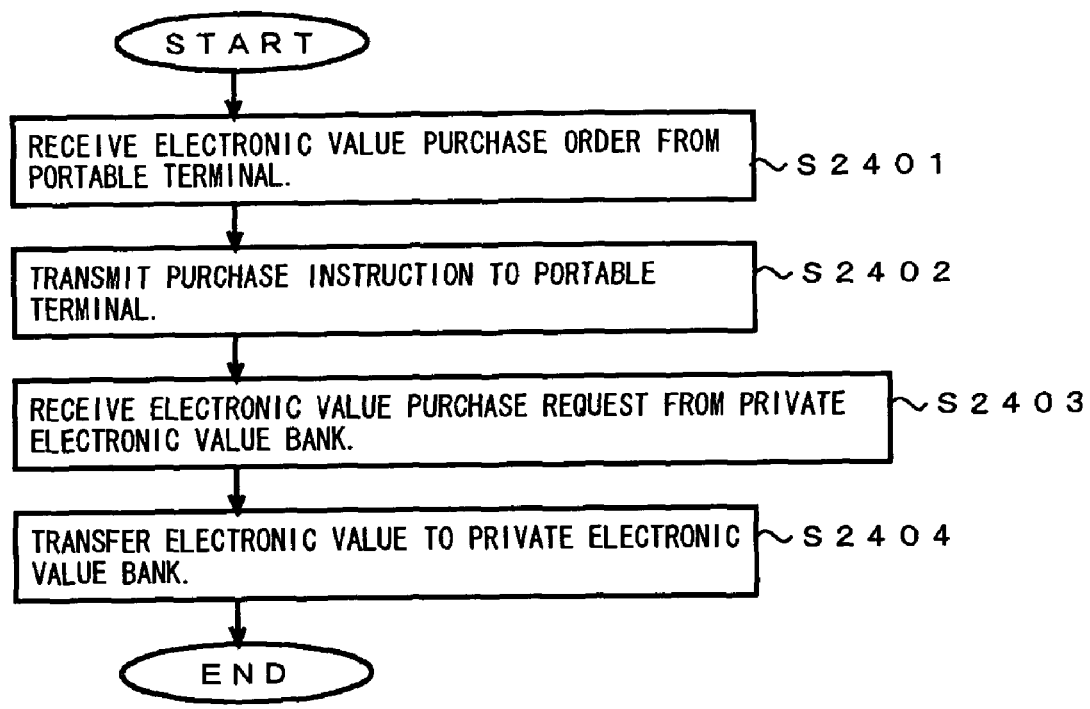
FIG. 24 is a flowchart explaining an operation of the electronic value issuing server in the third embodiment of the present invention.

FIG. 24 is the flowchart explaining the operation of the electronic value issuing server 2201. The electronic value purchase order receiving section 2301 receives the electronic value purchase order from the portable terminal 2203 (step S2401), and the purchase instruction transmission section 2302 transmits the purchase instruction to the portable terminal 2203 in response to the receipt (step S2402). Then, the electronic value purchase request receiving section 2303 receives the electronic value purchase request from the private electronic value bank 2202 (step S2403), the electronic value generation section generates the electronic value, and the electronic value transfer section 2304 transfers the generated electronic value to the private electronic value bank 2202 (step 2404).

Note that step S2403 does not need to be executed immediately after the processing of step S2402 has finished. This is because the electronic value purchase request is designed to be transmitted after communication from the portable terminal 2203 to the private electronic value bank 2202, and the portable terminal 2203 and the private electronic value bank 2202 are not always necessarily able to communicate with each other. The type and the number of the electronic value is included in the electronic value purchase order that the portable terminal 2203 transmits to the electronic value issuing server 2201, and the electronic value issuing server stores an order number (identification information of transaction) and the type and number of the electronic value when it receives the electronic value purchase order on step 2401. When the server receives the electronic value purchase request from the private electronic value bank in step S2403, it compares the order number (identification information of transaction) and the type and number of the electronic value included in the electronic value purchase information with the stored ones, and may transfer the electronic value to the private electronic value bank in step S2404 only when they are the same.

Figure 25:
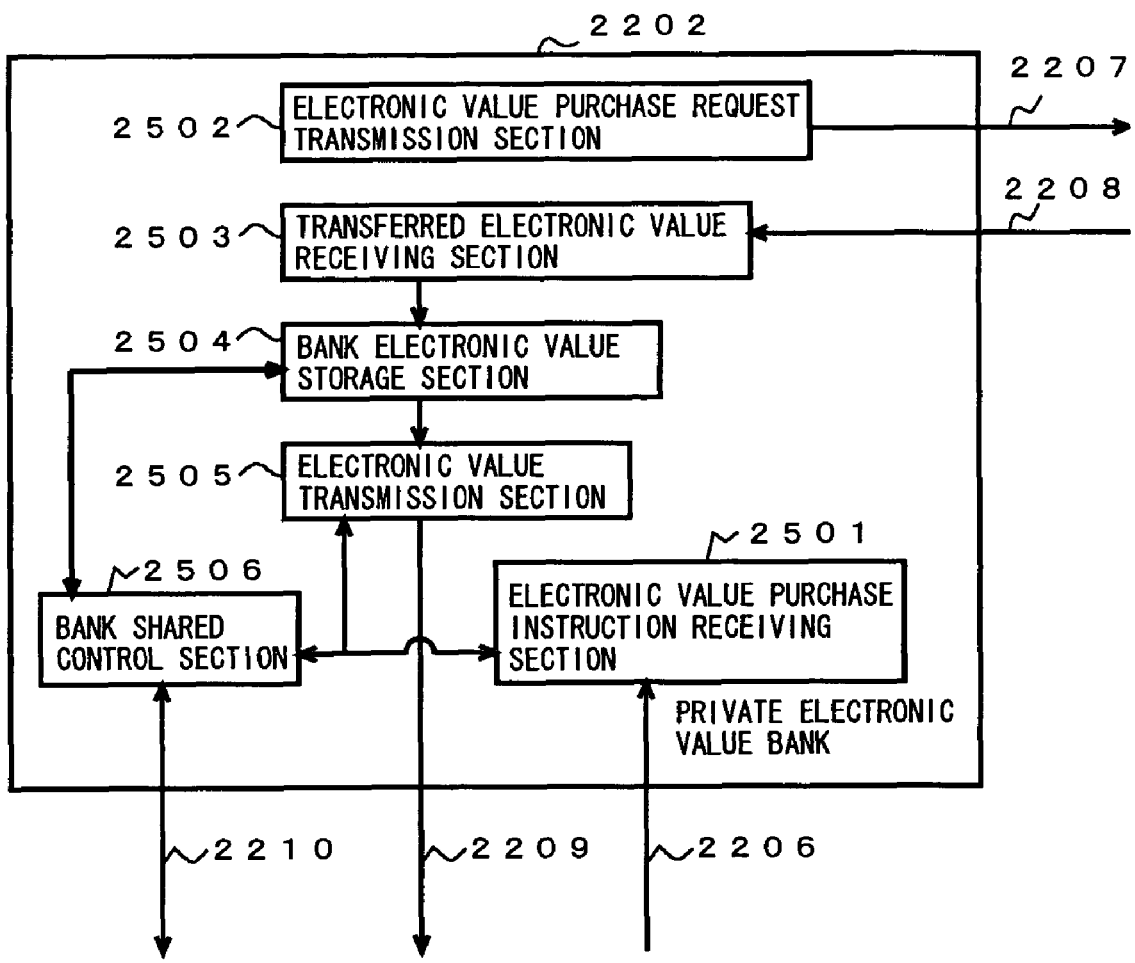
FIG. 25 is a functional block diagram of the private electronic value bank in the third embodiment of the present invention.

FIG. 25 exemplifies the functional block diagram of the private electronic value bank 2202 in this embodiment. The private electronic value bank 2202 has an electronic value purchase instruction receiving section 2501, an electronic value purchase request transmission section 2502, a transferred electronic value receiving section 2503, the bank electronic value storage section 2504, an electronic value transmission section 2505, and a bank shared control section 2506.

The electronic value purchase instruction receiving section 2501 receives the electronic value purchase instruction, which has been generated based on the purchase instruction, from the portable terminal 2203. 'The electronic value purchase instruction generated based on the purchase instruction' is information to purchase the electronic value that has been transmitted from the purchase instruction transmission section 2302 of the electronic value issuing server 2201 and generated based on the content of the purchase instruction received by the portable terminal 2203. For example, when the purchase instruction includes information to specify the electronic value issuing server 2201, the electronic value purchase instruction includes the specified information. Further, when the purchase instruction specifies the settlement method, the instruction includes information necessary for executing the settlement method, which is a credit card number, a bank deposit account number, a password or the like, for example.

The electronic value purchase request transmission section 2502 transmits the electronic value purchase request to the electronic value issuing server 2201 based on the electronic value purchase instruction received by the electronic value purchase instruction receiving section 2501. For example, when the electronic value purchase instruction includes the type and the number of the electronic value, the electronic value purchase request transmission section 2502 transmits data for purchasing the electronic values of the type and number from the electronic value issuing server 2201. Additionally, the electronic value purchase request may include a certificate of a third party, which shows that the price has been paid from the electronic value according to the specified settlement method.

The transferred electronic value receiving section 2503 receives the electronic value transferred from the electronic value issuing server 2201 in response to the electronic value purchase request that has been transmitted from the electronic value purchase request transmission section 2502.

The bank electronic value storage section 2504 stores the electronic value.

The electronic value transmission section 2505 transmits the electronic value of the bank electronic value storage section 2504 to the portable terminal 2203. In this transmission, all of the electronic values or a part of the electronic values stored in the bank electronic value storage section 2504 may be transmitted. Further, the electronic value transmission section 2505 may transmit all or a part of the electronic values received by the transferred electronic value receiving section 2503.

The bank shared control section 2506 controls the electronic value stored in the bank electronic value storage section 2504 and the electronic value stored in the portable terminal such that they are shared. The bank shared control section 2506 has the same function as the bank shared control section 1104 in the second embodiment.

Figure 26:
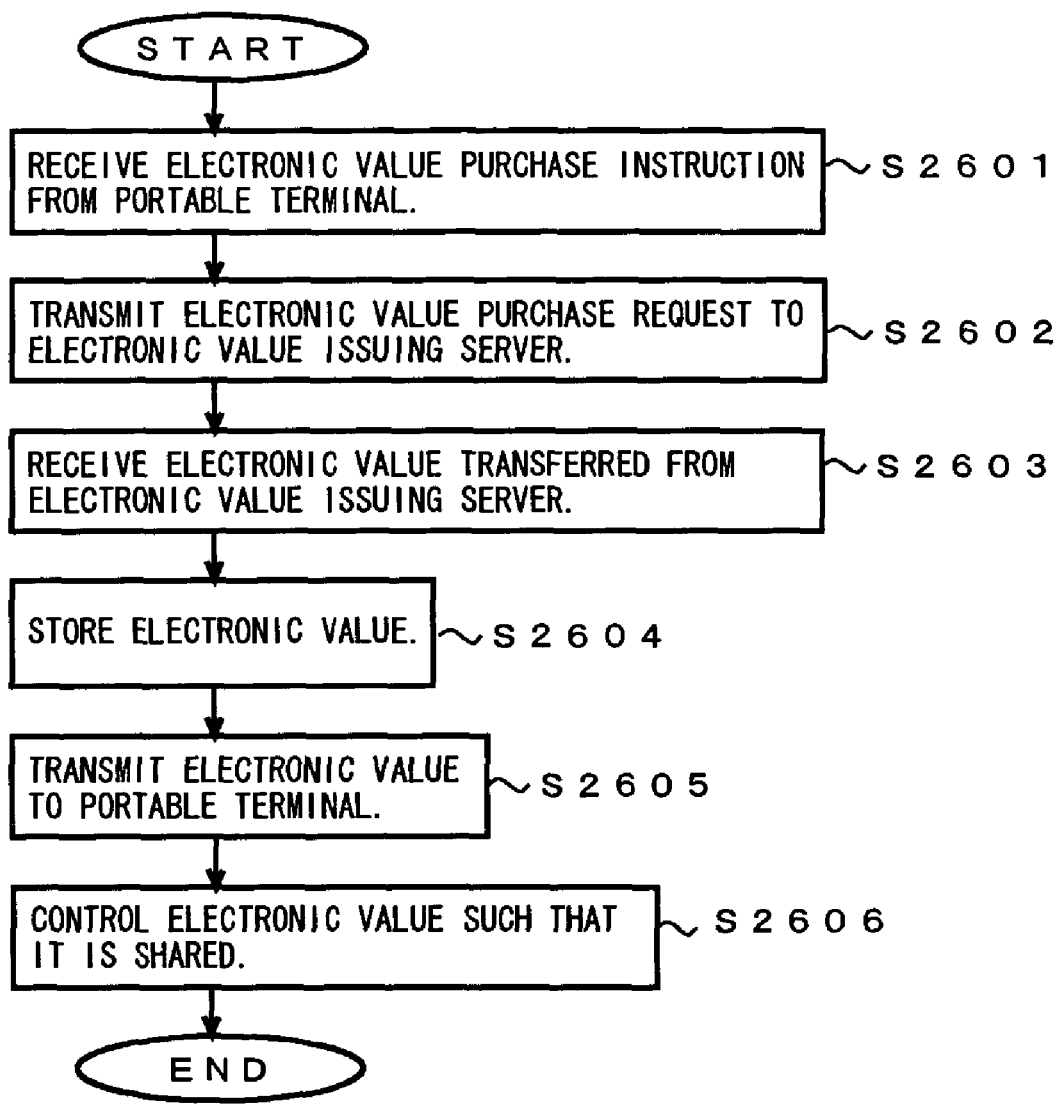
FIG. 26 is a flowchart explaining an operation of the private electronic value bank in the third embodiment of the present invention.

FIG. 26 is the flowchart explaining the operation of the private electronic value bank 2202, in which the electronic value purchase instruction receiving section 2501 receives the electronic value purchase instruction from the portable terminal 2203 (step S2601), and the electronic value purchase request transmission section 2502 transmits the electronic value purchase request to the electronic value issuing server 2201 (step S2602). Then, the transferred electronic value receiving section 2503 receives the electronic value transferred from the electronic value issuing server 2201 (step S2603), the bank electronic value storage section 2504 stores the received electronic value (step S2604), and the electronic value transmission section 2505 transmits the stored electronic value to the portable terminal 2203 (step S2605). Then, the electronic value is controlled so as to be shared (step S2606).

Figure 27:
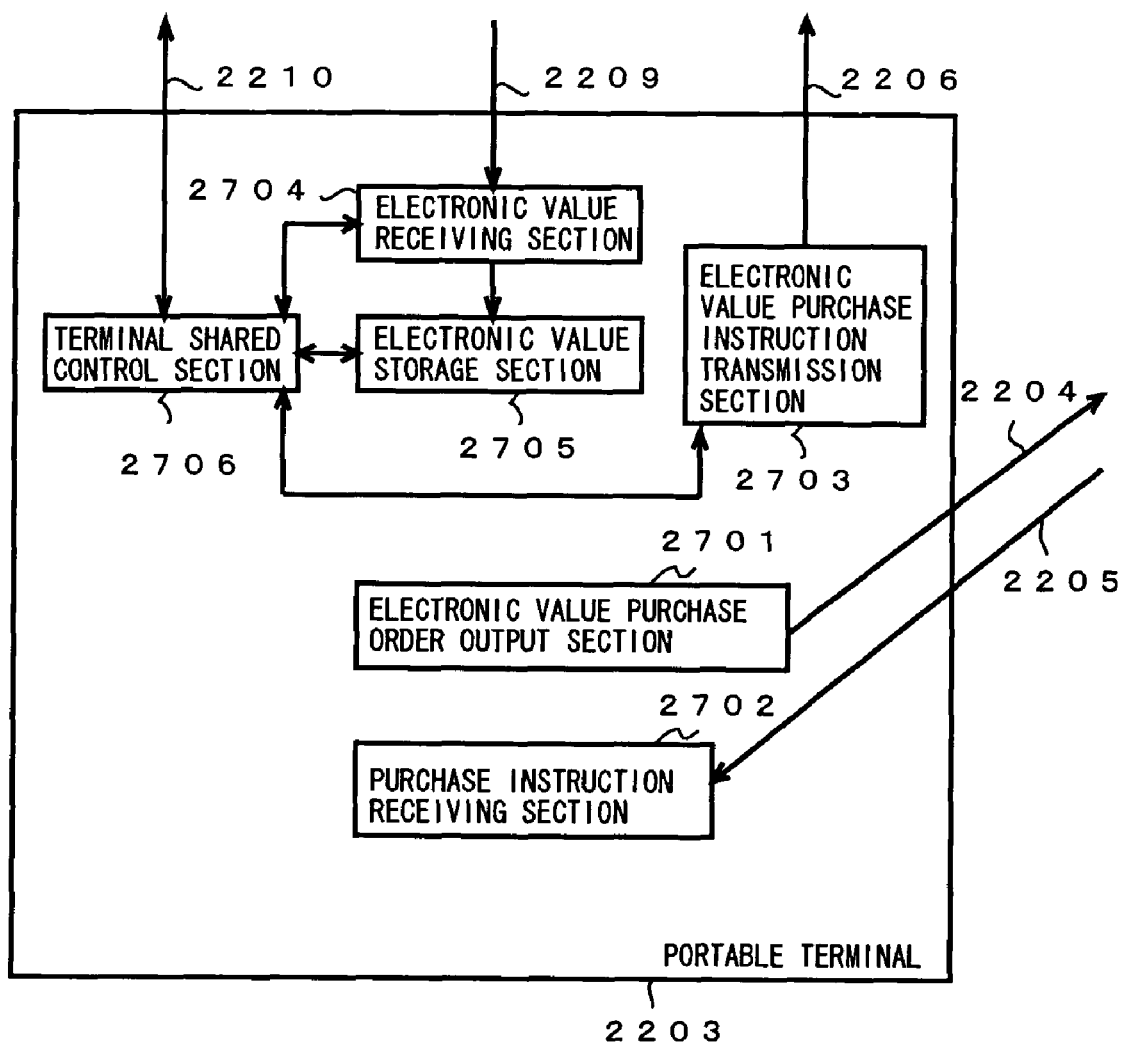
FIG. 27 is a functional block diagram of the portable terminal in the third embodiment of the present invention.

FIG. 27 exemplifies the functional block diagram of the portable terminal 2203. The portable terminal 2203 has an electronic value purchase order output section 2701, a purchase instruction receiving section 2702, an electronic value purchase instruction transmission section 2703, an electronic value receiving section 2704, an electronic value storage section 2705, and a terminal shared control section 2706.

The electronic value purchase order output section 2701 outputs the electronic value purchase order to the electronic value issuing server 2201. This output is initiated by the operation of the owner of the portable terminal.

The purchase instruction receiving section 2702 receives the purchase instruction from the electronic value issuing server in response to the electronic value purchase order output from the electronic value purchase order output section 2701.

The electronic value purchase instruction transmission section 2703 transmits the electronic value purchase instruction to the private electronic value bank 2202 in response to the purchase instruction received by the purchase instruction receiving section 2702. This transmission may be performed immediately after the purchase instruction receiving section 2702 receives the purchase instruction, or may be initiated by an operation as the result of determination of the owner of the portable terminal 2203 after he/she looks at the content of the purchase instruction received by the purchase instruction receiving section 2702.

The electronic value receiving section 2704 receives the electronic value transmitted from the private electronic value bank 2202 in response to the electronic value purchase instruction transmitted from the electronic value purchase instruction transmission section 2703.

The electronic value storage section 2705 stores the electronic value.

The terminal shared control section 2706 controls the electronic value stored by the bank electronic value storage section 2504 and the electronic value stored by the portable terminal such that they are shared. The section has the same function as the terminal shared control section 1404 in the second embodiment.

Figure 28:
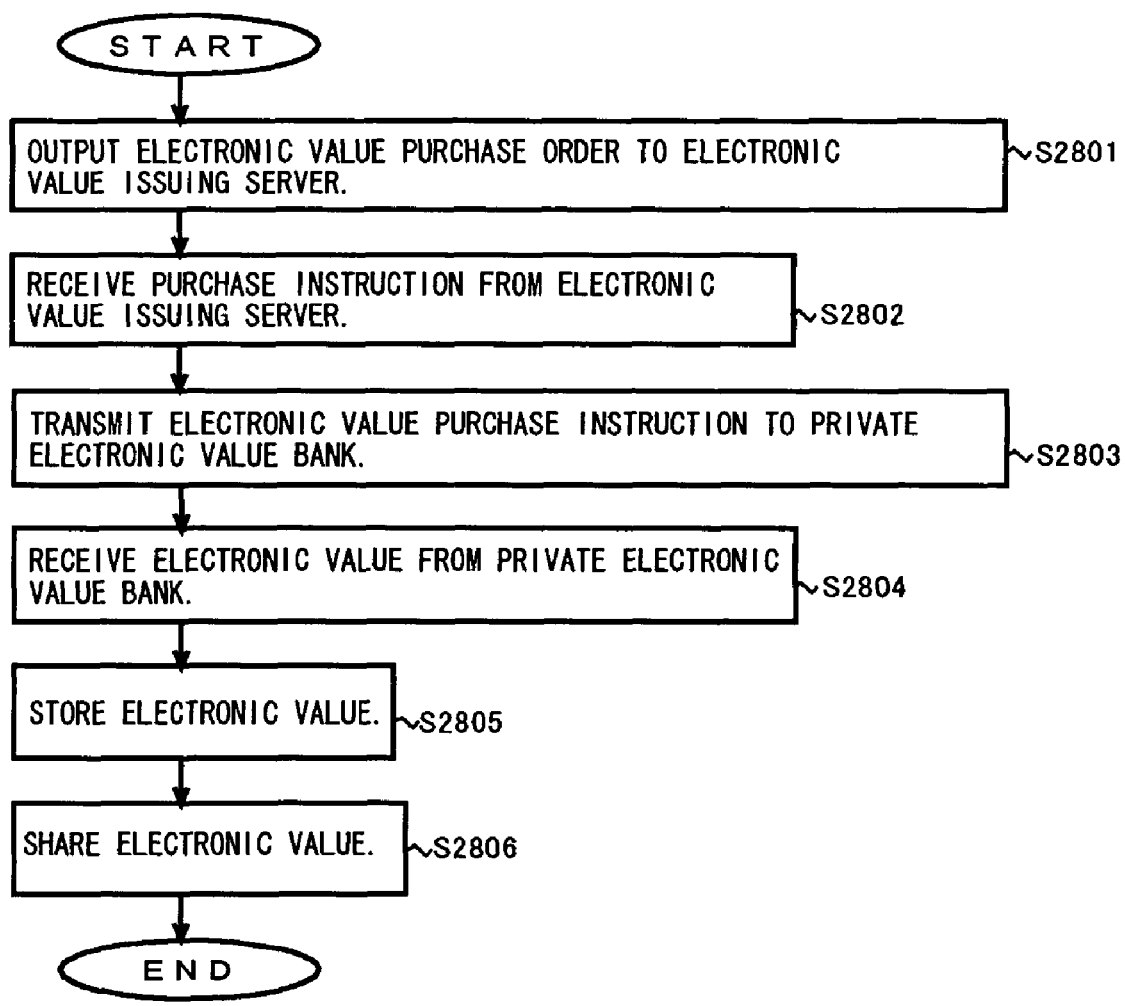
FIG. 28 is a flowchart explaining an operation of the portable terminal in the third embodiment of the present invention.

FIG. 28 is the flowchart explaining the operation of the portable terminal 2203. The electronic value purchase order output section 2701 outputs the electronic value purchase order to the electronic value issuing server 2201 first (step S2801), and the electronic value purchase order output section 2701 receives the purchase instruction from the electronic value issuing server 2201 (step S2802). Then, the electronic value purchase instruction transmission section 2703 transmits the electronic value purchase instruction to the private electronic value bank 2202 (step S2803), the electronic value receiving section 2704 receives the electronic value from the private electronic value bank 2202 (step S2804), the electronic value storage section 2705 stores the received electronic value (step S2805), and the electronic value is controlled so as to be shared using the terminal shared control section 2706 (step S2806).

Figure 29:
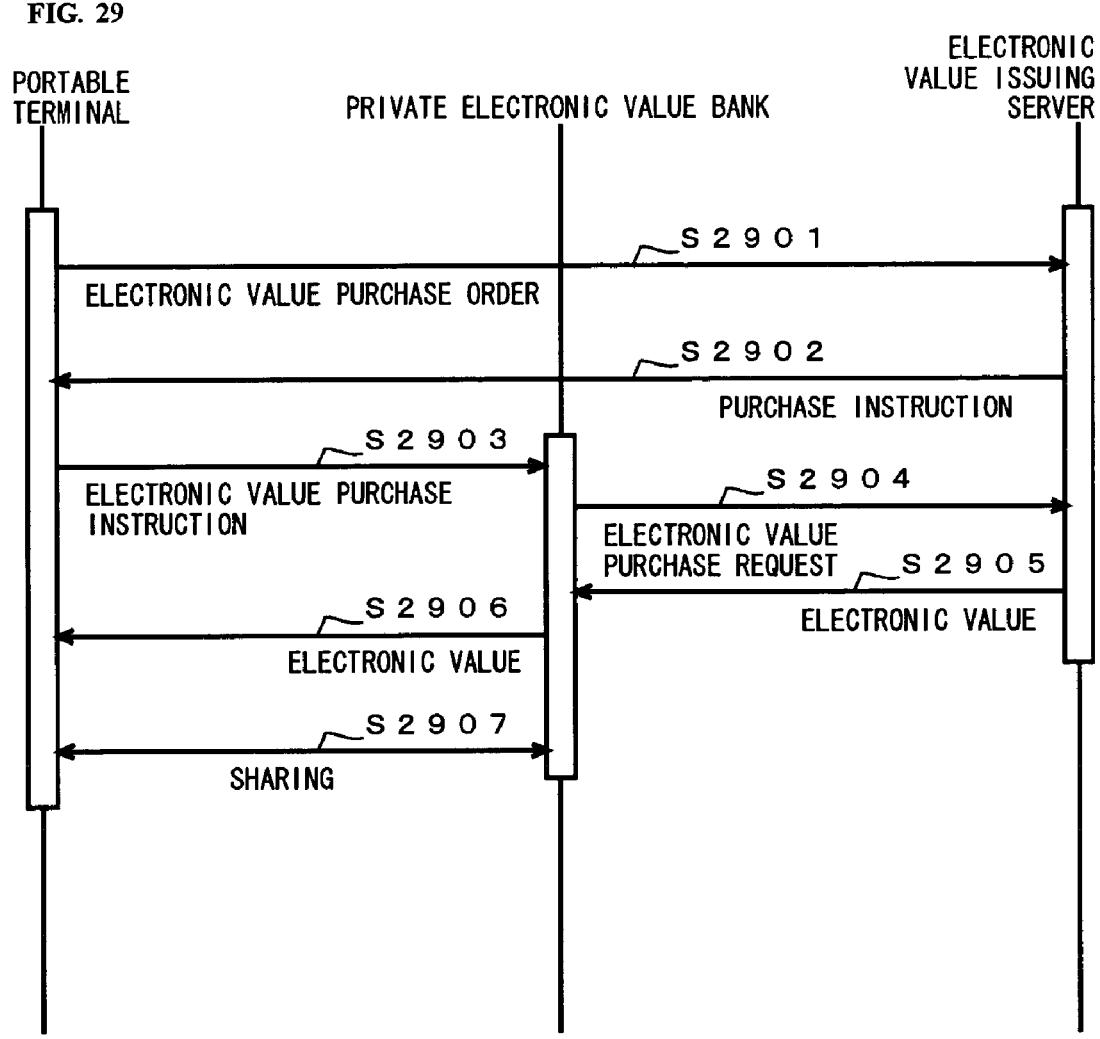
FIG. 29 is a sequence diagram explaining an interaction between the electronic value issuing server, the private electronic value bank, and the portable terminal in the third embodiment of the present invention.

FIG. 29 exemplifies the sequence diagram in which the interaction between the electronic value issuing server 2201, the private electronic value bank 2202, and the portable terminal 2203 is described chronologically. First, the portable terminal 2203 outputs the electronic value purchase order to the electronic value issuing server 2201 (step S2901), and the electronic value issuing server 2201 transmits the purchase instruction to the portable terminal 2203 (step S2902). The portable terminal 2203 generates the electronic value purchase instruction from the purchase instruction and transmits it to the private electronic value bank 2202 (step S2903), the private electronic value bank 2202 transmits the electronic value purchase request to the electronic value issuing server 2201 (step S2904), and the electronic value issuing server 2201 transfers the electronic value to the private electronic value bank 2202 (step S2905). Then, the private electronic value bank 2202 transmits the electronic value to the portable terminal 2203 (step S2906), and control for sharing the electronic value is performed between the private electronic value bank 2202 and the portable terminal 2203 (step S2907).

With this embodiment, there is no possibility of losing the electronic value due to the loss or failure of the portable terminal 2203 because not only the portable terminal 2203 but also the private electronic value bank stores the electronic value issued by the electronic value issuing server 2201. Further, by transmitting the purchase instruction from the electronic value issuing server 2201, the electronic value can be issued to the private electronic value bank 2202 in a method or a protocol that the electronic value issuing server 2201 specifies. Furthermore, even if the portable terminal 2203 is not provided with a function to transmit the electronic value purchase instruction, it is possible to make the portable terminal 2203 have a function capable of transmitting the electronic value purchase instruction when the purchase instruction includes a plug-in allowing the terminal to have the function to transmit the electronic value purchase instruction.

Fourth Embodiment

Figure 30:
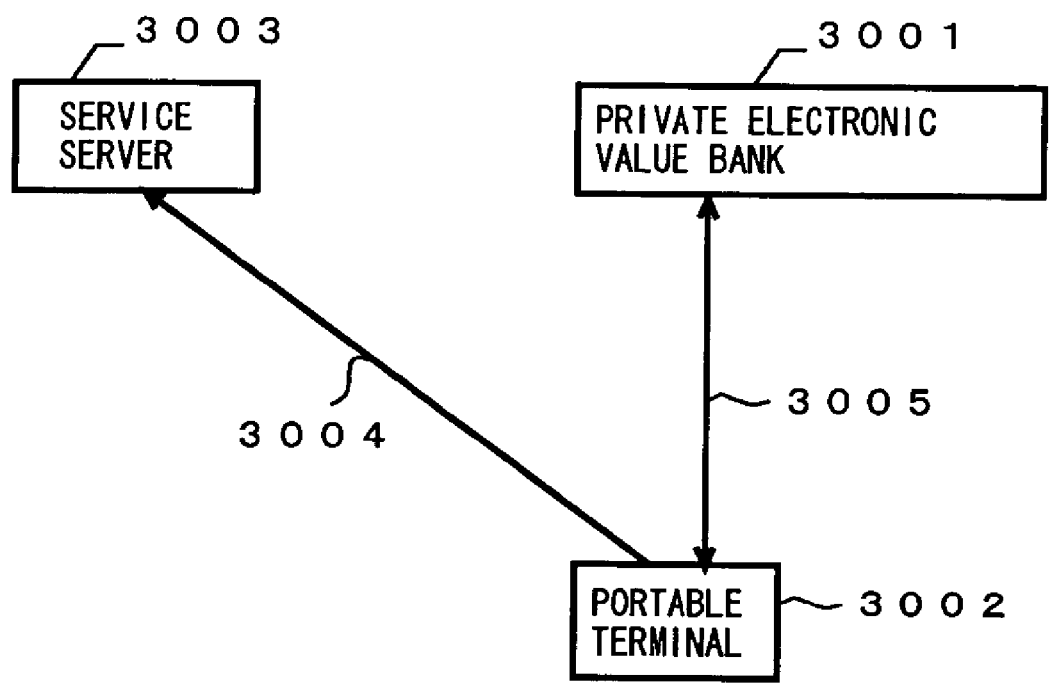
FIG. 30 is a view showing a constitution of the private electronic value bank system in a fourth embodiment of the present invention.

FIG. 30 exemplifies the constitution of the private electronic value bank system according to the fourth embodiment of the present invention. In this embodiment, the private electronic value bank system includes a private electronic value bank 3001, a portable terminal 3002, and a service server 3003. In this embodiment, the private electronic value bank 3001 and the portable terminal 3002 share the electronic value, the portable terminal 3002 transmits the electronic value to the service server (arrow 3004), and then, the electronic value transmitted from the portable terminal 3002 to the service server 3003 is deleted from the electronic values shared between the private electronic value bank 3001 and the portable terminal 3002 (arrow 3005) (or the status of the electronic value is changed into 'used').

Figure 31:
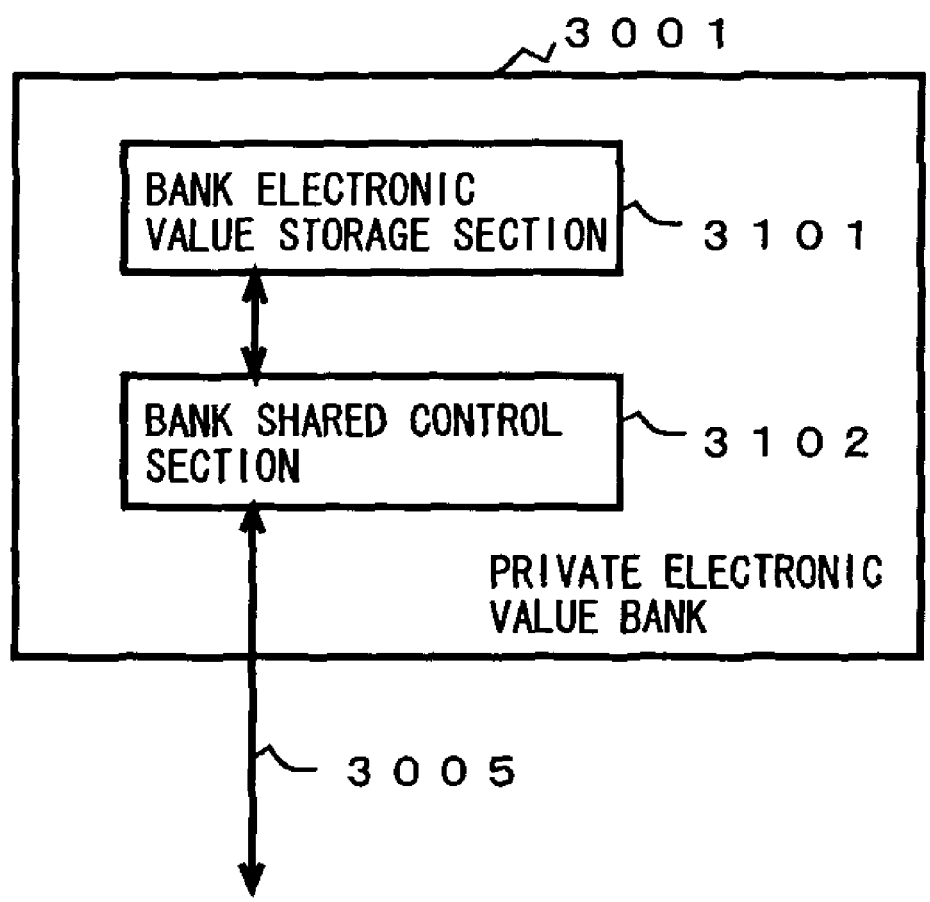
FIG. 31 is a functional block diagram of the private electronic value bank in the fourth embodiment of the present invention.

FIG. 31 exemplifies the functional block diagram of the private electronic value bank 3001, and the private electronic value bank 3001 includes a bank electronic value storage section 3101 and the bank shared control section 3102.

The bank electronic value storage section 3101 stores the electronic value.

The bank shared control section 3102 is a section that controls the electronic value stored by the bank electronic value storages section 3101 and the electronic value stored by the portable terminal 3002 such that they are shared, which has the same operation as the bank shared control section of the third embodiment.

Figure 32:
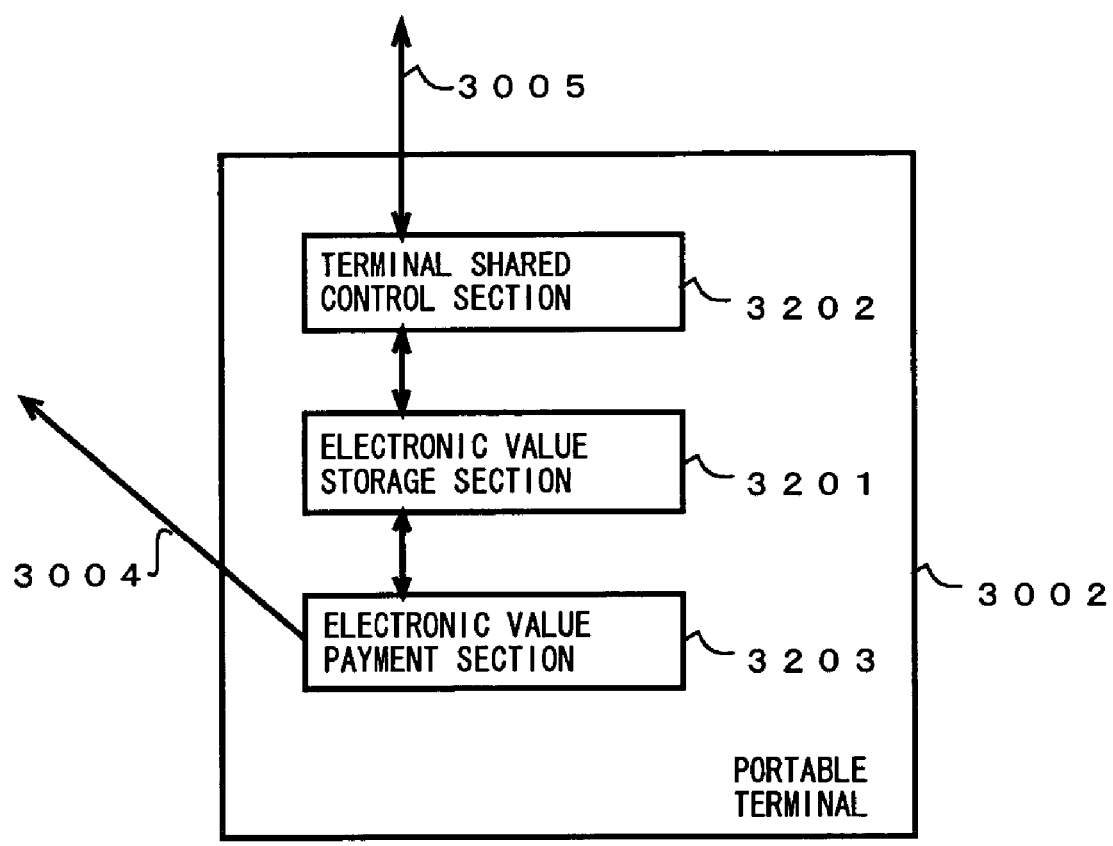
FIG. 32 is a functional block diagram of the portable terminal in the fourth embodiment of the present invention.

FIG. 32 exemplifies the functional block diagram of the portable terminal 3002, and the portable terminal 3002 includes an electronic value storage section 3201, a terminal shared control section 3202, and an electronic value payment section 3203.

The electronic value storage section 3201 stores the electronic value. The electronic values stored by the electronic value storage section 3201 may be a part or all of the electronic values stored by the bank electronic value storage section 3101.

The terminal shared control section 3202 is a section that controls the electronic value stored in the bank electronic value storage section 3101 and the electronic value stored in the portable terminal such that they are shared, and it has the same operation as the terminal shared section of the second embodiment and the third embodiment.

The electronic value payment section 3203 performs transmission to pay the electronic value for the service server 3003. 'To perform transmission to pay the electronic value' does not only transmit the electronic value itself that is expressed as data, but also includes a case where money transfer instruction information or the like for deposit is transmitted instead of the electronic value itself.

Figure 33:
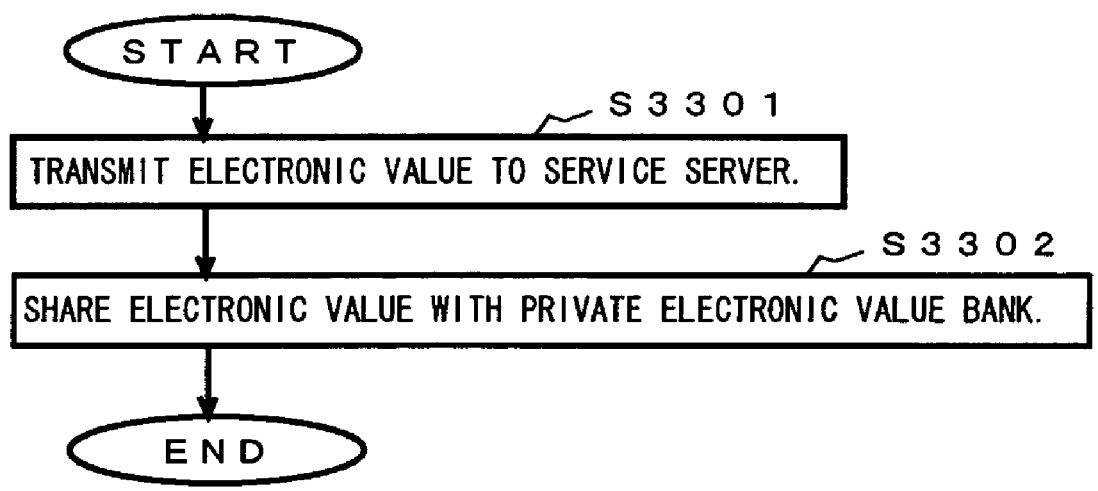
FIG. 33 is a flowchart explaining an operation of the portable terminal in the fourth embodiment of the present invention.

FIG. 33 is the flowchart explaining the operation of the portable terminal 3002. The electronic value payment section transmits the electronic value to the service server first (step S3301). Then the terminal shared control section 3202 shares the electronic value with the private electronic value bank (step S3302). Specifically, the electronic value transmitted from the portable terminal 3002 to the service server 3003 in step S3301 is deleted from the bank electronic value storage section 3101 of the private electronic value bank (or the status of the electronic value is changed into 'used'). Note that there exists a case where the terminal accepts the service from the service server after the processing of step S3301 has finished. Further, step S3302 may not be executed immediately after the processing of step S3301 has finished, but step S3302 may be executed when the portable terminal 3002 and the private electronic value bank 3001 can communicate.

Figure 34:
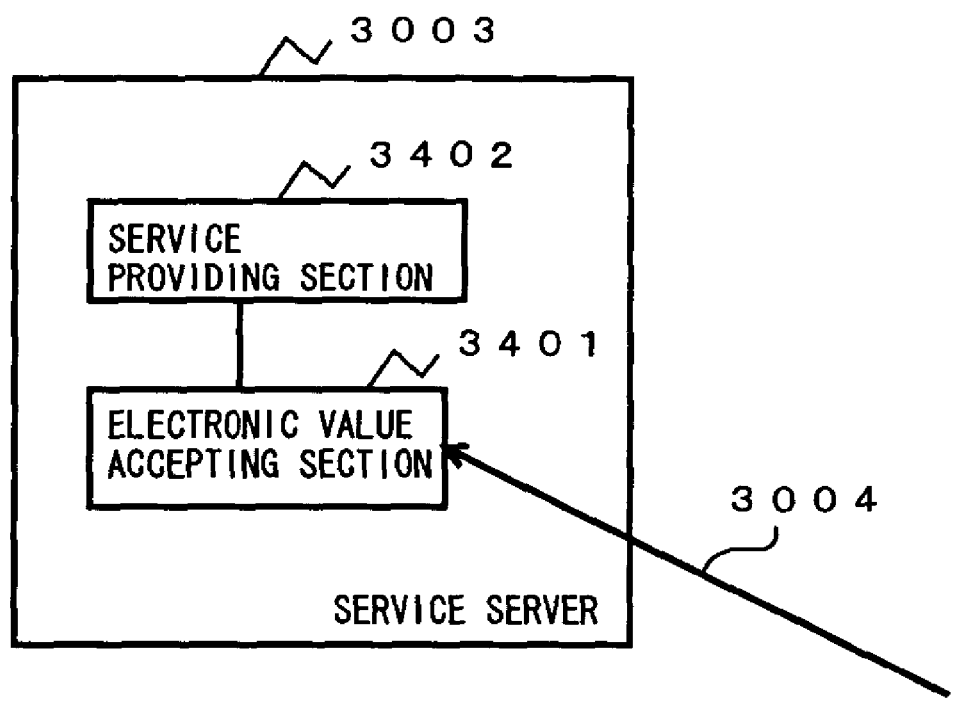
FIG. 34 is a functional block diagram of the service server in the fourth embodiment of the present invention.

FIG. 34 exemplifies the functional block diagram of the service server 3003, and the service server 3003 includes an electronic value accepting section 3401 and a service providing section 3402. The electronic value accepting section 3401 receive to accept the electronic value transmitted from the electronic value payment section 3203 of the portable terminal 3002. 'To receive to accept the electronic value' does not only receive the electronic value itself that is expressed as data, but also includes a case where money transfer instruction information or the like for deposit is transmitted instead of the electronic value itself.

The service providing section 3402 performs processing for providing the service according to the electronic value received from the electronic value payment section 3203 of the portable terminal 3002. Specifically, in the case where the service server 3003 performs delivery service of music, the section permits the portable terminal 3002 to download music and allow the terminal to execute the download. Further, the section starts an operation to open a gate when the service server 3003 is the automatic ticket examiner, or provides drinks when the service server 300 is the automatic vending machine of drinks. In the case where the service server 3003 downloads music, the portable terminal 3002 and the service server 3003 are generally connected to each other via the network such as the Internet, but when the service server 3003 is the automatic ticket examiner or the automatic vending machine providing the real service, the portable terminal 3002 and the service server 3003 may be capable of directly transmitting/receiving information via infrared ray communication, local radio communication, or the like.

Figure 35:
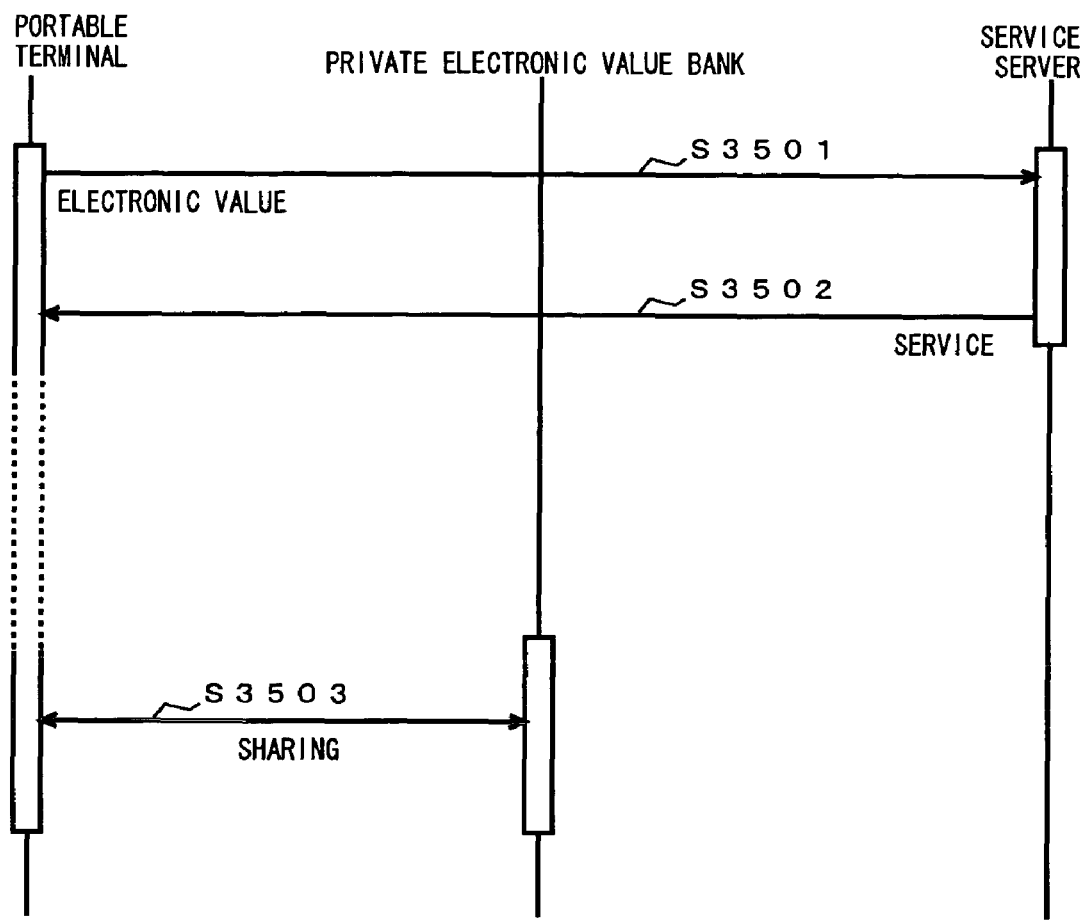
FIG. 35 is a sequence diagram explaining an interaction between the service server, the private electronic value bank and the portable terminal in the fourth embodiment of the present invention.

FIG. 35 exemplifies the sequence diagram where the interaction between the private electronic value bank 3001, the portable terminal 3002, and the service server 3003 is described chronologically. First, the portable terminal 3002 transmits the electronic value to the service server 3003 (step S3501). The service server 3003 provides the service when it receives the electronic value (step S3502). Although FIG. 35 describes that the service is provided for the portable terminal 3002, it is not necessary to provide it from the service server 3003 for the portable terminal 3002, but, other than the portable terminal 3002, the automatic ticket examiner, the automatic vending machine, or the like may provide the service for the owner of the portable terminal 3002 as described above. When the portable terminal 3002 and the private electronic value bank 3001 become capable of communicating, control for sharing the electronic value is performed (step S3503). Specifically, the electronic value transmitted from the portable terminal 3002 is deleted from the private electronic value bank 3001 (or the status of the electronic value is changed into 'used'), or the electronic value stored by the private electronic value bank 3001 is transmitted to the portable terminal 3002.

As described above, when the portable terminal 3002 transmits the electronic value to provide the service and the portable terminal 3002 and the private electronic value bank 3001 are capable of communicating, the electronic value stored by the 3002 and the private electronic value bank 3001 is controlled so as to be shared, and thus the private electronic value bank 3001 has a back-up of the electronic value and can cope with damage, loss or the like of the portable terminal 3002. In addition, the portable terminal 3002 can use the electronic value even in the case where the portable terminal 3002 and the private electronic value bank 3001 cannot communicate.

Fifth Embodiment

Figure 36:
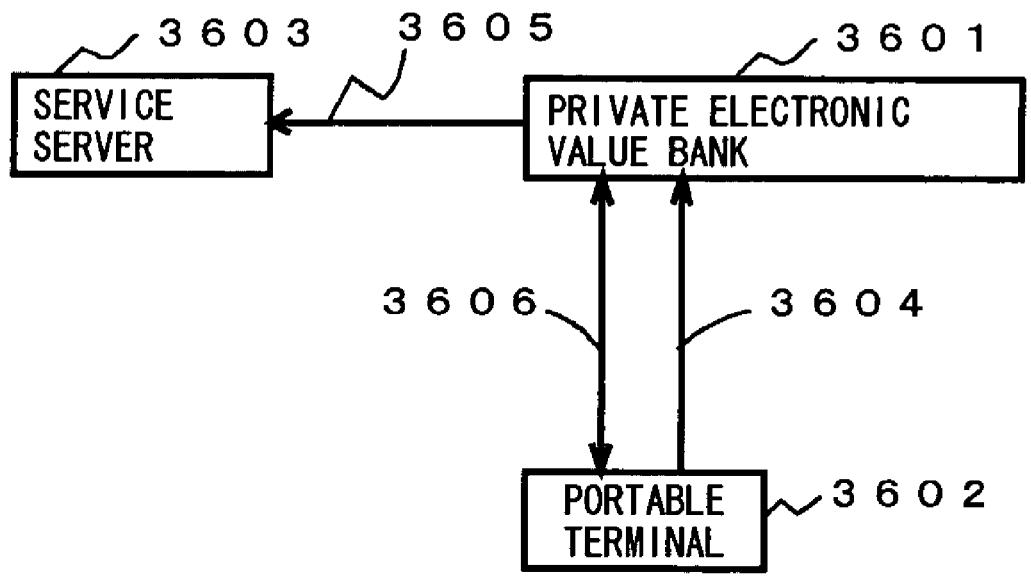
FIG. 36 is a view showing a constitution of the private electronic value bank system in a fifth embodiment of the present invention.

FIG. 36 exemplifies the configuration of the private electronic value bank system according to the fifth embodiment of the present invention. In this embodiment, the private electronic value bank system includes a private electronic value bank 3601, a portable terminal 3602 and a service server 3603. In this embodiment, the portable terminal 3602 transmits an electronic value payment request to the private electronic value bank 3601 (step S3604), and the private electronic value bank 3601 performs transmission for the service server 3603 to pay the electronic value (step S3605). Then, the processing for sharing the electronic value is performed between the private electronic value bank 3601 and the portable terminal 3602, and when the private electronic value bank 3601 and the portable terminal 3602 share the electronic value to which a processing, which the service server 3603 obtains from the private electronic value bank 3601, has been performed, the electronic value is deleted from the portable terminal 3602 (or the status of the electronic value is changed into 'used') (step S3606).

Figure 37:
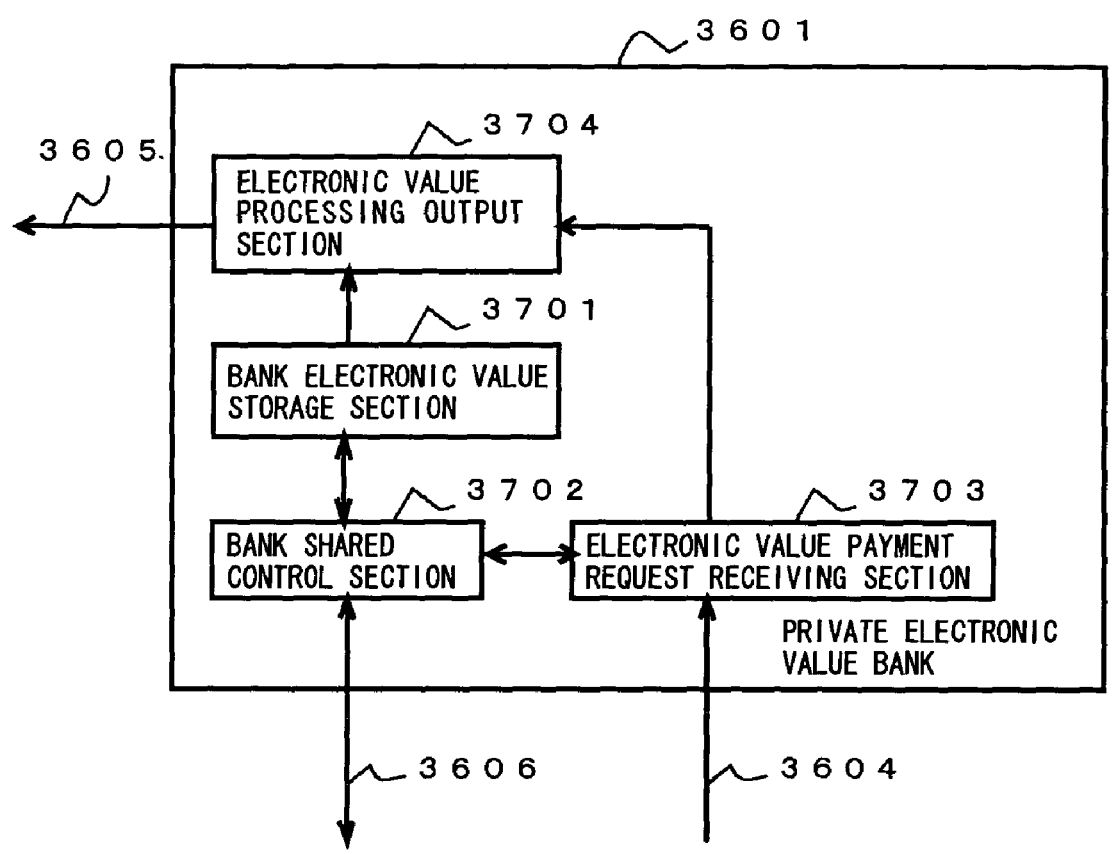
FIG. 37 is a functional block diagram of the private electronic value bank in the fifth embodiment of the present invention.

FIG. 37 exemplifies the functional block diagram of the private electronic value bank 3601. The private electronic value bank 3601 has a bank electronic value storage section 3701, a bank shared control section 3702, an electronic value payment request receiving section 3703, and an electronic value processing output section 3704.

The bank electronic value storage section 3701 stores the electronic value.

The bank shared control section 3702 is a section to control the electronic value stored by the bank electronic value storage section 3701 and the electronic value stored in the portable terminal 3602 such that they are shared, which has the same operation as the bank shared control section of the second, third and fourth embodiments.

The electronic value payment request receiving section 3703 receives the electronic value payment request that is a request to perform a payment processing for the electronic value from the portable terminal 3602 to the service server 3603.

The electronic value processing output section 3704 performs the processing to allow the service server 3603 to obtain the electronic value in response to the electronic value payment request received by the electronic value payment request receiving section. The 'processing to allow the server to obtain the electronic value' does not only transmit the electronic value that is expressed as data, but also includes the case where money transfer instruction information or the like for deposit is transmitted instead of the electronic value itself.

Figure 38:
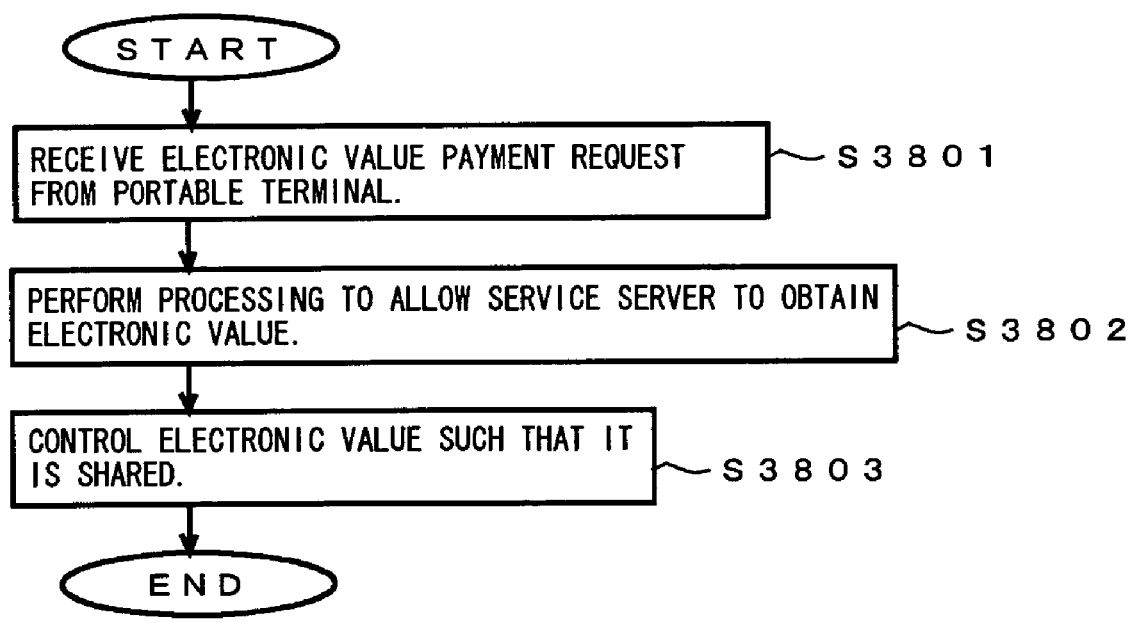
FIG. 38 is a flowchart explaining an operation of the private electronic value bank in the fifth embodiment of the present invention.

FIG. 38 is the flowchart explaining the operation of the private electronic value bank 3601. The electronic value payment request receiving section 3703 receives the electronic value payment request from the portable terminal 3602 first (step S3801). Then, the processing to allow the service server 3603 to obtain the electronic value is performed (step S3802), and control is performed such that the electronic value is shared (step S3803). Specifically, when the private electronic value bank 3601 and the portable terminal 3602 share the electronic value to which the processing, where the service server 3603 obtains the electronic value, has been performed in step S3802, the electronic value is deleted from the portable terminal 3602 (or the status of the electronic value is changed into 'used').

Figure 39:
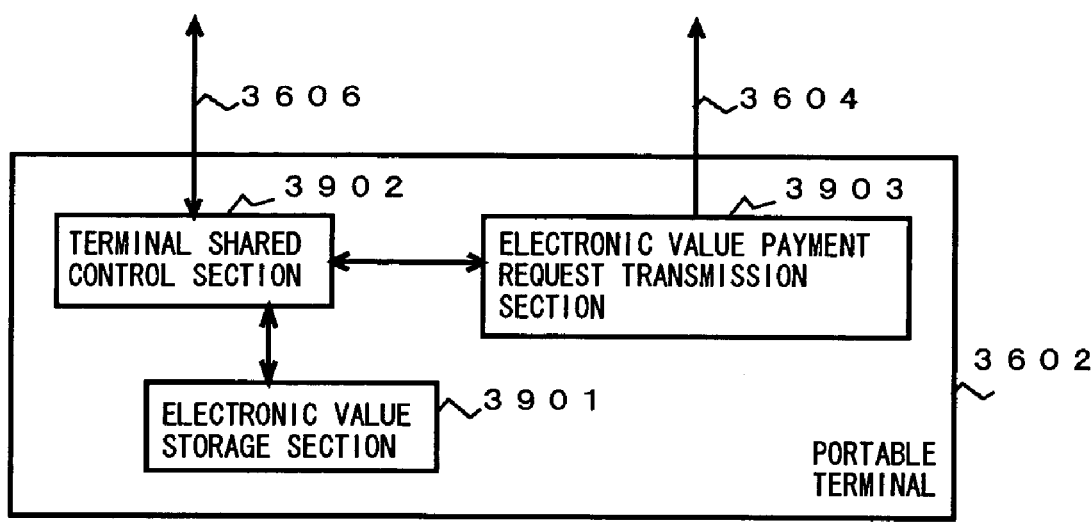
FIG. 39 is a functional block diagram of the portable terminal in the fifth embodiment of the present invention.

FIG. 39 exemplifies the functional block diagram of the portable terminal 3602. The portable terminal 3602 has an electronic value storage section 3901, a terminal shared control section 3902 and an electronic value payment request transmission section 3903.

The electronic value storage section 3901 stores the electronic value.

The terminal shared control section 3902 controls the electronic value stored in the bank electronic value storage section 3701 and the electronic value stored in the portable terminal 3602 such that they are shared. The 'electronic value stored in the portable terminal 3602' is the electronic value stored in the electronic value storage section 3901.

The electronic value payment request transmission section 3903 transmits the electronic value payment request to the private electronic value bank 3601. The transmission of the electronic value payment request is performed when the owner of the portable terminal 3602 operates the portable terminal 3602.

Figure 40:
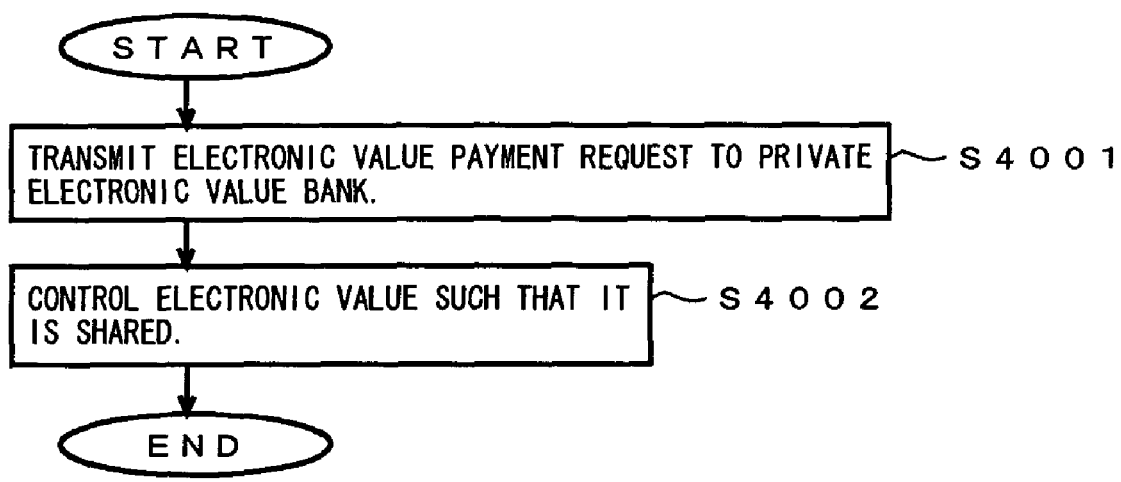
FIG. 40 is a flowchart explaining an operation of the portable terminal in the fifth embodiment of the present invention.

FIG. 40 is the flowchart explaining the operation of the portable terminal 3602. The electronic value payment request transmission section 3903 transmits the electronic value payment request to the private electronic value bank first (step S4001). Then, since the private electronic value bank 3601 performs the processing for payment of the electronic value, control is performed such that the electronic value stored by the electronic value storage section and the electronic value stored by the portable terminal 3602 are shared (step S4002).

Figure 41:
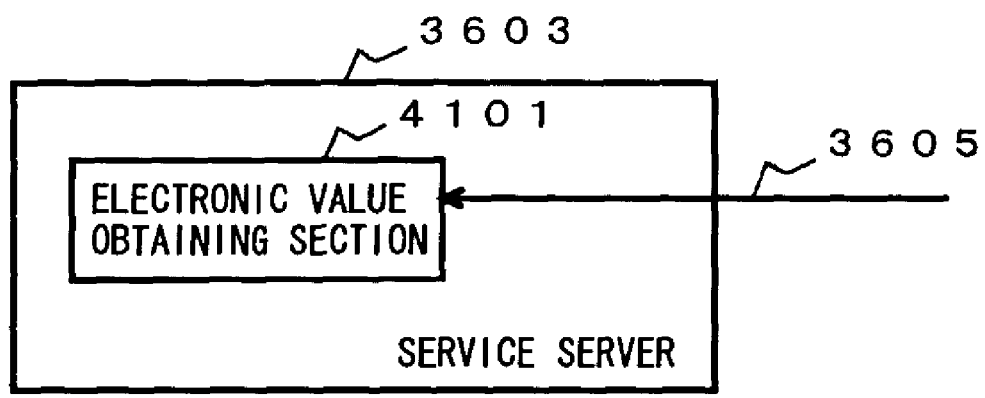
FIG. 41 is a functional block diagram of the service server in the fifth embodiment of the present invention.

FIG. 41 exemplifies the functional block diagram of the service server 3603. The service server 3603 has an electronic value obtaining section 4101. The electronic value obtaining section 4101 obtains the electronic value that should be obtained by the processing of the private electronic value bank. Specifically, the electronic value obtaining section 4101 obtains the electronic value as a result of the electronic value processing output section 3704 of the private electronic value bank 3601 performing the processing. Herein, 'to obtain the electronic value' is not limited to the case of obtaining the electronic value itself that is expressed as data, but also includes the case of obtaining a value that moves electronically such as obtaining money transfer information for deposit by using the electronic value.

The service server 3603 may have a section to provide the service according to the electronic value obtained by the electronic value obtaining section 4101. The section permits the electronic value to download music, for example. Note that in the case where the service server obtains the electronic value to pay public utility fees such as electricity and gas or to pay tax, a section to provide such service may not be necessary.

Figure 42:
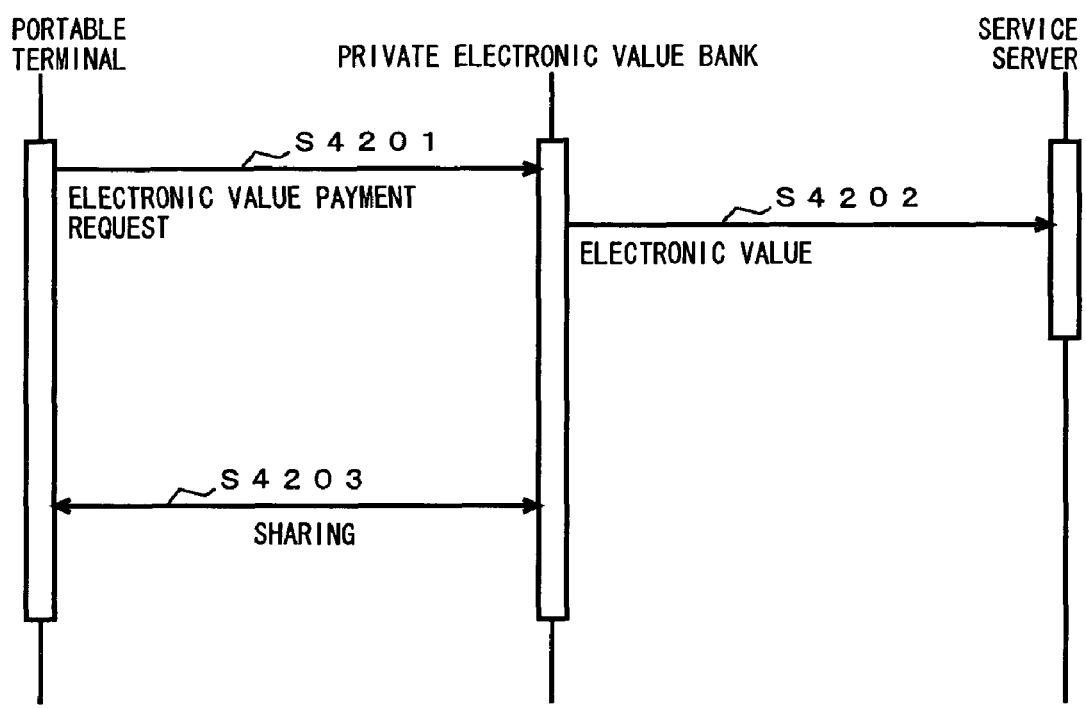
FIG. 42 is a sequence diagram explaining an interaction between the service server, the private electronic value bank, and the portable terminal in the fifth embodiment of the present invention.

FIG. 42 exemplifies the sequence diagram where the interaction between the private electronic value bank 3601, the portable terminal 3602, and the service server 3603 is described chronologically. First, the portable terminal 3602 transmits the electronic value payment request to the private electronic value bank 3601 (step S4201). The private electronic value bank 3601 performs the processing to the service server 3603 to allow it to obtain the electronic value (step S4202). When the portable terminal stores the electronic value obtained by the service server from the private electronic value bank 3601, the electronic value is deleted from the portable terminal (or the status of the electronic value is changed into 'used') (step S4203).

With this embodiment, since the private electronic value bank allows the service server to obtain the electronic value in response to the electronic value payment request transmitted from the portable terminal 3602 to the private electronic value bank 3601, it is possible to use the electronic value stored by the private electronic value bank 3601 with the operation of the portable terminal 3602. Furthermore, when the portable terminal 3602 stores a used electronic value, the electronic value is deleted (or the status of the electronic value is changed to 'used'), so that it is possible to prevent the electronic value from being used twice. Still further, there is no need for the portable terminal 3602 to include a function (for each type of electronic value) to use the electronic value, and the structure of the portable terminal 3602 can be simplified.

Sixth Embodiment

Figure 43:
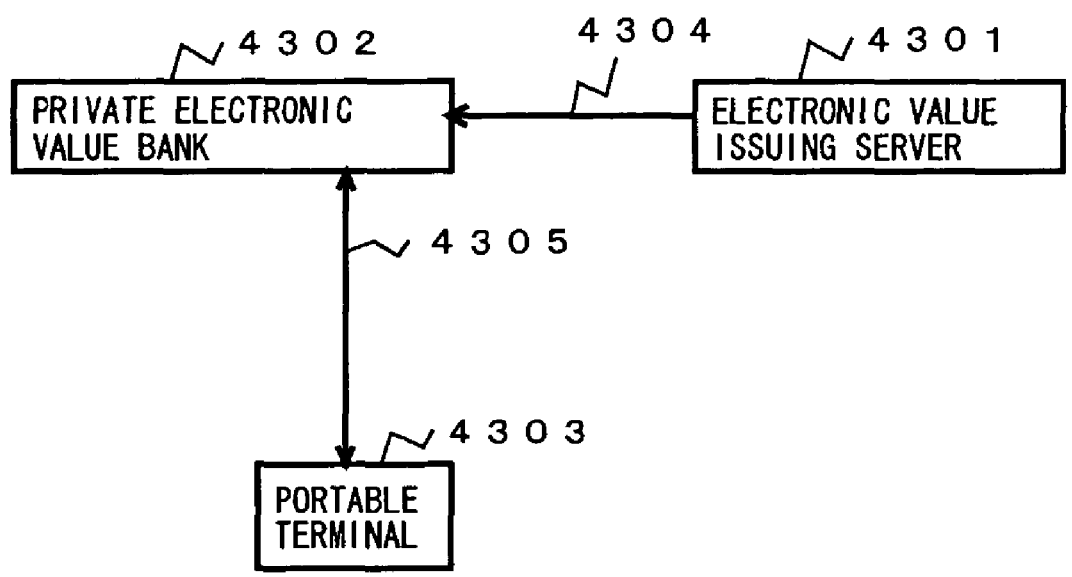
FIG. 43 is a view showing a configuration of the private electronic value bank system in a sixth embodiment of the present invention.

FIG. 43 exemplifies the constitution of the private electronic value bank system according to the sixth embodiment of the present invention. In this embodiment, the private electronic value bank system includes an electronic value issuing server 4301, a private electronic value bank 4302 and a portable terminal 4303, which is the same configuration as the second embodiment and the third embodiment. The characteristic of this embodiment is that the electronic value issuing server 4301 transmits an electronic value update request, which is an update request for the electronic value, to the private electronic value bank 4302 (arrow 4304), and then the updated electronic value is shared between the private electronic value bank 4302 and the portable terminal 4303 (arrow 4305). Accordingly, when the electronic value is an admission ticket, for example, it is possible to change the date of admission in the case where a performance schedule or the like changes.

Figure 44:
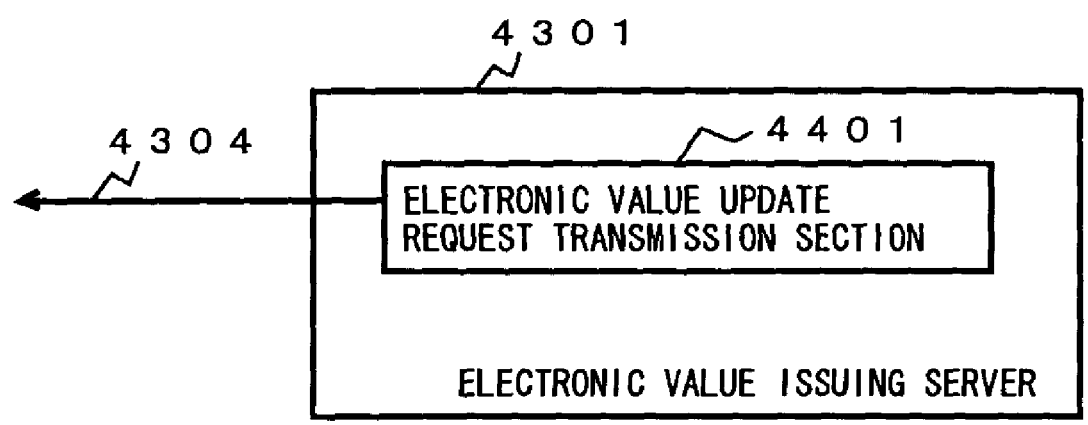
FIG. 44 is a functional block diagram of the electronic value issuing server in the sixth embodiment of the present invention.

FIG. 44 is the functional block diagram of the electronic value issuing server 4301, which exemplifies apart related to this embodiment. The electronic value issuing server 4301 has an electronic value update request transmission section 4401. The electronic value update request transmission section 4401 transmits the electronic value update request, which is an update request for the electronic value stored by the bank electronic value storage section of the private electronic value bank 4302, to the private electronic value bank 4302. For this transmission, it is necessary for the electronic value issuing server 4301 to record the transfer history of how many and what type of electronic value has been transferred and to which private electronic value. If the electronic value of a certain type needs to be changed, its transfer history is referred to and the electronic value update request is transmitted to the private electronic value bank to which the type of electronic value has been transferred.

Figure 45:
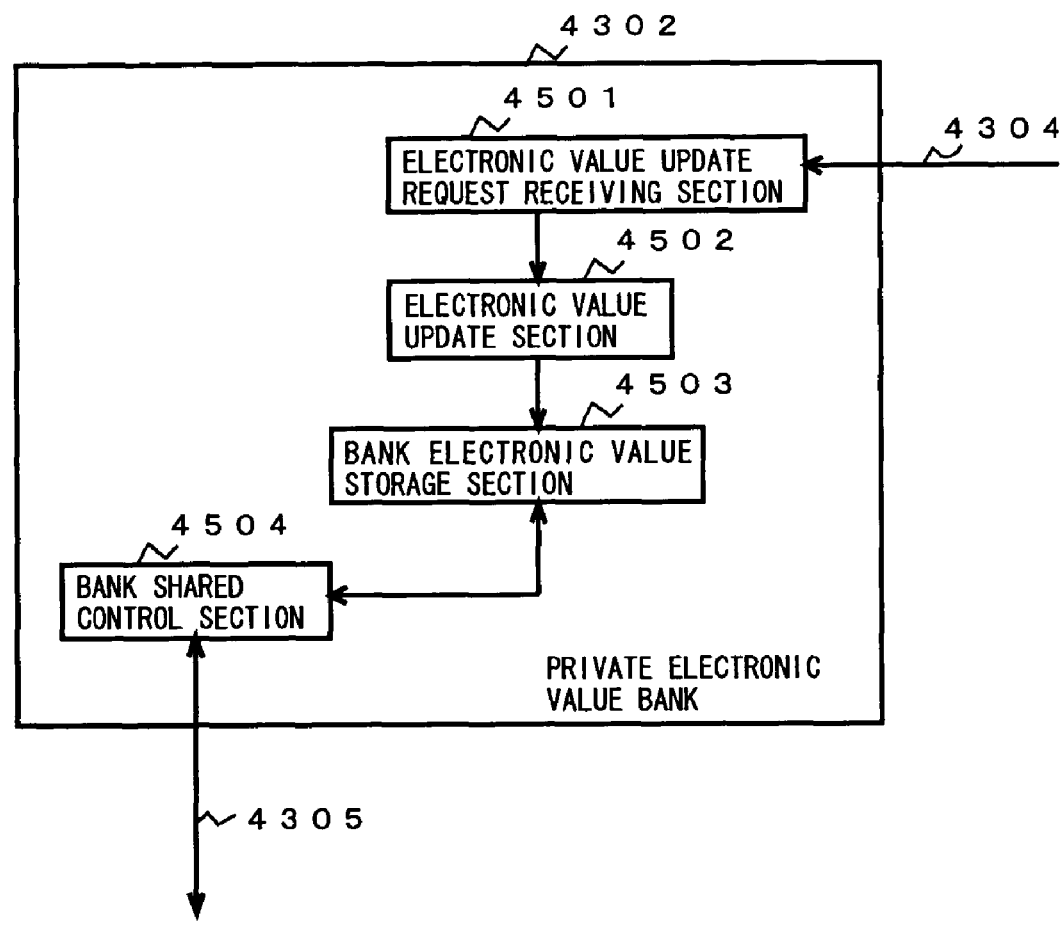
FIG. 45 is a functional block diagram of the private electronic value bank in the sixth embodiment of the present invention.

FIG. 45 is the functional block diagram of the private electronic value bank 4302, which exemplifies a part related to this embodiment. The private electronic value bank 4302 has an electronic value update request receiving section 4501, an electronic value update section 4502, the bank electronic value storage section 4503, and a bank shared control section 4504.

The electronic value update request receiving section 4501 receives the electronic value update request transmitted from the electronic value issuing server 4301.

The electronic value update section 4502 updates the electronic value stored by the bank electronic value storage section 4503 in response to the electronic value update request that the electronic value update request receiving section 4501 received.

The bank electronic value storage section 4503 stores the electronic value. Although it has the same operation as the bank electronic value storage section of the second embodiment and the third embodiment, it is capable of updating the electronic value stored in the electronic value update section 4502.

The bank shared control section 4504 controls the electronic value stored by the bank electronic value storage section and the electronic value stored in the portable terminal such that they are shared. In this embodiment, the bank shared control section 4504, similar to the bank shared control section shown in the second embodiment or the like, transfers an increased electronic value to the portable terminal 4303 when the electronic value has been transferred to the private electronic value bank 4302 and increased. Further, in the case where the private electronic value bank 4302 has used the electronic value, the section deletes the used electronic value if the portable terminal 4303 stores it (or the status of the electronic value is changed to 'used'), or in the case where the portable terminal 4303 has used the electronic value, the section deletes the used electronic value from the private electronic value bank 4302 (or the status of the electronic value is changed to 'used'). Furthermore, as a function unique to this embodiment, in the case where the electronic value updated by the electronic value update section 4502 is stored by the portable terminal 4303 as well, the bank shared control section 4504 also updates the electronic value stored by the portable terminal 4303. For this purpose, the bank shared control section 4504 stores how the electronic value, which is stored by the bank electronic value storage section 4503, has been updated, and updates the electronic value stored by the portable terminal 4303 when it can communicate with the portable terminal 4303.

Figure 46:
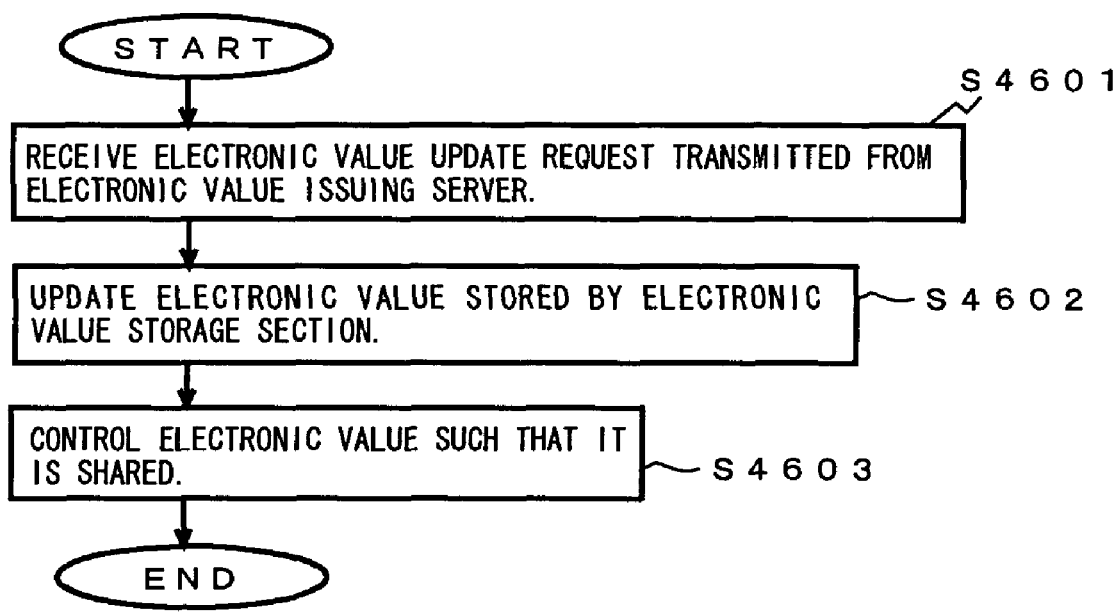
FIG. 46 is a flowchart explaining an operation of the private electronic value bank in the sixth embodiment of the present invention.

FIG. 46 is the flowchart explaining the operation of the private electronic value bank 4302. The electronic value update request receiving section 4501 receives the electronic value update request transmitted from the electronic value issuing server 4301 first (step S4601), and the electronic value update section 4502 updates the electronic value stored by the bank electronic value storage section 4503 in response to the electronic value update request (step S4602). When the private electronic value bank 4302 and the portable terminal 4303 come to the state where they can communicate, the bank shared control section 4504 controls the electronic value such that it is shared by the private electronic value bank 4302 and the portable terminal 4303.

Figure 47:
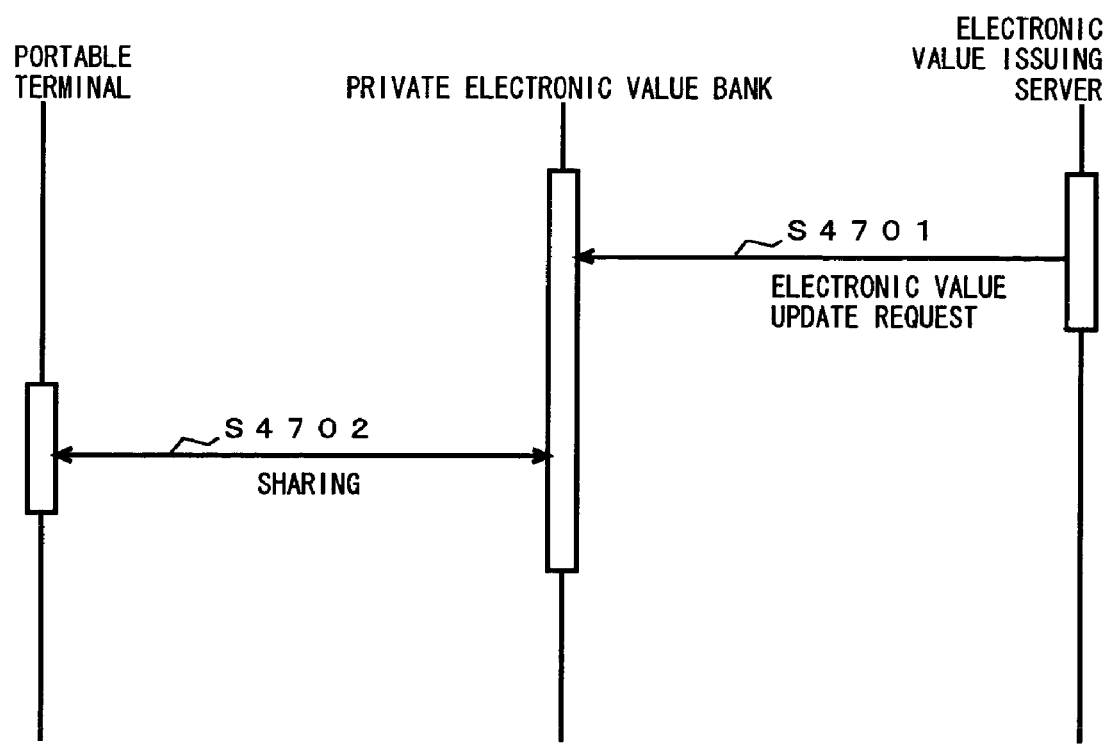
FIG. 47 is a sequence diagram explaining an interaction between the electronic value issuing server, the private electronic value bank, and the portable terminal.

FIG. 47 exemplifies the sequence diagram where the interaction between the electronic value issuing server 4301, the private electronic value bank 4302, and the portable terminal 4303 is described chronologically. The electronic value issuing server 4301 transmits the electronic value update request to the private electronic value bank 4302 (step S4701). Thus, the electronic value stored by the bank electronic value storage section 4503 is updated, and control is performed even after the update has been performed such that the private electronic value bank 4302 and the portable terminal 4303 share the electronic value (step S4702).

With this configuration, it is possible to update the issued electronic value if necessary after the electronic value issuing server has issued the electronic value. Further, by transmitting the electronic value update request to the private electronic value bank 4302, it is possible to update the electronic value in whatever way the electronic value circulates.

Seventh Embodiment

In the sixth embodiment, although the electronic value issuing server can update the issued electronic value unconditionally, it may update the electronic value after inquiring to the owner of the portable terminal whether it should update the electronic value or not and confirming that the owner is in need of an update.

Figure 48:
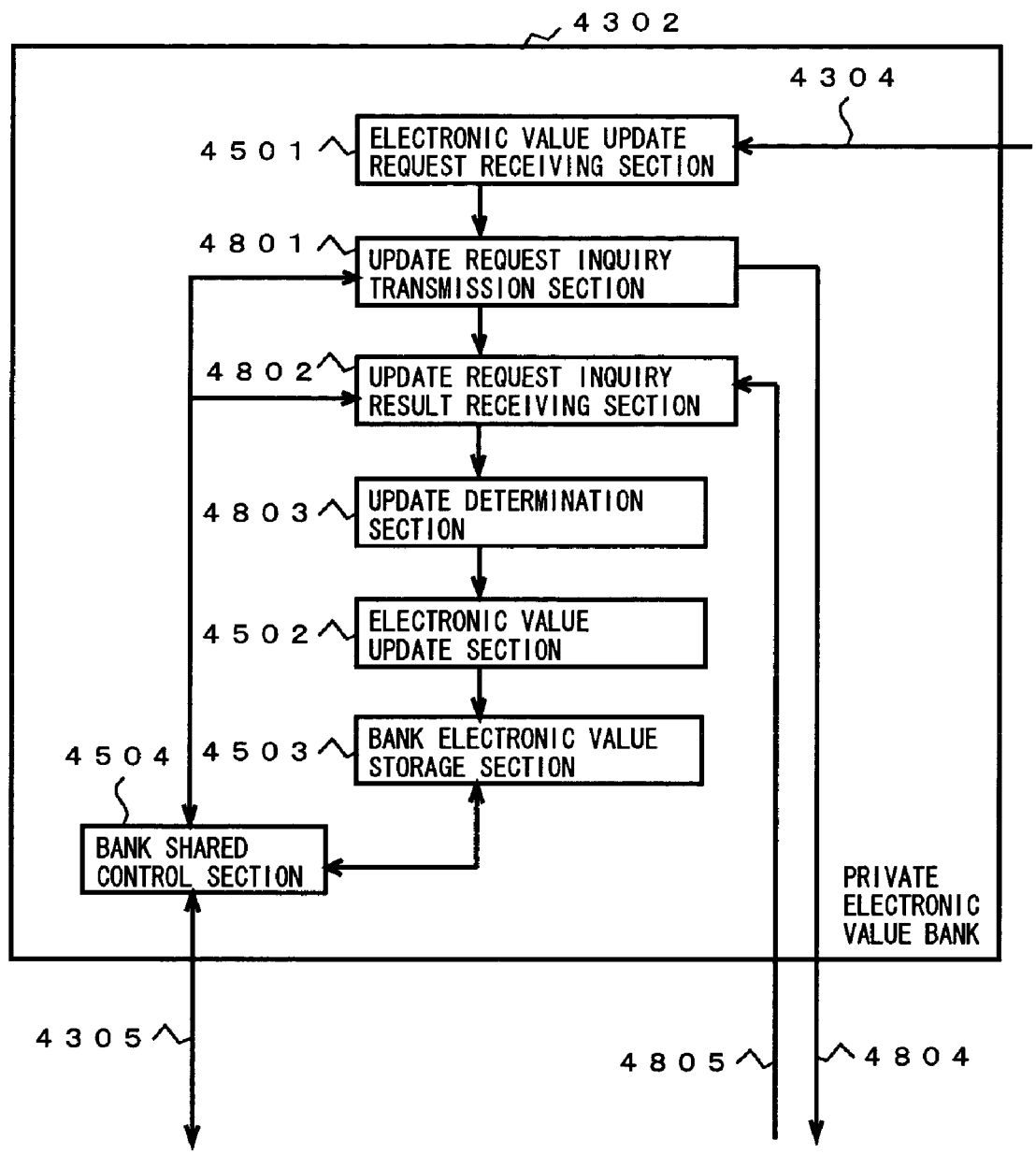
FIG. 48 is a functional block diagram of the private electronic value bank in a seventh embodiment of the present invention.

FIG. 48 exemplifies the functional block diagram of the private electronic value bank 4302 in the case of confirming the need of updating the electronic value. In this embodiment, the private electronic value bank 4302 has the electronic value update request receiving section 4501, an update request inquiry transmission section 4801, an update request inquiry result receiving section 4802, an update determination section 4803, the electronic value update section 4502, the bank electronic value storage section 4503, and the bank shared control section 4504. Out of these sections, description has been made for the electronic value update request receiving section 4501, the electronic value update section 4502, the bank electronic value storage section 4503, and the bank shared control section 4504 in the description of the sixth embodiment.

The update request inquiry transmission section 4801 transmits an update request inquiry that inquires to the portable terminal 4303 whether or not it accepts the electronic value update request received by the electronic value update request receiving section 4501.

The update request inquiry result receiving section 4802 receives an update request inquiry result returned from the portable terminal 4303 in response to the update request inquiry transmitted from the update request inquiry transmission section 4801.

The update determination section 4803 determines the validity for updating the electronic value in the electronic value update section 4502 in response to the update request inquiry result.

Figure 49:
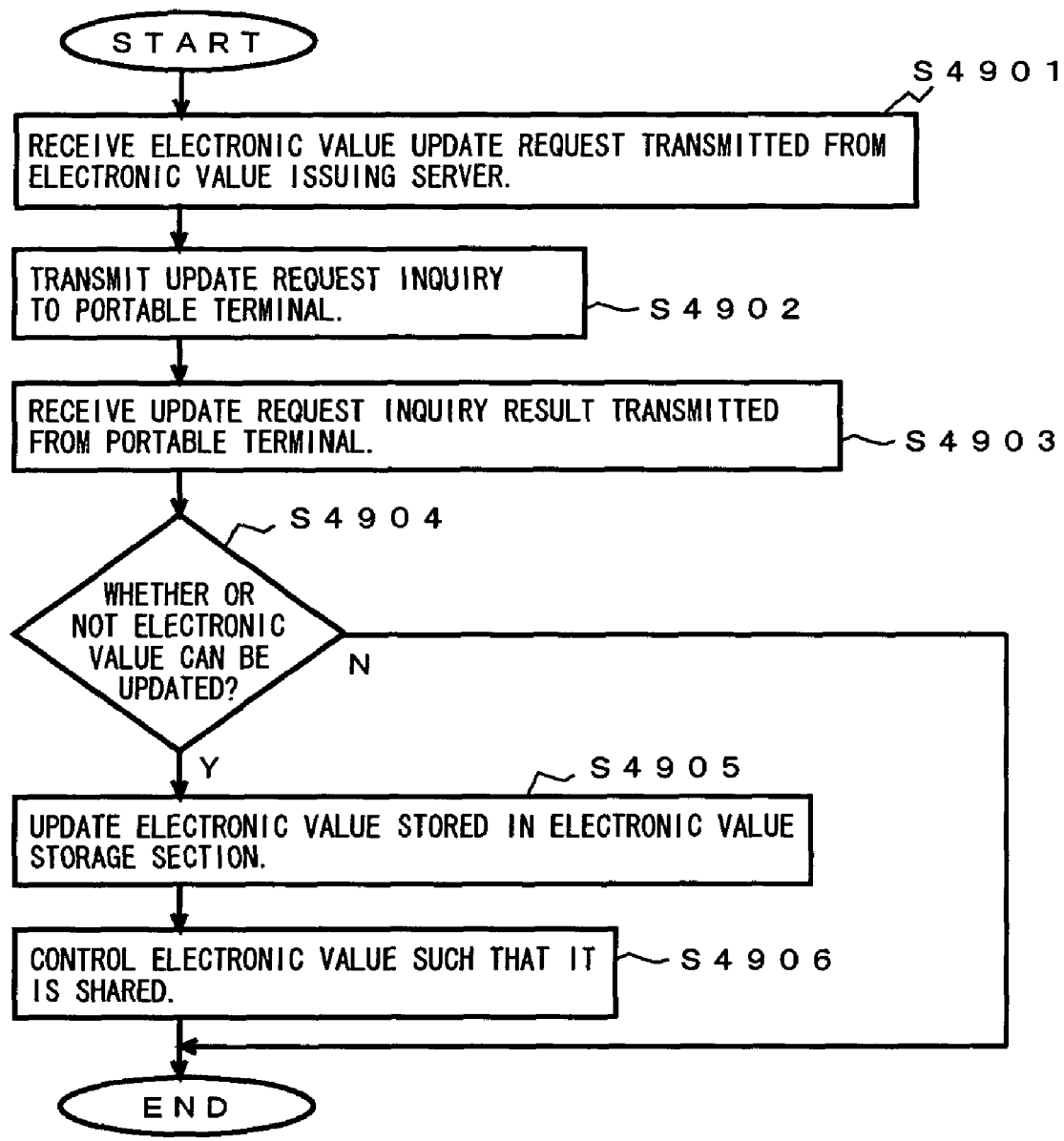
FIG. 49 is a flowchart explaining an operation of the private electronic value bank in the seventh embodiment of the present invention.

FIG. 49 is the flowchart explaining the operation of the private electronic value bank 4302. The electronic value update request receiving section 4501 receives the electronic value update request transmitted from the electronic value issuing server 4301 first (step S4901), and the update request inquiry transmission section 4801 transmits the update request inquiry to the portable terminal 4303 (step S4902). Next, the update request inquiry result receiving section 4802 receives the update request inquiry result returned from the portable terminal 4303 (step S4903), the update determination section determines whether the electronic value can be updated (step S4904), the electronic value update section 4502 updates the electronic value stored by the bank electronic value storage section 4503 if an update is possible (step S4903), and the bank shared control section 4504 controls the electronic value so as to be shared (step S4906).

Although the processing ends without performing anything if an update is impossible as a result of determining whether or not the electronic value can be updated in FIG. 49, a message that an update cannot be done may be transmitted to the electronic value issuing server 4301, for example.

Figure 50:
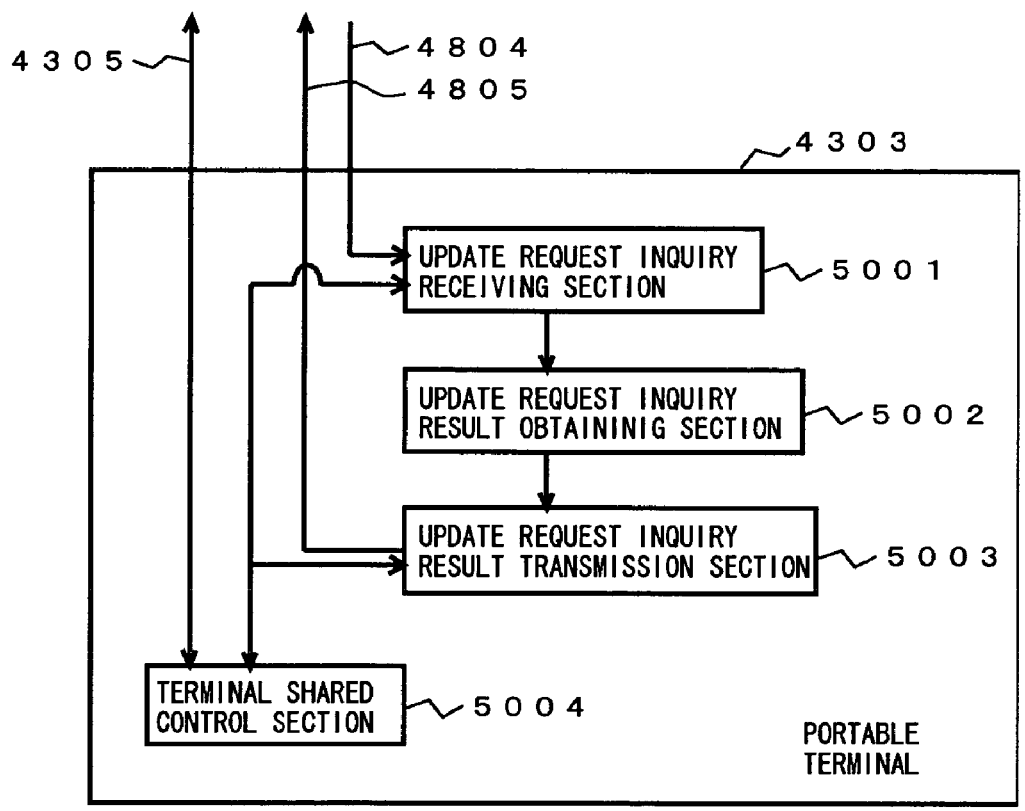
FIG. 50 is a functional block diagram of the portable terminal in the seventh embodiment of the present invention.

FIG. 50 exemplifies the functional block diagram of the portable terminal 4303 in the case of confirming the need to update the electronic value. The portable terminal 4303 has an update request inquiry receiving section 5001, an update request inquiry result obtaining section 5002, an update request inquiry result transmission section 5003, and a terminal shared control section 5004 as a function unique to this embodiment.

The update request inquiry receiving section 5001 receives the update request inquiry transmitted from the private electronic value bank 4302.

The update request inquiry result obtaining section 5002 obtains the update request inquiry result, which is information regarding the validity of the request for updating the electronic value, for the update request inquiry received by the update request inquiry receiving section 5001. For example, the content of the update request inquiry received by the update request inquiry receiving section 5001 is displayed on a display section, which the portable terminal 4303 has, to ask the owner of the portable terminal 4303 the validity of update, and the section 5002 obtains the update request inquiry result by obtaining the operation of the owner.

The update request inquiry result transmission section 5003 transmits the update request inquiry result obtained by the update request inquiry result obtaining section 5002 to the private electronic value bank 4302.

The terminal shared control section 5004 updates the electronic value stored by the portable terminal 4303 in the case where the electronic value stored by the bank electronic value storage section 4503 of the private electronic value bank 4302 is updated.

Figure 51:
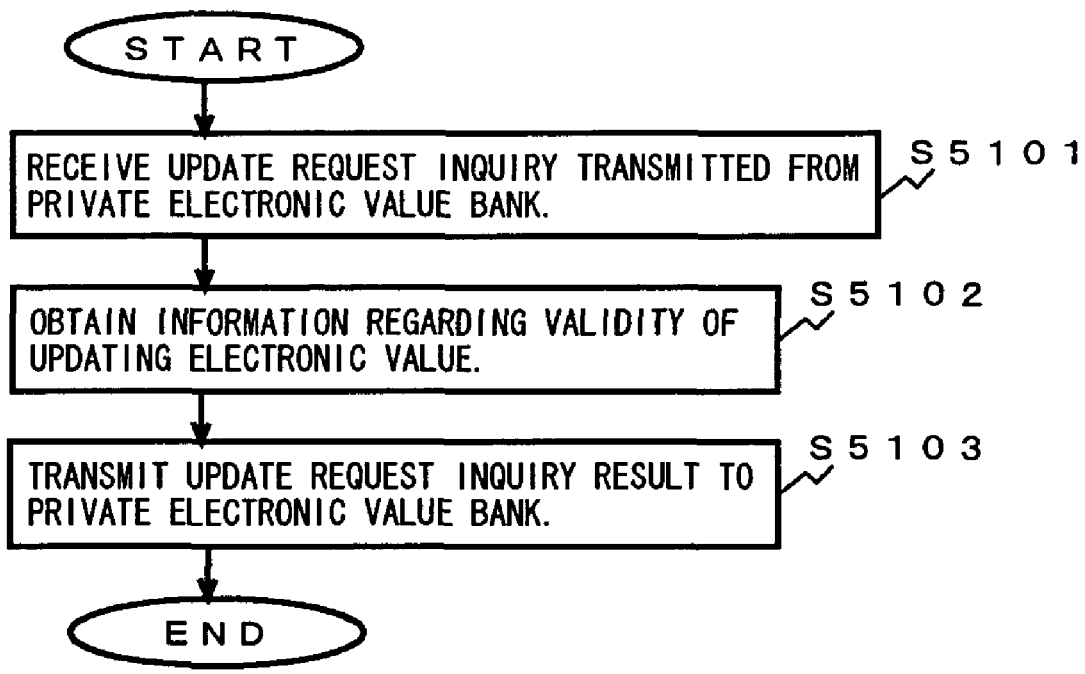
FIG. 51 is a flowchart explaining an operation of the portable terminal in the seventh embodiment of the present invention.

FIG. 51 is the flowchart explaining the operation of the portable terminal 4303. The update request inquiry receiving section 5001 receives the update request inquiry transmitted from the private electronic value bank 4302 first (step S5101), the update request inquiry result obtaining section 5002 obtains the update request inquiry result that is the information regarding the validity of the request for updating the electronic value (step S5102), and the update request inquiry result transmission section 5003 transmits the update request inquiry result to the private electronic value bank 4302.

Figure 52:
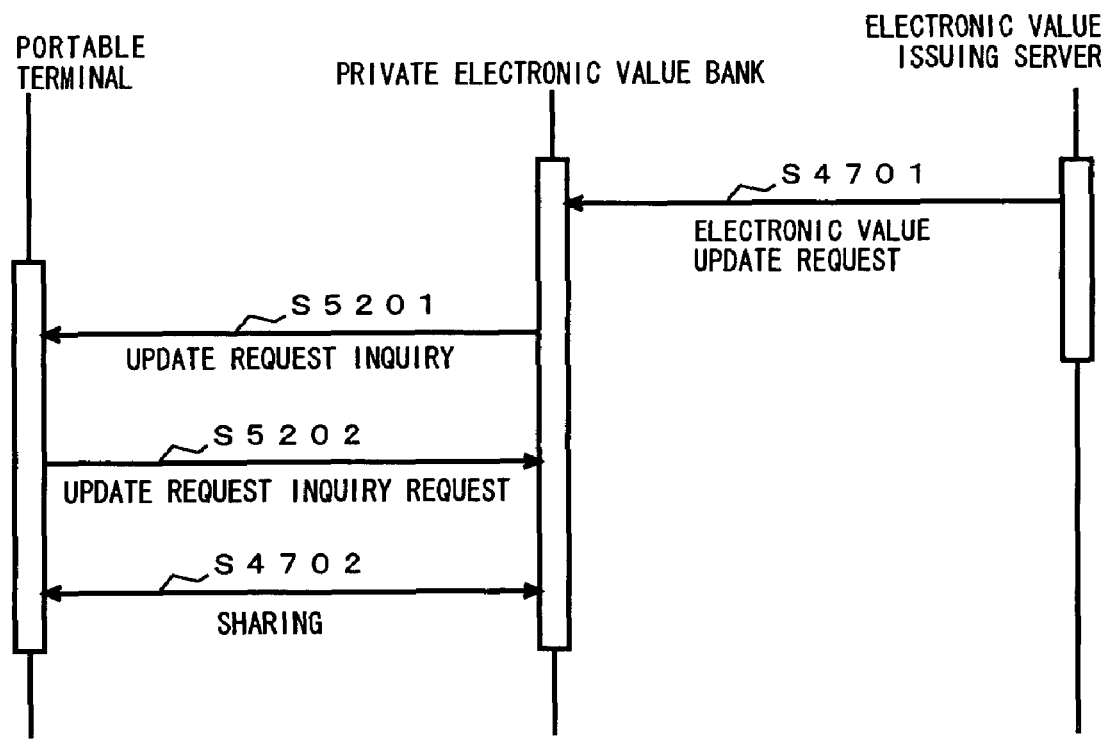
FIG. 52 is a sequence diagram explaining an interaction between the electronic value issuing server, the private electronic value bank, and the portable terminal in the seventh embodiment of the present invention.

FIG. 52 exemplifies the sequence diagram where the interaction between the electronic value issuing server 4301, the private electronic value bank 4302 and the portable terminal 4303 is described chronologically. The electronic value issuing server 4301 transmits the electronic value update request to the private electronic value bank 4302 first (step S4701), the private electronic value bank 4302 transmits the update request inquiry to the portable terminal 4303 (step S5201), and the portable terminal 4303 transmits the update request inquiry result to the private electronic value bank 4302 (step S5202). Then, control is performed for sharing the electronic value between the private electronic value bank 4302 and the portable terminal 4303 (step S4702).

With this configuration, the issued electronic value is prevented from being updated before the owner of the portable terminal knows, and an update that the owner of the portable terminal does not want is prevented from being performed.

Eighth Embodiment

Figure 54:
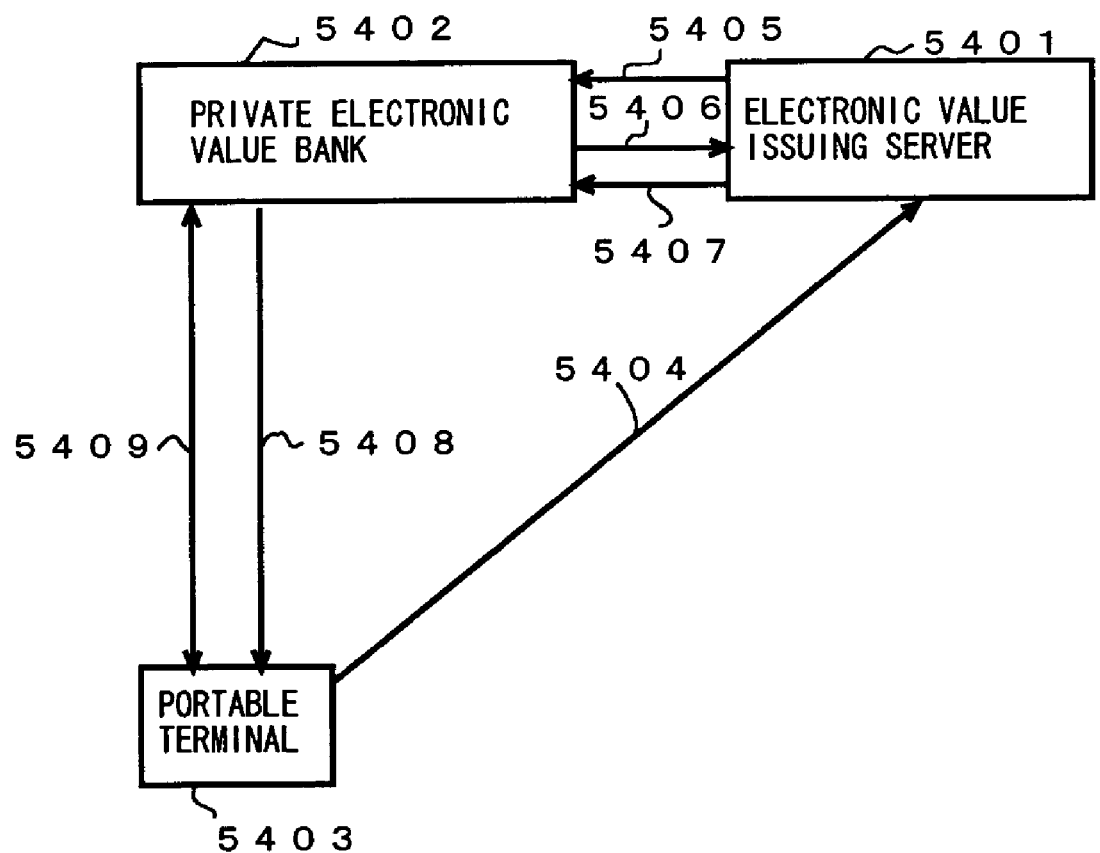
FIG. 54 is a view showing a constitution of the private electronic value bank system in an eighth embodiment of the present invention.

FIG. 54 exemplifies the configuration of the private electronic value bank system according to the eighth embodiment of the present invention. In this embodiment, the private electronic value bank system includes an electronic value issuing server 5401, a private electronic value bank 5402 and a portable terminal 5403. In this embodiment, the portable terminal 5403 outputs an electronic value issue request to the electronic value issuing server 5401 (arrow 5404), and the electronic value issuing server 5401 transmits the electronic value purchase instruction information to the private electronic value bank 5402 (arrow 5405), the processing for settlement is performed between the electronic value issuing server 5401 and the private electronic value bank 5402 (arrow 5406), and the electronic value issuing server 5401 transfers the electronic value to the private electronic value bank 5402 (arrow 5407). Then, the private electronic value bank 5402 transmits the electronic value to the portable terminal 5403 (arrow 5408), and control for sharing the electronic value is performed (arrow 5409).

Figure 55:
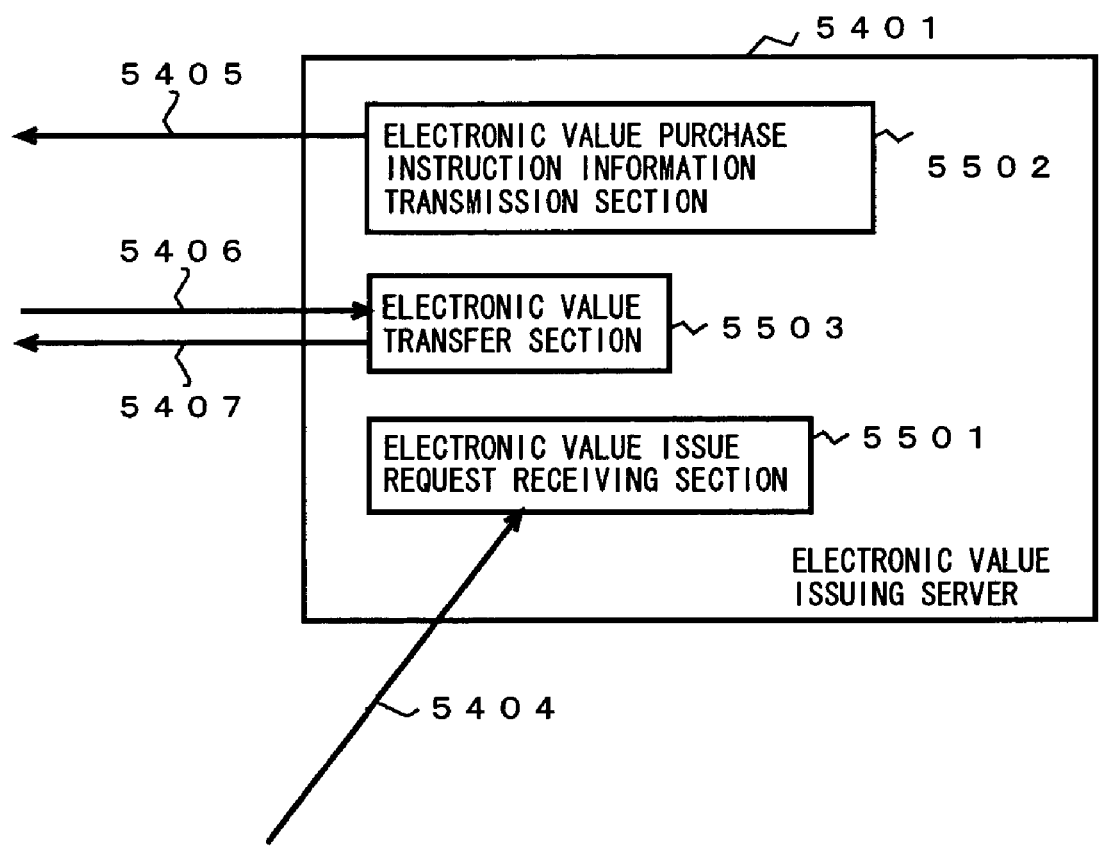
FIG. 55 is a functional block diagram of the electronic value issuing server in the eighth embodiment of the present invention.

FIG. 55 exemplifies the functional block diagram of the electronic value issuing server 5401. In this embodiment, the electronic value issuing server 5401 has an electronic value issue request receiving section 5501, an electronic value purchase instruction information transmission section 5502, and an electronic value transfer section 5503.

Figure 72:
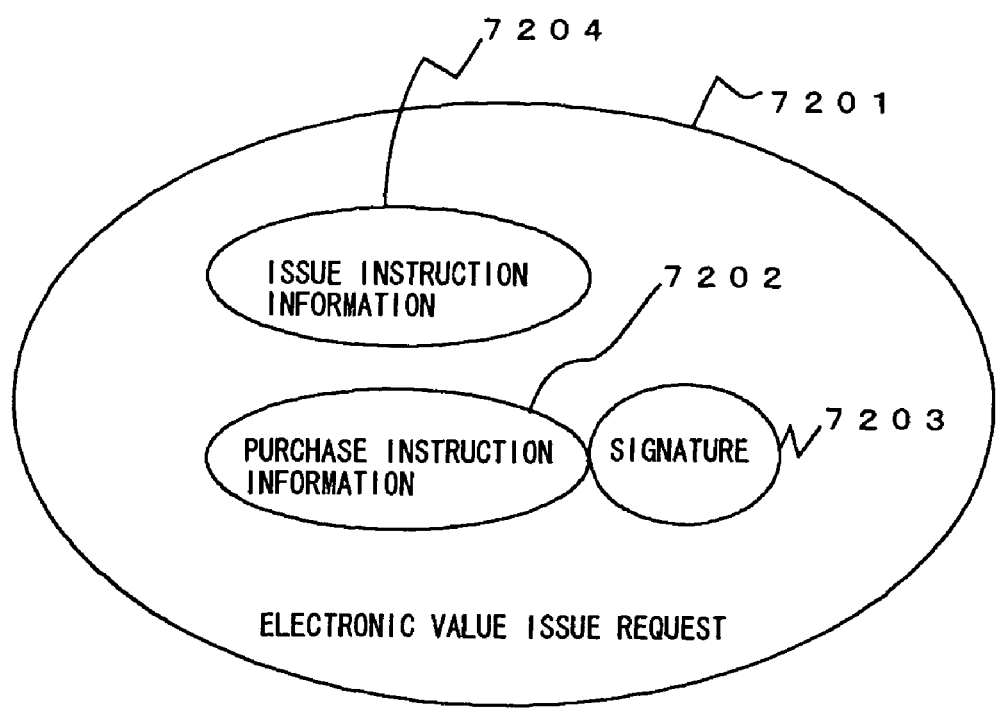
FIG. 72 is a view showing a structure of an electronic value issue request in the eighth embodiment of the present invention.
Figure 73:
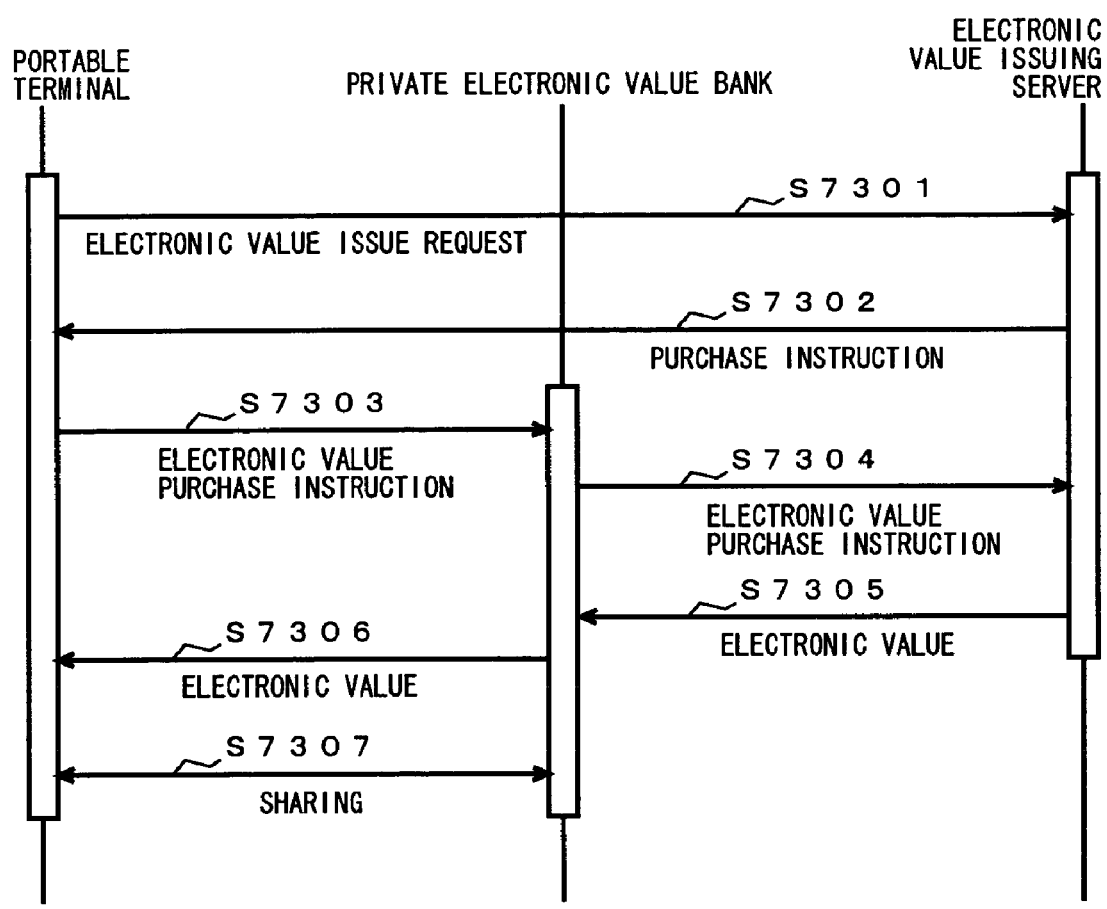
FIG. 73 is a sequence diagram showing an interaction between the electronic value issuing server, the private electronic value bank, and the portable terminal in the ninth embodiment of the present invention.

The electronic value issue request receiving section 5501 receives the electronic value issue request from the portable terminal 5403. The electronic value issue request includes the purchase instruction information added with the electronic signature verifiable in the private electronic value bank 5402 and the issue instruction information specifying the private electronic value bank 5402 that is an issue destination of the electronic value. FIG. 72 schematically exemplifies the electronic value issue request. In FIG. 72, an electronic value issue request 7201 includes purchase instruction information 7202 including an electronic signature 7203 and issue instruction information 7204. The issue instruction information includes specification of the private electronic value bank to which the purchase instruction information should be sent, information for issue reservation of the electronic value such as how many of which electronic value is to be purchased, or the like. The purchase instruction information 7202 includes information necessary for the private electronic value bank to purchase the electronic value, which includes information as to how many of which electronic value should be purchased from which electronic value issuing server. With such an electronic value issue request 7201, it is possible to send the purchase instruction information 7202 to the private electronic value bank that the issue instruction information 7204 has specified. Note that the electronic signature is information for determining the authenticity of data, which is data encrypted by a private key of a public key encryption system for a hash value of data of a hash function where finding two different data such that hash values match is difficult in a sense of complexity. In this embodiment, the electronic signature 7203 added to the purchase instruction information 7202 is one that has been encrypted by the private key of the portable terminal 5403.

Further, it is possible to make the purchase of instruction information 7202 include information for settlement such as a credit card number in order for the private electronic value bank 5402 to receive issuance of the electronic value. However, the portable terminal 5403 and the private electronic value bank 5402 may store or receive the credit card number, but a problem occurs when the electronic value issuing server 5401 knows the number. Therefore, the purchase instruction information 7202 may be encrypted such that the private electronic value bank 5402 can decrypt it but the electronic value issuing server 5401 cannot decrypt it. Specifically, the information may be encrypted by a common key between the portable terminal 5403 and the private electronic value bank 5402, or may be encrypted by a public key (this public key is stored by the bank shared control section, for example) of the private electronic value bank 5402.

The electronic value purchase instruction information transmission section 5502 interprets the electronic value issue request received by the electronic value issue request receiving section 5501, and transmits the electronic value purchase instruction information to the private electronic value bank 5402 specified by the issue instruction information.

The electronic value transfer section 5503 transfers the electronic value to the private electronic value bank 5402 according to the processing for settlement performed with the private electronic value bank in response to the electronic value purchase instruction information transmitted from the electronic value purchase instruction information transmission section 5502. Specifically, the settlement processing to pay the price is performed between the private electronic value bank 5402, to which the electronic value purchase instruction information transmission section 5502 has sent the electronic value purchase instruction information, and the electronic value issuing server 5401, and as a result, the electronic value issuing server 5401 transfers the electronic value to the private electronic value bank 5402.

Figure 56:
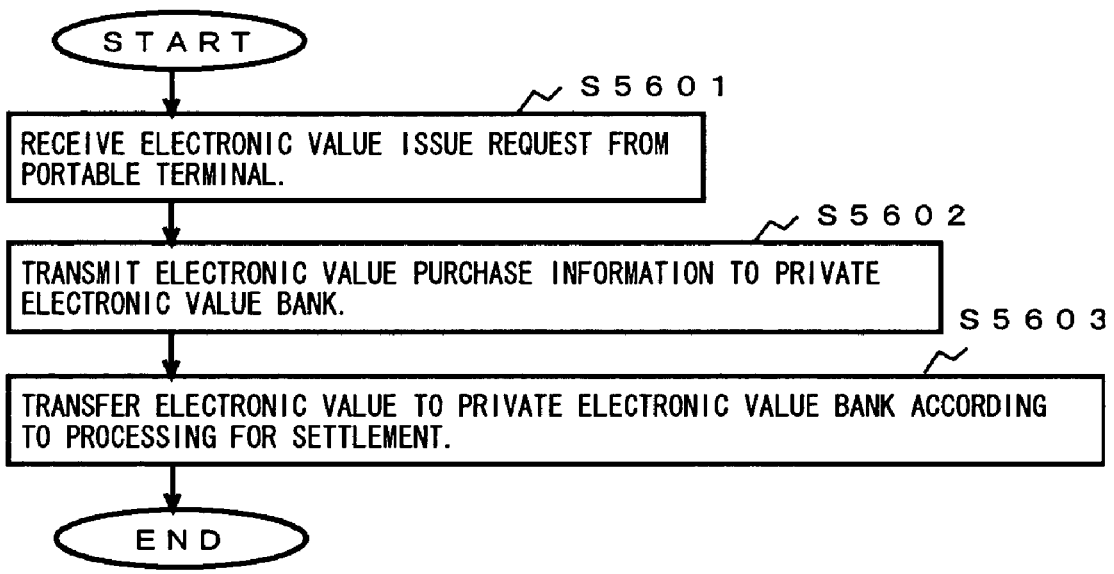
FIG. 56 is a flowchart explaining an operation of the electronic value issuing server in the eighth embodiment of the present invention.

FIG. 56 is the flowchart explaining the operation of the electronic value issuing server 5401. The electronic value issue request receiving section 5501 receives the electronic value issue request from the portable terminal 5403 first (step S5601). Because the electronic value issue request includes the issue instruction information that specifies the private electronic value bank 5402, the electronic value purchase instruction information transmission section 5502 transmits the electronic value purchase information to the private electronic value bank 5402 that has been specified according to the information (step S5602). Then, the private electronic value bank 5402 to which the electronic value purchase information has been sent performs the processing for settlement, and the electronic value transfer section 5503 transfers the electronic value to the private electronic value bank according to the processing.

Figure 57:
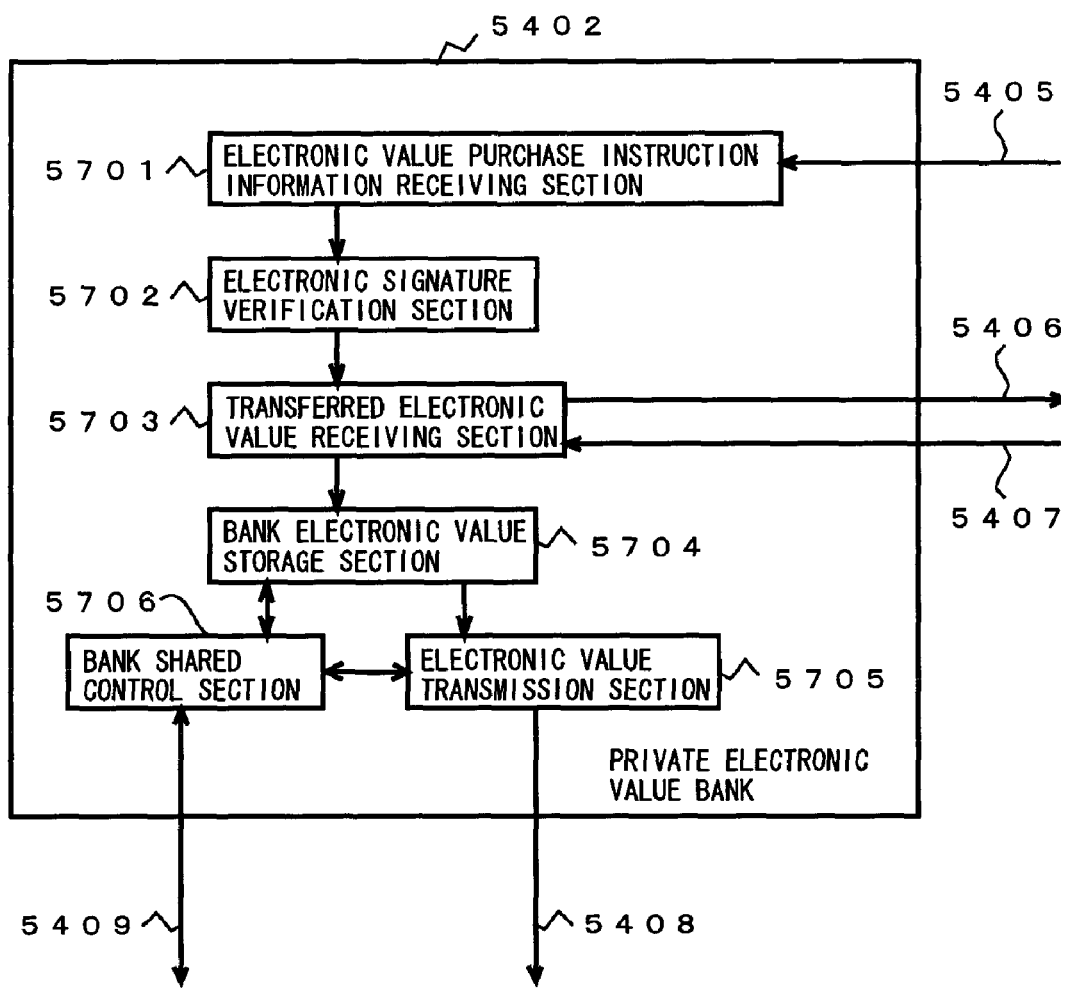
FIG. 57 is a functional block diagram of the private electronic value bank in the eighth embodiment of the present invention.

FIG. 57 exemplifies the functional block diagram of the private electronic value bank 5402. In this embodiment, the private electronic value bank 5402 has an electronic value purchase instruction information receiving section 5701, an electronic signature verification section 5702, a transferred electronic value receiving section 5703, a bank electronic value storage section 5704, an electronic value transmission section 5705, and a bank shared control section 5706.

The electronic value purchase instruction information receiving section 5701 receives the purchase instruction information transmitted from the electronic value issuing server 5401, and decrypts the purchase instruction information when it is encrypted. This purchase instruction information is added to the electronic signature, making it is possible to determine whether or not the purchase instruction information is authentic.

The electronic signature verification section 5702 verifies the electronic signature included in the purchase instruction information received by the electronic value purchase instruction information receiving section. As described above, since the electronic signature included in the purchase instruction information has been signed by the private key (this private key is stored by the terminal shared control section, for example) of the portable terminal 5403 in this embodiment, the electronic signature can be verified using the public key in the certificate of the portable terminal 5403.

The transferred electronic value receiving section 5703 receives the electronic value transferred from the electronic value issuing server 5401 according to the processing for settlement, which is performed with the electronic value issuing server 5401, in response to the verification of the electronic signature in the electronic signature verification section 5702. Specifically, when verification of the electronic signature in the electronic signature verification section 5702 affirms the authenticity of the purchase instruction information, the processing for settlement to receive transfer of the electronic value from the electronic value issuing server 5401 is performed, and the transferred electronic value receiving section 5703 receives the electronic value transferred from the electronic value issuing server 5401 when the processing ends.

The bank electronic value storage section 5704 stores the electronic value.

The electronic value transmission section 5705 transmits the electronic value of the bank electronic value storage section 5704 to the portable terminal 5403.

The bank shared control section 5706 controls the value stored by the bank electronic value storage section 5704 and the electronic value stored by the portable terminal such that they are shared.

Figure 58:
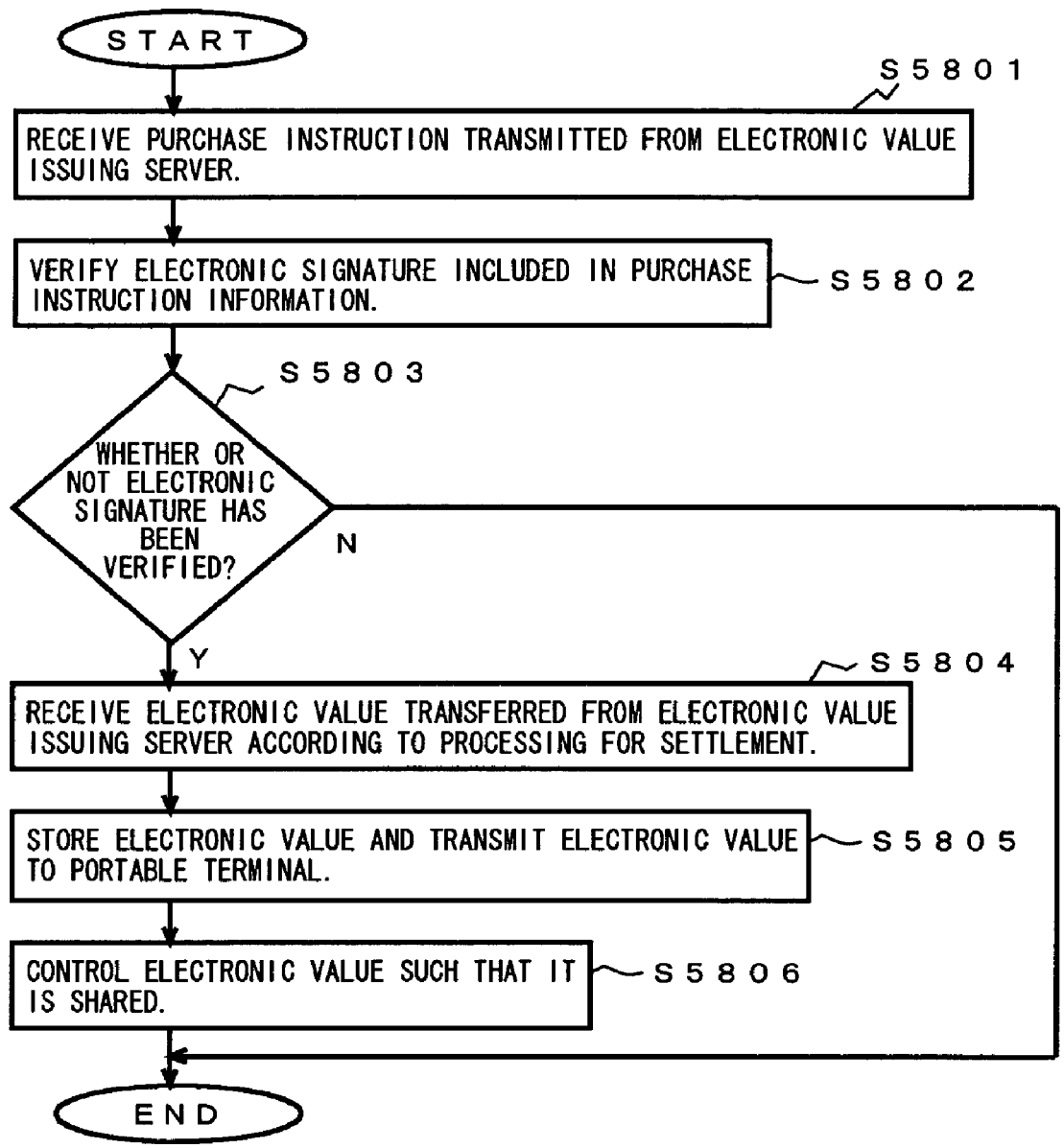
FIG. 58 is a flowchart explaining an operation of the private electronic value bank in the eighth embodiment of the present invention.

FIG. 58 is the flowchart explaining the operation of the private electronic value bank. The electronic value purchase instruction information receiving section 5701 receives the purchase instruction information transmitted from the electronic value issuing server 5401 (step S5801). The electronic signature verification section 5702 verifies the electronic signature included in the purchase instruction information (step S5802). When the electronic signature is verified (when step S5803 branches to Y), the purchase instruction information is proven to have been output from the portable terminal 5403, so that the transferred electronic value receiving section 5703 receives the electronic value transferred from the electronic value issuing server 5401 according to the processing for settlement (step S5804). The bank electronic value storage section 5704 stores the received electronic value, and the electronic value transmission section 5705 transmits the electronic value to the portable terminal 5403 (step S5805). Then, the bank shared control section 5706 controls the electronic value such that the private electronic value bank 5402 and the portable terminal 5403 share it (step S5806). Although the processing ends without performing anything if the electronic signature has not been verified in FIG. 58, a message that the purchase instruction added with the electronic signature, which could not be verified, has been received may be transmitted to the electronic value issuing server 5401 or the portable terminal 5403, and thus calling to attention that there may have been a malfunction or an attempt to breach security.

Figure 59:
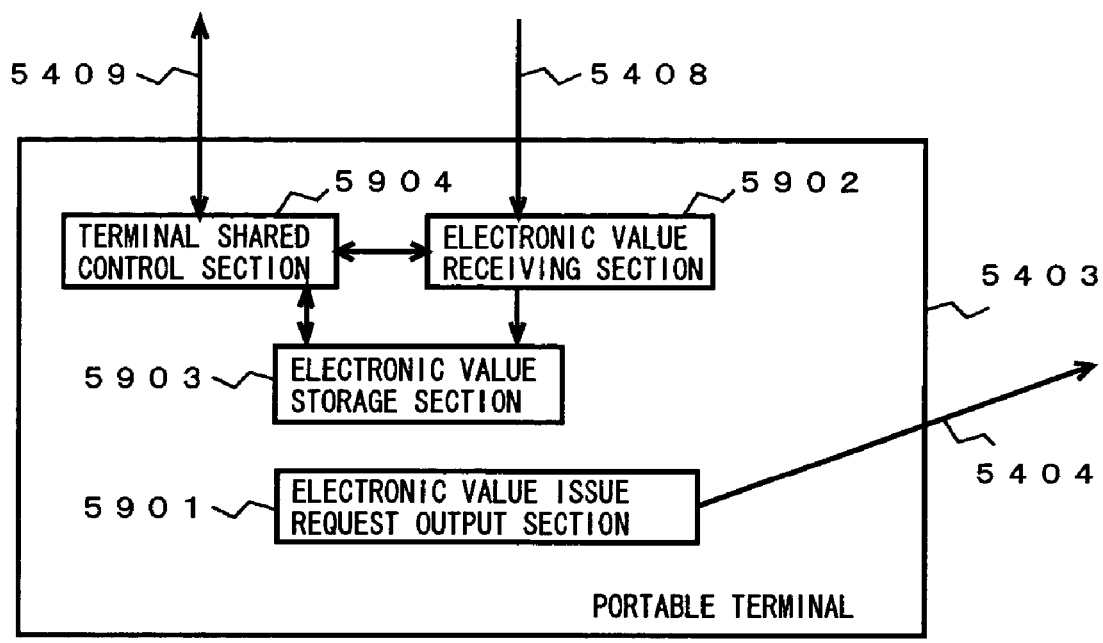
FIG. 59 is a functional block diagram of the portable terminal in the eighth embodiment of the present invention.

FIG. 59 exemplifies the functional block diagram of the portable terminal 5403. In this embodiment, the personal terminal 5403 has an electronic value issue request output section 5901, an electronic value receiving section 5902, an electronic value storage section 5903 and a terminal shared control section 5904.

The electronic value issue request output section 5901 outputs the electronic value issue request, which includes the purchase instruction information added with the electronic signature verifiable in the private electronic value bank 5402 and the issue instruction information specifying the private electronic value bank 5402 that is an issue destination of the electronic value, to the electronic value issuing server. At this point, the purchase instruction information may be encrypted such that it can be decrypted in the private electronic value bank.

The electronic value receiving section 5902 receives the electronic value transmitted from the private electronic value bank 5402.

The electronic value storage section 5903 stores the electronic value.

The terminal shared control section 5904 controls the electronic value stored by the bank electronic value storage section 5704 and the electronic value stored by the portable terminal such that they are shared.

Figure 60:
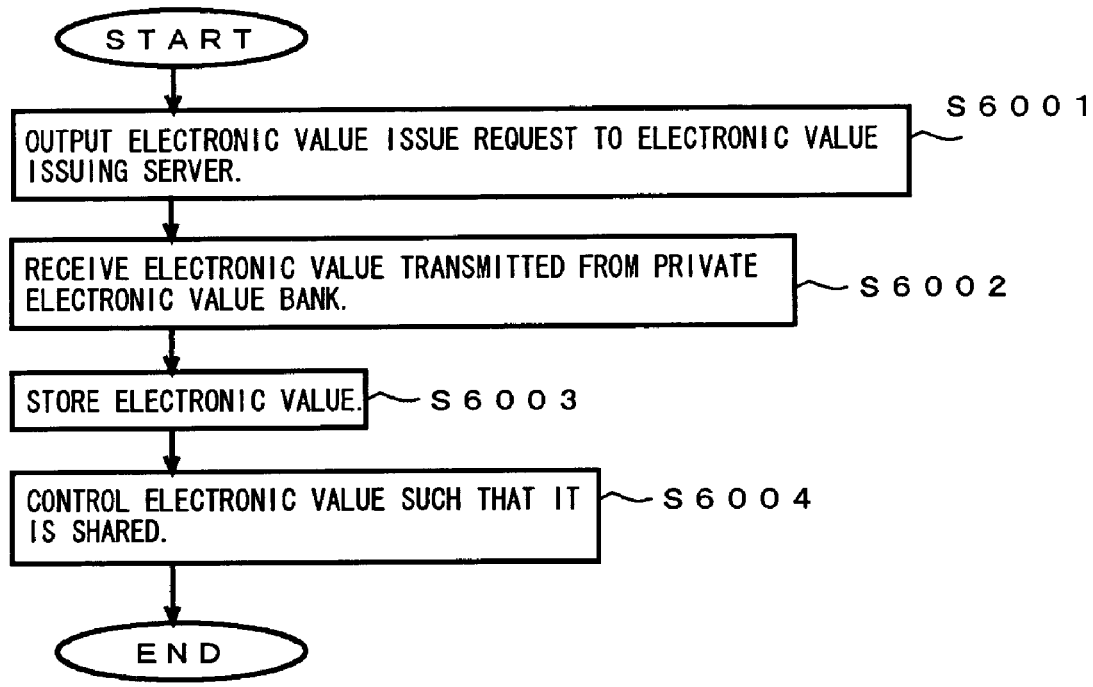
FIG. 60 is a flowchart explaining an operation of the portable terminal in the eighth embodiment of the present invention.

FIG. 60 is the flowchart explaining the operation of the portable terminal 5403. The electronic value issue request output section 5901 outputs the electronic value issue request to the electronic value issuing server 5401 (step S6001). Then, the electronic value receiving section 5902 receives the electronic value transmitted from the private electronic value bank 5402.

The electronic value storage section 5903 stores the received electronic value. Then, the terminal shared control section 5904 controls the electronic value such that the bank electronic value storage section 5704 and the electronic value storage section 5903 share it.

Figure 61:
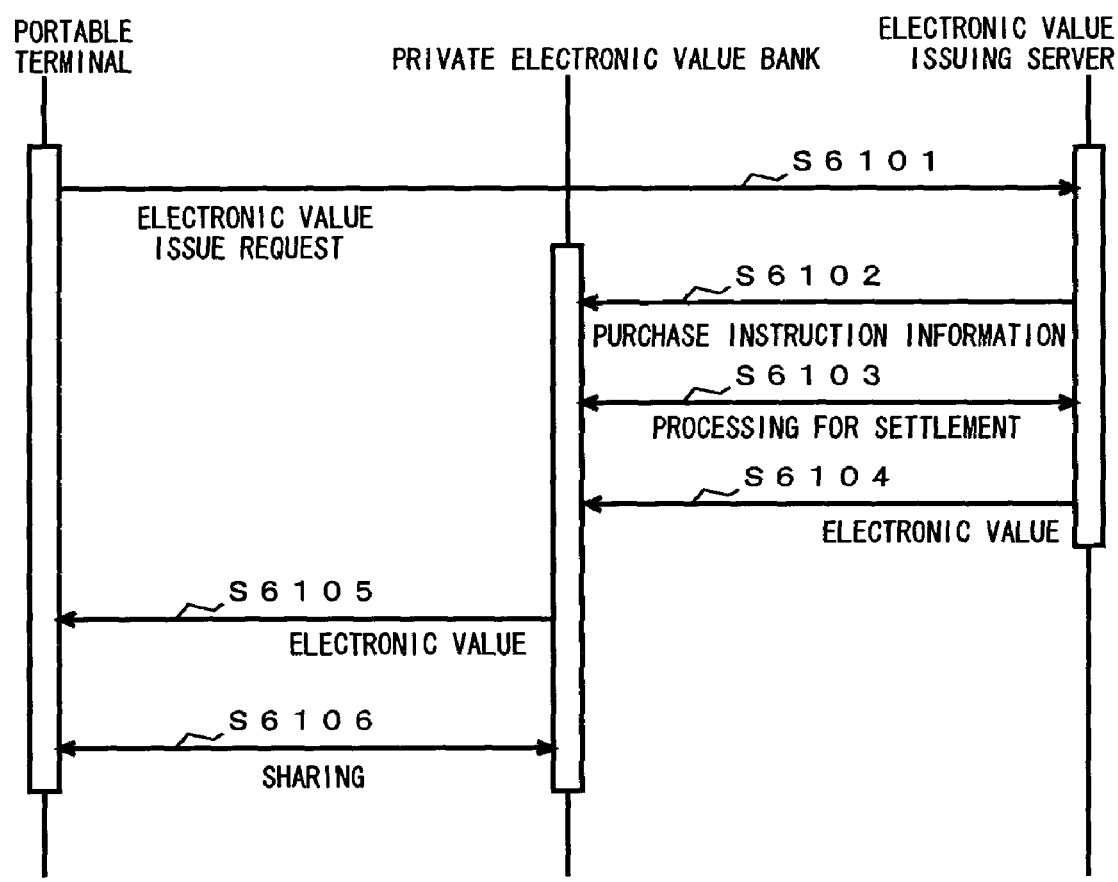
FIG. 61 is a sequence diagram explaining an interaction between the electronic value issuing server, the private electronic value bank, and the portable terminal in the eighth embodiment of the present invention.

FIG. 61 is the sequence diagram exemplifying the interaction between the electronic value issuing server 5401, the private electronic value bank 5402 and the portable terminal 5403 in this embodiment. The portable terminal 5403 outputs the electronic value issue request to the electronic value issuing server 5401 first (step S6101). The electronic value issuing server 5401 transmits the purchase instruction information to the private electronic value bank 5402 (step S6102). Then, the processing for settlement is performed between the electronic value issuing server 5401 and the private electronic value bank 5402 (step S6103), and the electronic value issuing server 5401 transfers the electronic value to the private electronic value bank 5402 (step S6104). The private electronic value bank 5402 transfers the electronic value to the portable terminal 5403 (step S6105), and the private electronic value bank 5402 and the portable terminal 5403 perform control for sharing it (step S6106).

Figure 74:
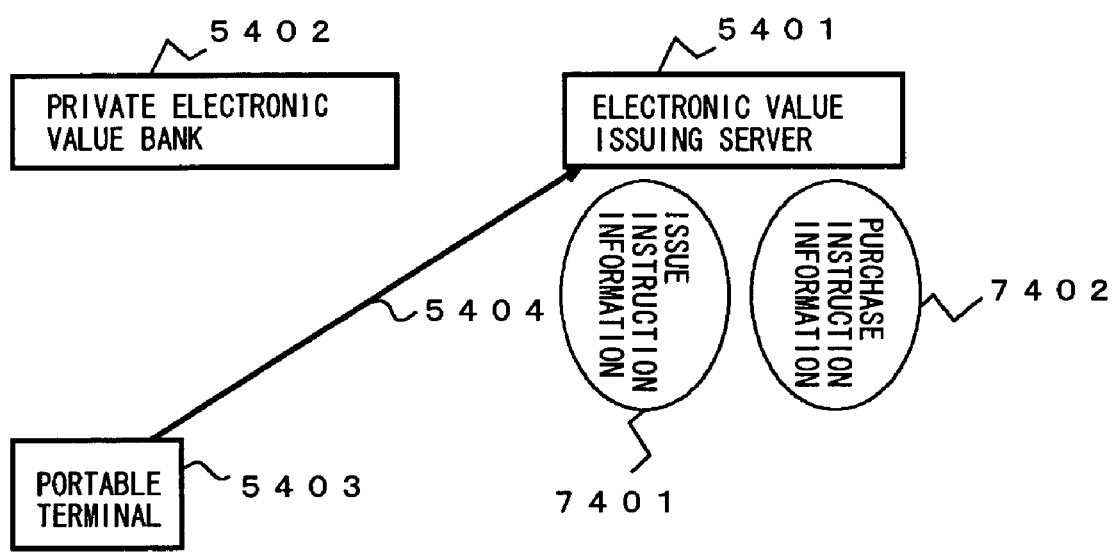
FIG. 74 is a view schematically showing data transfer in the eighth embodiment of the present invention.
Figure 75:
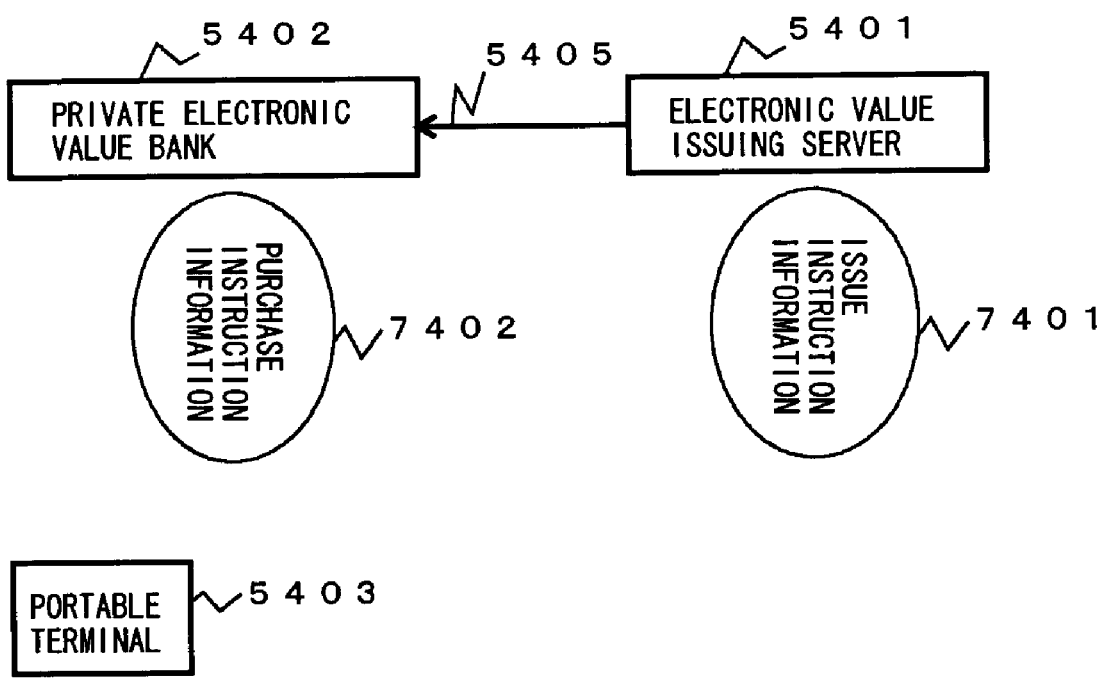
FIG. 75 is a view schematically showing data transfer in the eighth embodiment of the present invention.
Figure 76:
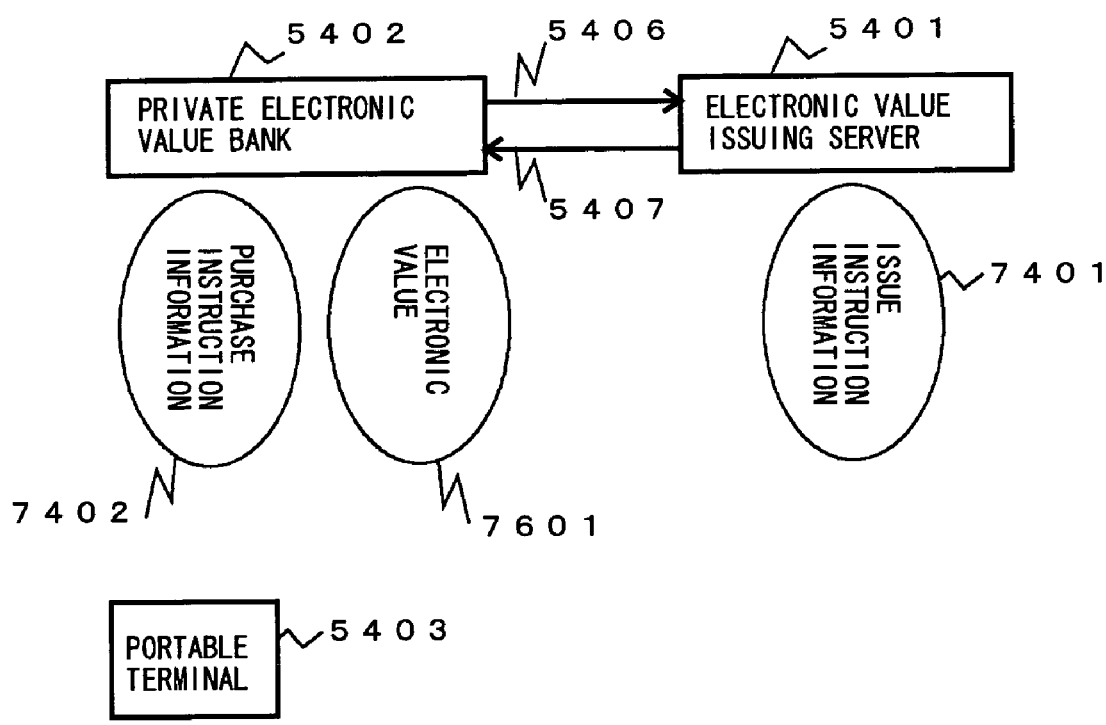
FIG. 76 is a view schematically showing data transfer in the eighth embodiment of the present invention.
Figure 77:
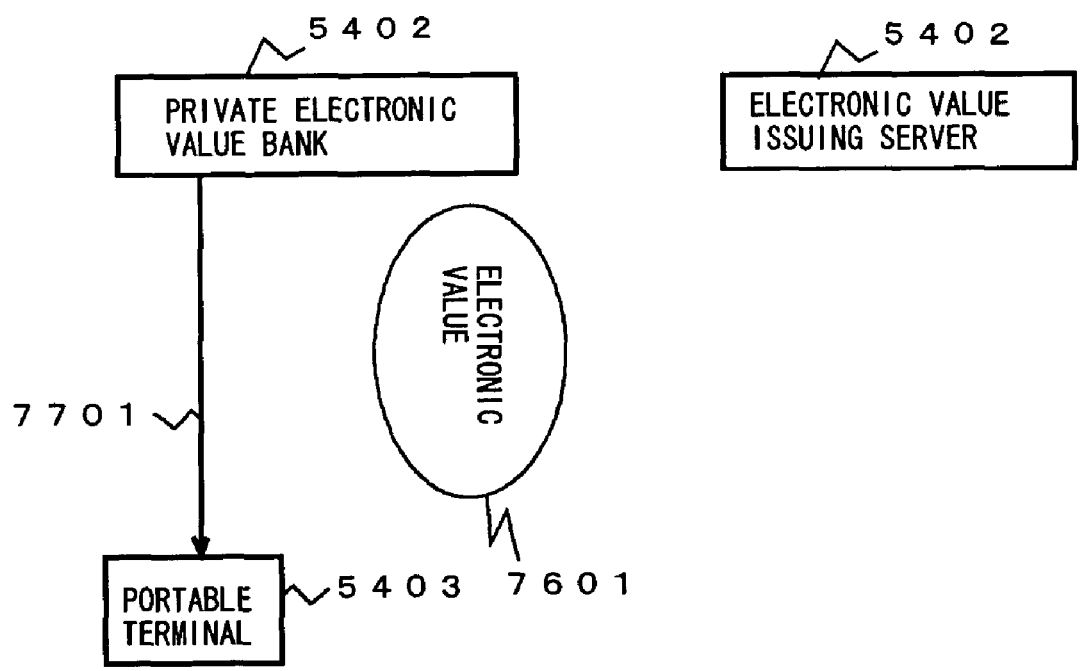
FIG. 77 is a view schematically showing data transfer in the eighth embodiment of the present invention.
Figure 78:
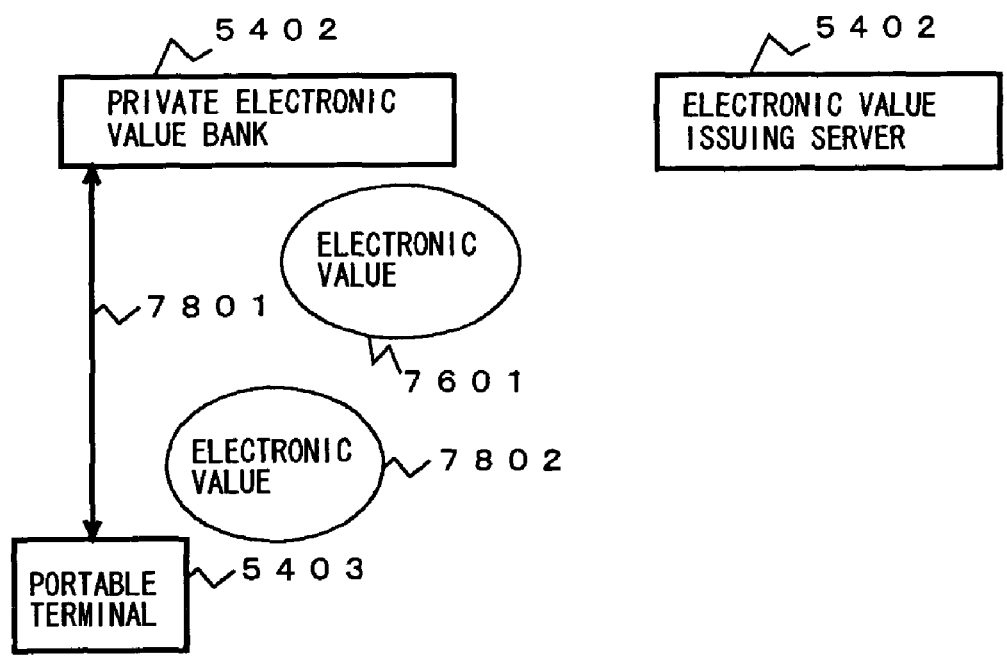
FIG. 78 is a view schematically showing data transfer in the eighth embodiment of the present invention.

FIGS. 74 to 78 schematically exemplify data flow in this embodiment. In FIG. 74, the portable terminal 5403 outputs the electronic value purchase request, which includes issue instruction information 7401 and purchase instruction information 7402, to the electronic value issuing server 5401 (arrow 5404). In FIG. 75, the electronic value issuing server 5401 transmits the purchase instruction information 7402 to the private electronic value bank 5402 (arrow 5405). In FIG. 76, the processing for settlement is performed (arrow 5406), and the electronic value issuing server 5401 transfers an electronic value 7601 to the private electronic value bank 5402 (arrow 5407). In FIG. 77, the private electronic value bank 5402 transmits the electronic value 7601 to the portable terminal 5403 (arrow 7701), and as shown in FIG. 78, the electronic value 7601 stored by the private electronic value bank 5402 and an electronic value 7802 stored by the portable terminal 5403 are controlled such that they are shared (arrow).

In this embodiment, the portable terminal 5403 can directly output the electronic value issue request to the electronic value issuing server 5401, and a reservation can be made simultaneously as well when the electronic value is a ticket. Further, by encrypting the purchase instruction information such that the private electronic value bank 5402 can decrypt it, it is possible to transmit the information for settlement in order to receive transfer of the electronic value, such as the credit card number, to the private electronic value bank 5402 without the knowledge of the electronic value issuing server 5401.

Ninth Embodiment

Figure 62:
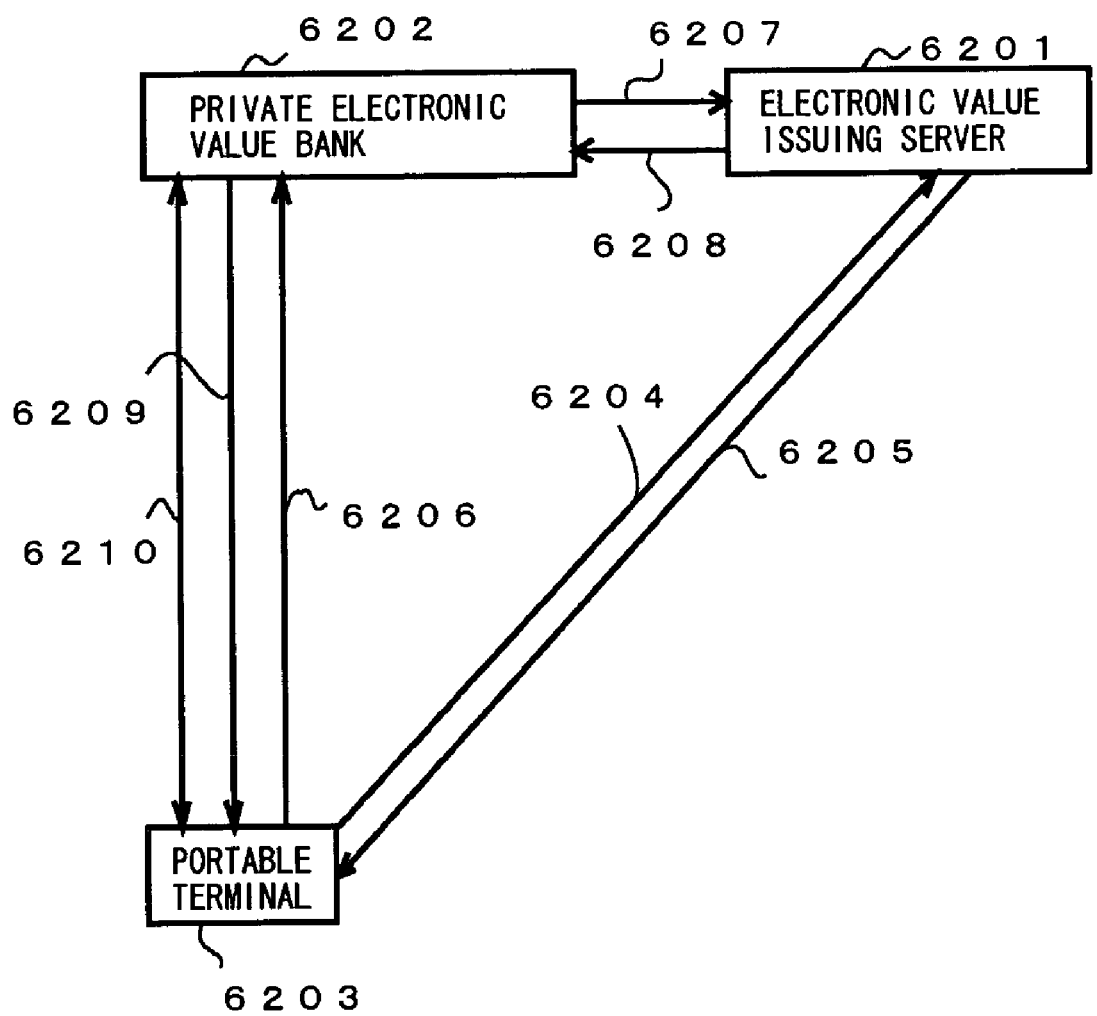
FIG. 62 is a view showing a constitution of the private electronic value bank system in a ninth embodiment of the present invention.

FIG. 62 is the view showing the configuration of the private electronic value bank system according to the ninth embodiment of the present invention. In this embodiment, where the private electronic value bank system includes an electronic value issuing server 6201, a private electronic value bank 6202, and a portable terminal 6203, the portable terminal 6203 outputs the electronic value issue request to the electronic value issuing server 6201 (arrow 6204), and the electronic value issuing server 6201 transmits the purchase instruction to the portable terminal 6203 in response (arrow 6205). The portable terminal 6203 transmits the electronic value purchase instruction added with the signature to the private electronic value bank 6202 (arrow 6206). The private electronic value bank 6202 that has received the electronic value purchase instruction added with the signature transmits the electronic value purchase request to the electronic value issuing server 6201 (arrow 6208), the electronic value issuing server 6201 transfers the electronic value to the private electronic value bank 6202 (arrow 6209), the private electronic value bank 6202 transmits the electronic value to the portable terminal 6203 (arrow 6210), and then, control is performed for sharing the electronic value between the private electronic value bank 6202 and the portable terminal 6203 (step S6210).

Figure 63:
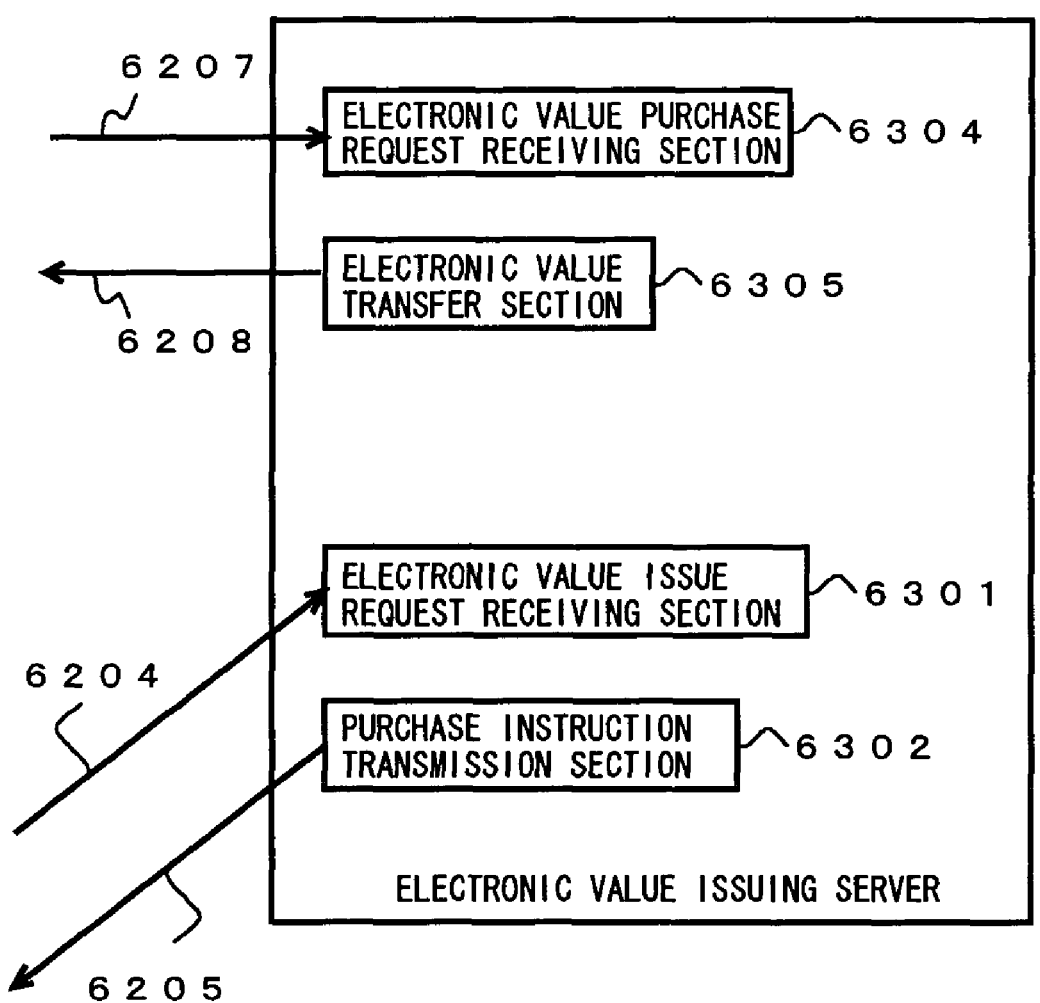
FIG. 63 is a functional block diagram of the electronic value issuing server in the ninth embodiment of the present invention.

FIG. 63 exemplifies the functional block diagram of the electronic value issuing server 6201. In this embodiment, the electronic value issuing server 6201 has an electronic value issue request receiving section 6301, a purchase instruction transmission section 6302, an electronic value purchase request receiving section 6304, and an electronic value transfer section 6305.

The electronic value issue request receiving section 6301 receives the electronic value issue request from the portable terminal 6302. The 'electronic value issue request' is data expressing that the owner of the portable terminal 6303 wants the electronic value to be issued.

The purchase instruction transmission section 6302 transmits the purchase instruction to the portable terminal 6203 in response to the electronic value issue request received by the electronic value issue request receiving section. The 'purchase instruction' is information to receive the electronic value from the electronic value issuing server 6201, in which information that should identify the electronic value issuing server 6201 such as the IP address, port number and URL of the electronic value issuing server 6201, what kind of electronic value the electronic value issuing server 6201 can issue, the settlement method with the issue of the electronic value, or the like can be cited, for example.

The electronic value purchase request receiving section 6304 receives the electronic value purchase request that is the purchase request for the electronic value from the private electronic value bank based on the purchase instruction transmitted from the purchase instruction transmission section 6302. 'Based on the purchase instruction' means that the request has been generated according to the content of the purchase instruction transmitted from the purchase instruction transmission section 6302.

The electronic value transfer section 6305 transfers the electronic value to the private electronic value bank 6202 in response to the electronic value purchase request received by the electronic value purchase request receiving section 6303. 'In response to the electronic value purchase request' means that electronic value is transferred as the electronic value purchase request has specified. The electronic value transfer section 6305 transfers the type of the electronic value specified by the electronic value purchase request and the number of the electronic value as specified to the private electronic value bank.

Figure 64:
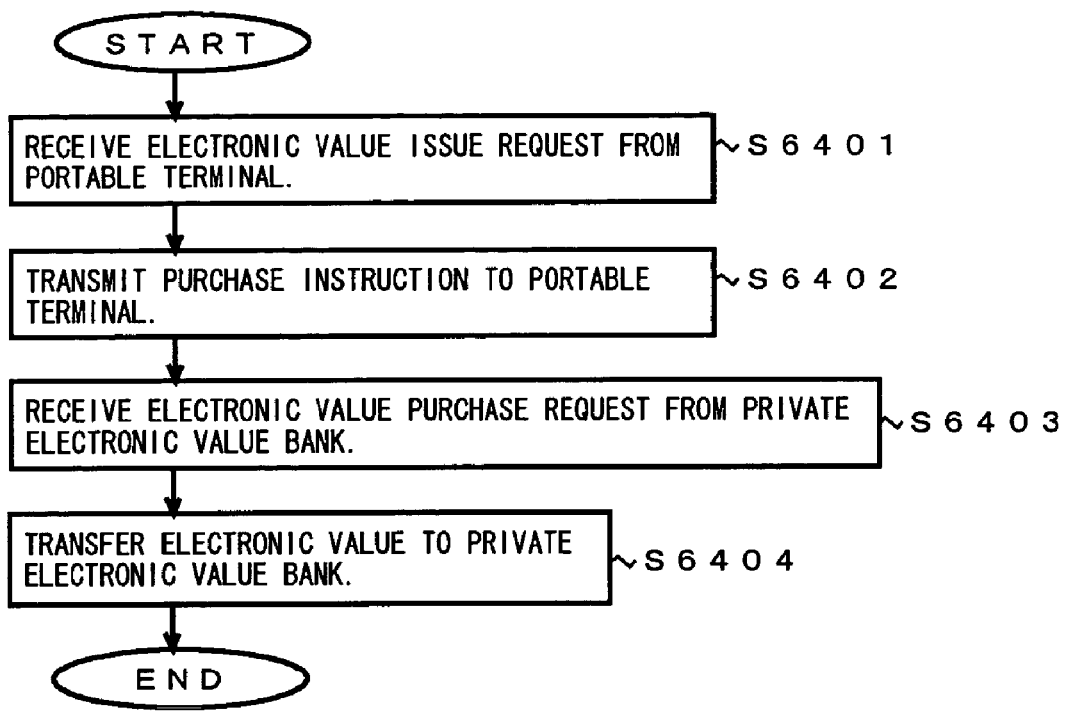
FIG. 64 is a flowchart explaining an operation of the electronic value issuing server in the ninth embodiment of the present invention.

FIG. 64 is the flowchart explaining the operation of the electronic value issuing server 6201. The electronic value issue request receiving section 6301 receives the electronic value issue request from the portable terminal 6203 first (step S6401). The purchase instruction transmission section 6302 transmits the purchase instruction to the portable terminal 6203 in response to the received electronic value issue request (step S6402). Then, the electronic value purchase request receiving section 6304 receives the electronic value purchase request from the private electronic value bank 6202 (step S64003), and the electronic value transfer section 6305 transfers the electronic value to the private electronic value bank 6202 (step S6404).

Note that step S6403 does not need to be executed immediately after the processing of step S6402 has finished. This is because, as described later, the electronic value purchase request is designed to be transmitted after communication between the portable terminal 6203 and the private electronic value bank 6202, and the portable terminal 6203 and the private electronic value bank 6202 are not always necessarily able to communicate with each other. The type and the number of the electronic value are included in the electronic value issue request transmitted from the portable terminal 6203 to the electronic value issuing server 6201, and the electronic value issuing server 6201 stores the type, number and the like of the electronic value when it receives the electronic value issue request in step S6401. When the server receives the electronic value purchase request from the private electronic value bank in step S6403, it compares the type, number and the like of the electronic value included in the electronic value purchase request with the stored ones, and may transfer the electronic value to the private electronic value bank 6202 in step S6404 only when they are the same.

Figure 65:
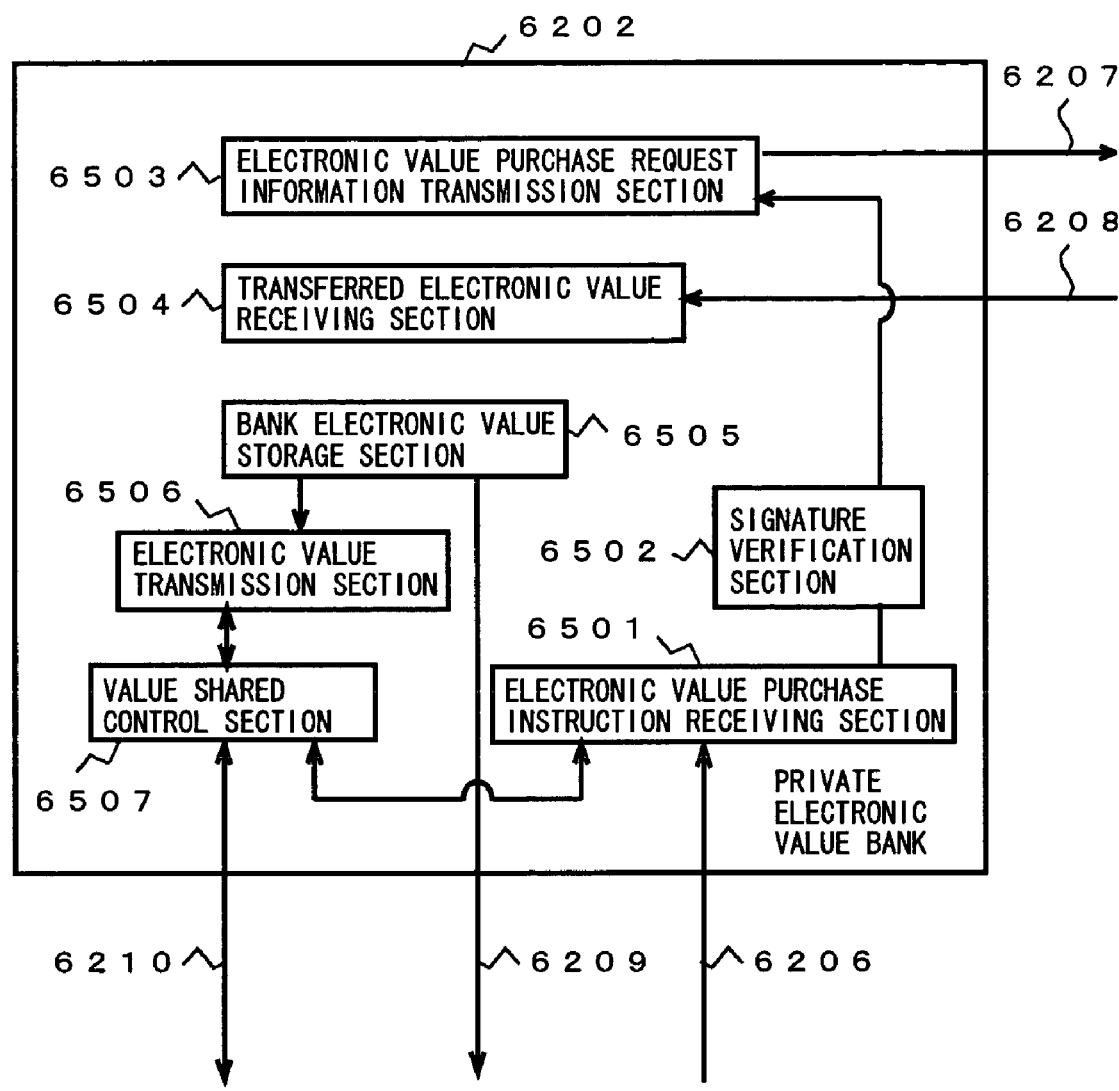
FIG. 65 is a functional block diagram of the private electronic value bank in the ninth embodiment of the present invention.

FIG. 65 exemplifies the functional block diagram of the private electronic value bank 6202 in this embodiment. The private electronic value bank 6202 has an electronic value purchase instruction receiving section 6501, a signature verification section 6502, a bank electronic value storage section 6505, an electronic value purchase request transmission section 6503, a transferred electronic value receiving section 6504, an electronic value transmission section 6506, and a bank shared control section 6507.

The electronic value purchase instruction receiving section 6501 receives the electronic value purchase instruction added with the signature, which has been generated based on the purchase instruction, from the portable terminal 6203. 'Generated based on the purchase instruction' means that the instruction has been transmitted from the purchase instruction transmission section 6302 of the electronic value issuing server 6201 and generated based on the content of the purchase instruction received by the portable terminal 6203. The 'signature' is synonymous with the electronic signature in the eighth embodiment, and the 'electronic value purchase instruction added with the signature' means that the electronic signature of the portable terminal 6203 is added to the electronic value purchase instruction. The electronic value purchase instruction includes the IP address and URL to identify the electronic value issuing server 6201, and when the purchase instruction specifies the method of settlement, it includes the information necessary for executing the method of settlement such as the credit card number, the bank deposit account number, the password or the like, for example.

The signature verification section 6502 verifies the signature of the electronic value purchase instruction received by the electronic value purchase instruction receiving section 6501. The 'signature of the electronic value purchase instruction' is a signature added to the electronic value purchase instruction, and whether or not the electronic value purchase instruction has been generated in the portable terminal 6203 can be confirmed by verifying the signature.

The electronic value purchase request transmission section 6503, when the electronic value purchase instruction is verified to be authentic via the verification in the signature verification section 6502, transmits the electronic value purchase request to the electronic value issuing server 6201 based on the electronic value purchase instruction received by the electronic value purchase instruction receiving section 6501. For example, when the electronic value purchase instruction includes the type and number of the electronic value, the electronic value purchase request to purchase the electronic values of the type and number from the electronic value issuing server 6201 are generated by the electronic value purchase request transmission section 2503 and transmitted to the electronic value issuing server 6201.

The transferred electronic value receiving section 6504 receives the electronic value transferred from the electronic value issuing server 6201 in response to the electronic value purchase request transmitted from the electronic value purchase request transmission section 6503.

The bank electronic value storage section 6505 stores the electronic value.

The electronic value transmission section 6506 transmits the electronic value of the bank electronic value storage section 6505 to the portable terminal 6203.

The bank shared control section 6507 controls the electronic value stored in the bank electronic value storage section 6505 and the electronic value stored in the portable terminal 6203 such that they are shared.

Figure 66:
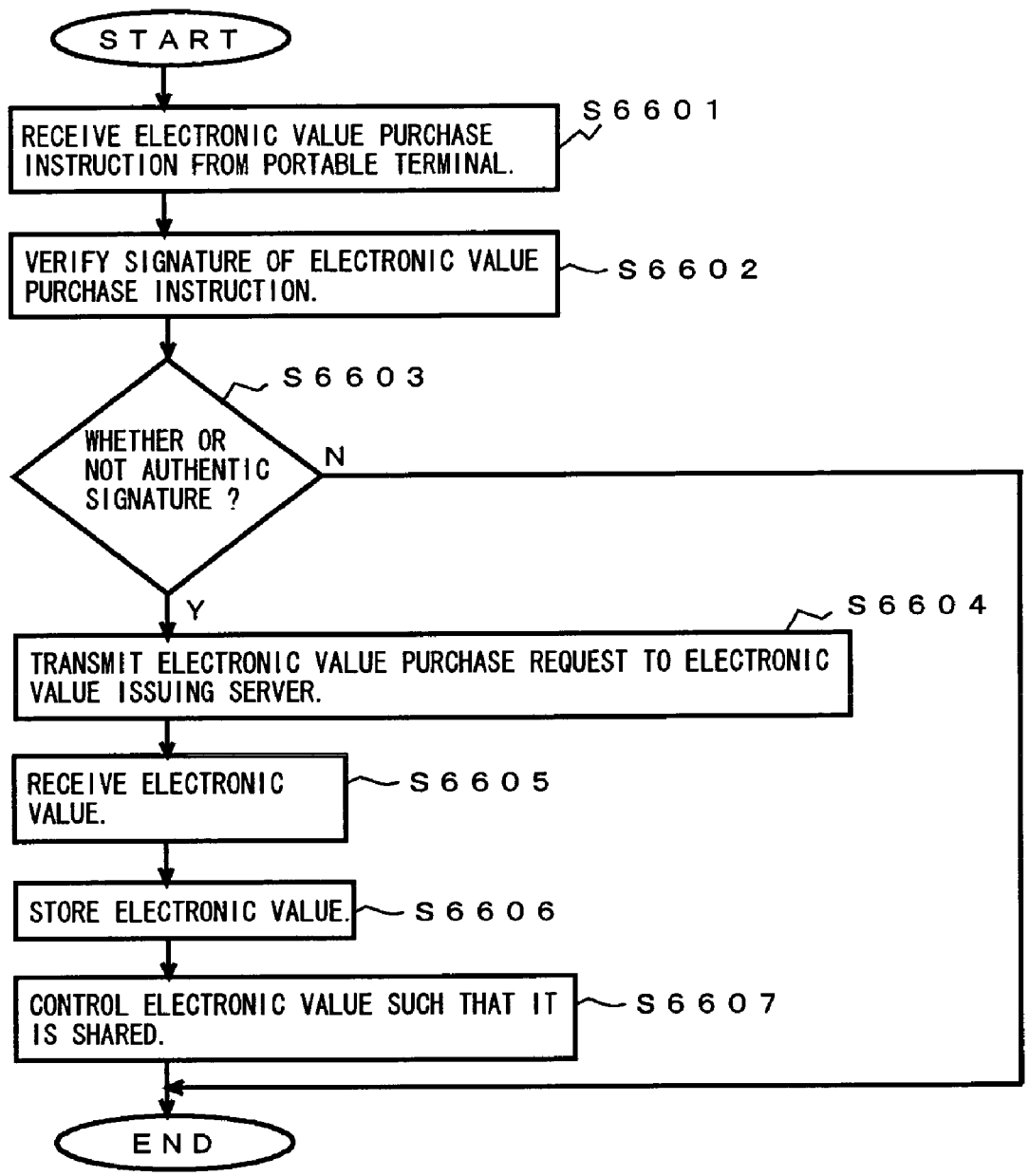
FIG. 66 is a flowchart explaining an operation of the private electronic value bank in the ninth embodiment of the present invention.

FIG. 66 is the flowchart explaining the operation of the private electronic value bank 6202. The electronic value purchase instruction receiving section 6501 receives the electronic value purchase instruction from the portable terminal 6203 first (step S6601). Then, the signature verification section 6502 verifies the signature of the electronic value purchase instruction (step S6602). When the signature is determined to be authentic after the verification of signature (when step S6603 branches to Y), the electronic value purchase request transmission section 6503 transmits the electronic value purchase request to the electronic value issuing server 6201. The transferred electronic value receiving section 6504 receives the electronic value when the electronic value issuing server 6201 transfers the electronic value (step S6605), and the bank electronic value storage section 6505 stores the electronic value. Then, the bank shared control section 6507 controls the electronic value so as to be shared (step S6607).

Figure 85:
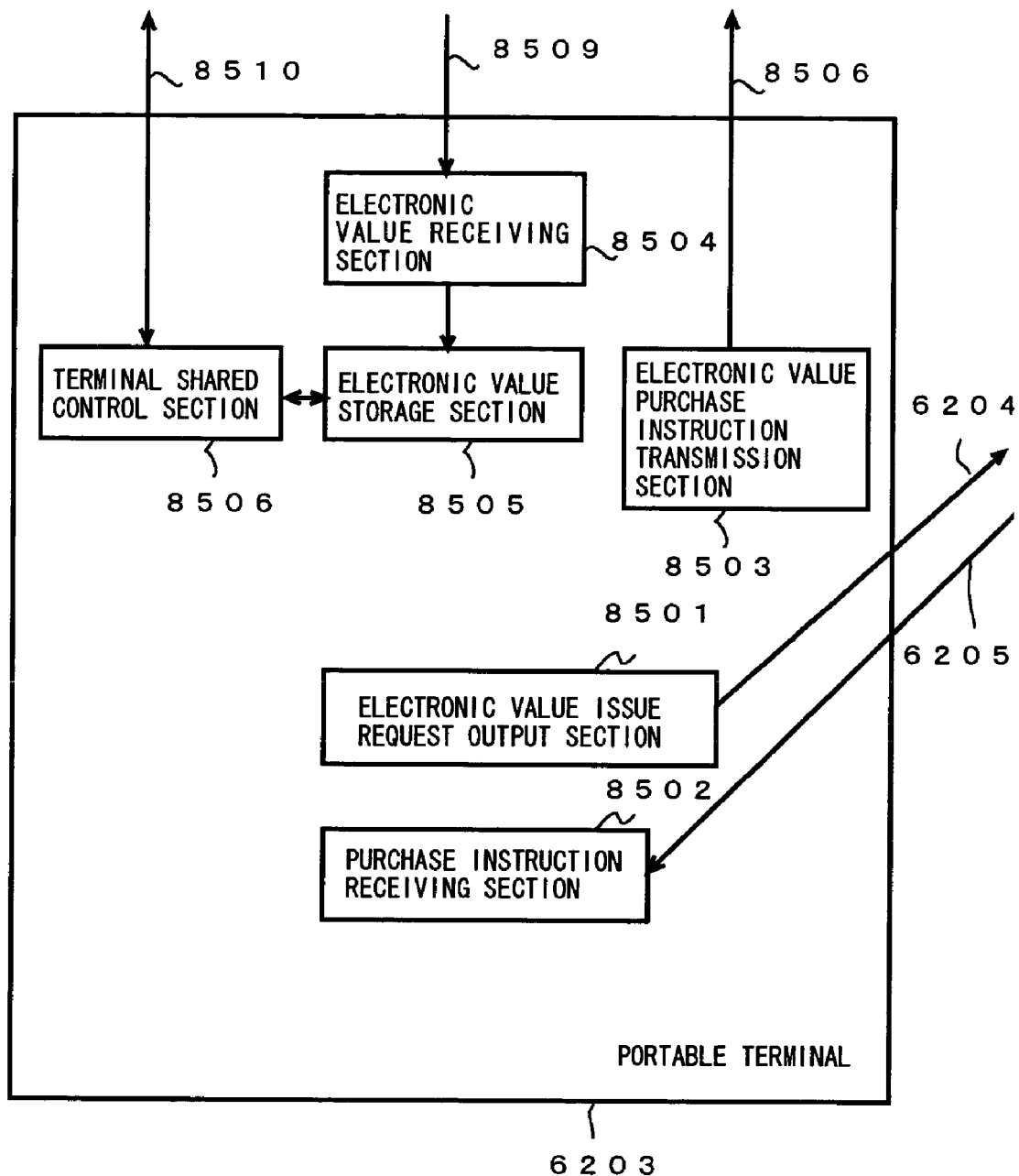
FIG. 85 is a functional block diagram of the portable terminal in the ninth embodiment of the present invention.

FIG. 85 exemplifies the functional block diagram of the portable terminal 6203 added with the signature. The portable terminal 6203 has an electronic value issue request output section 8501, a purchase instruction receiving section 8502, an electronic value purchase instruction transmission section 8503, an electronic value receiving section 8504, an electronic value storage section 8505, and a terminal shared control section 8506.

The electronic value issue request output section 8501 outputs the electronic value issue request to the electronic value issuing server 6201.

The purchase instruction receiving section 8502 receives the purchase instruction from the electronic value issuing server 6201 in response to the electronic value issue request output from the electronic value issue request output section 8501.

The electronic value purchase instruction transmission section 8503 transmits the electronic value purchase instruction to the private electronic value bank 6202 in response to the purchase instruction received by the purchase instruction receiving section 8502.

The electronic value receiving section 8509 receives the electronic value transmitted from the private electronic value bank 6202 in response to the electronic value purchase instruction transmitted from the electronic value purchase instruction transmission section 8503.

The electronic value storage section 8505 stores the electronic value.

The terminal shared control section 8506 controls the electronic value stored in the bank electronic value storage section 6505 and the electronic value stored in the portable terminal 6203 such that they are shared. The 'electronic value stored in the portable terminal 6203' is the electronic value stored in the electronic value storage section 8505 of the portable terminal 6203.

Figure 86:
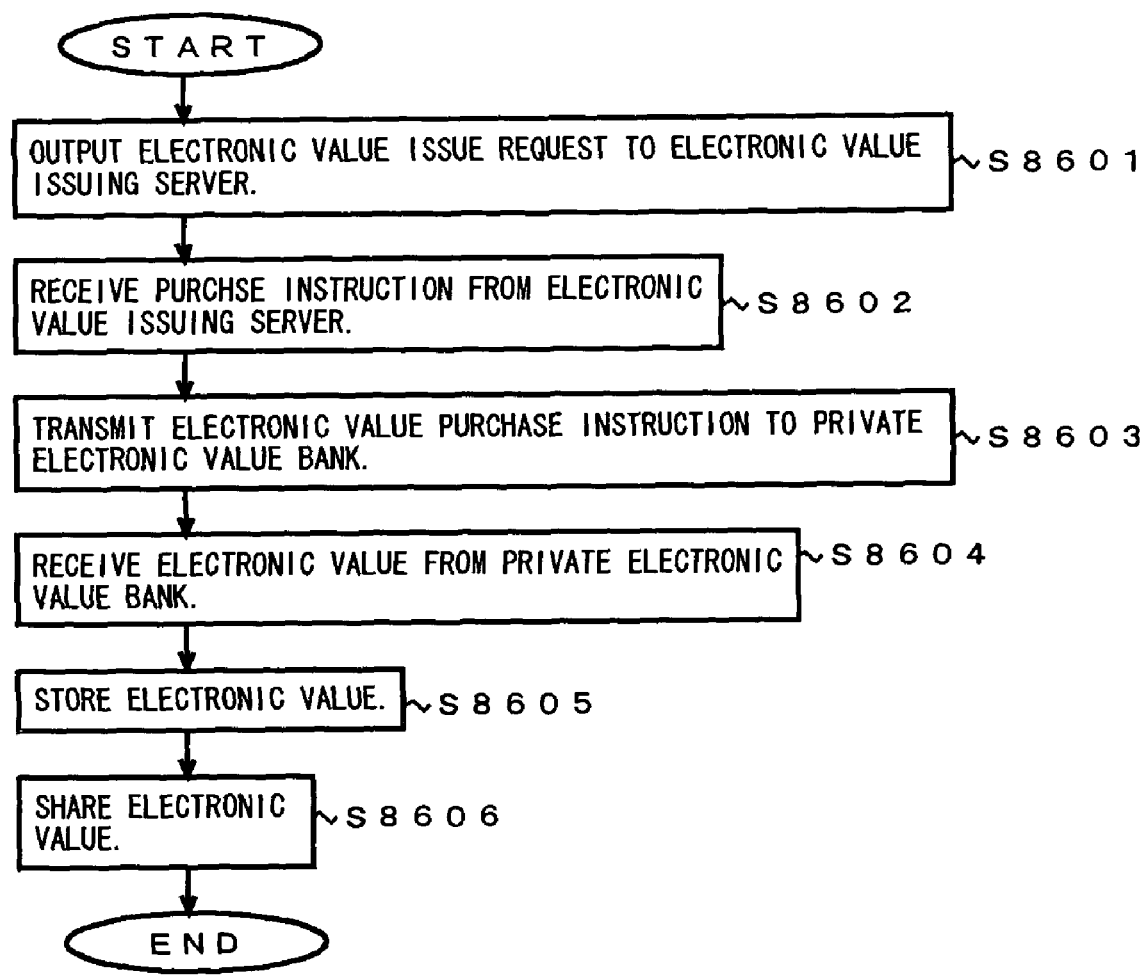
FIG. 86 is a flowchart explaining an operation of the portable terminal in the ninth embodiment of the present invention.

FIG. 86 is the flowchart explaining the operation of the portable terminal 6203. The electronic value issue request output section 8501 outputs the electronic value issue request to the electronic value issuing server 6201 first (step S8601), and the purchase instruction receiving section 8502 receives the purchase instruction from the electronic value issuing server 6201 (step S8602). The electronic value purchase instruction transmission section 8503 transmits the electronic value purchase instruction added with the signature to the private electronic value bank 6202 (step S8603). Then, the electronic value receiving section 8504 receives the electronic value from the private electronic value bank 6202 (step S8604), and the electronic value storage section 8505 stores the electronic value (step S8605). Then, the terminal shared control section 8506 controls the electronic value so as to be shared (step S8606).

Figure 79:
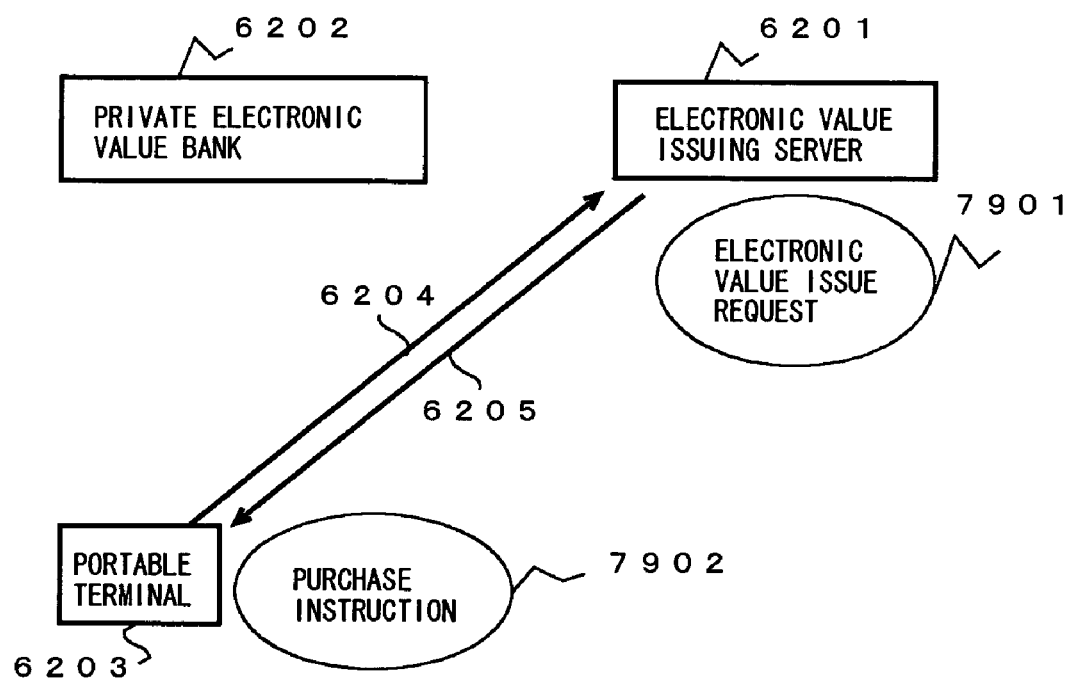
FIG. 79 is a view schematically showing data transfer in the ninth embodiment of the present invention.
Figure 80:
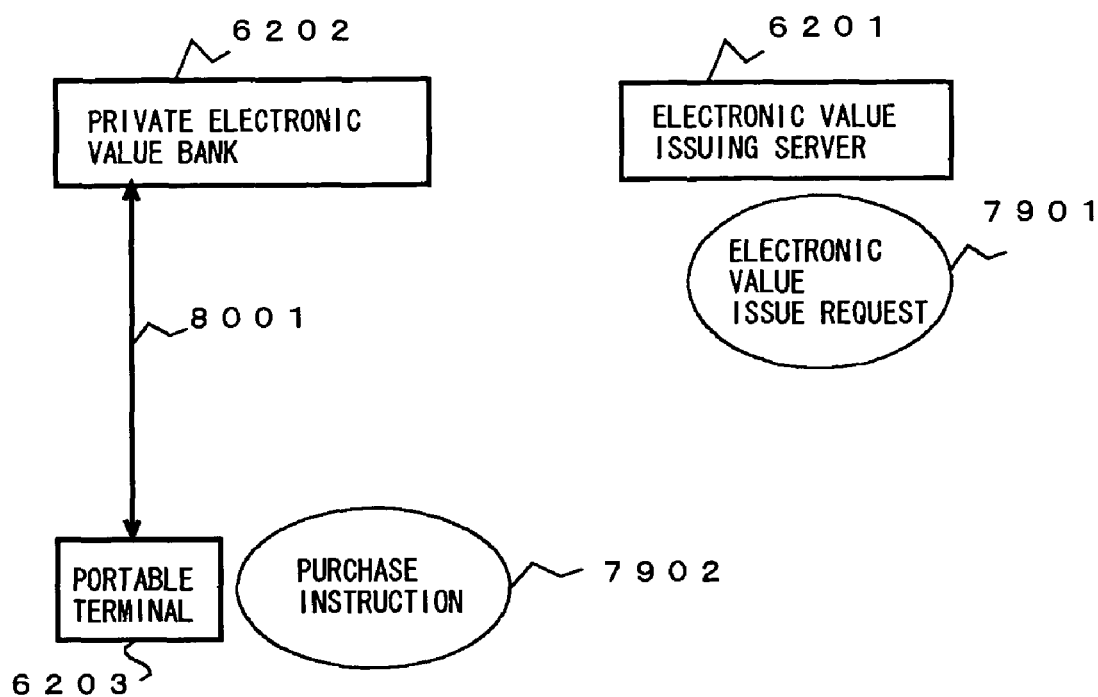
FIG. 80 is a view schematically showing data transfer in the ninth embodiment of the present invention.
Figure 81:
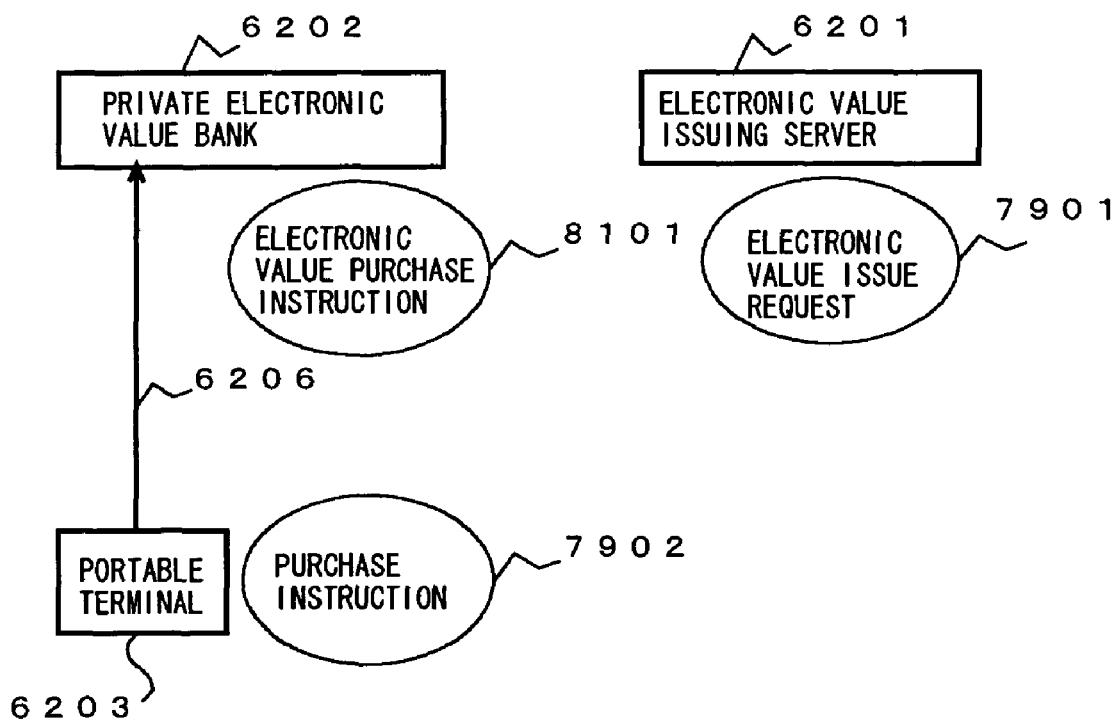
FIG. 81 is a view schematically showing data transfer in the ninth embodiment of the present invention.
Figure 82:
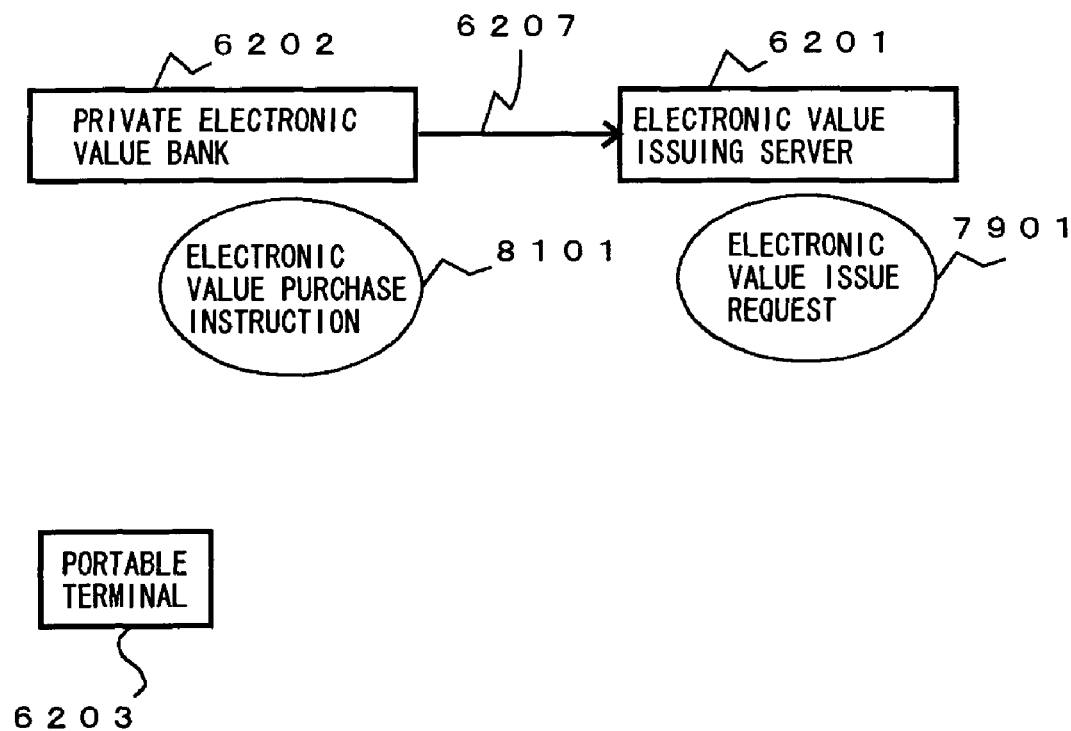
FIG. 82 is a view schematically showing data transfer in the ninth embodiment of the present invention.
Figure 83:
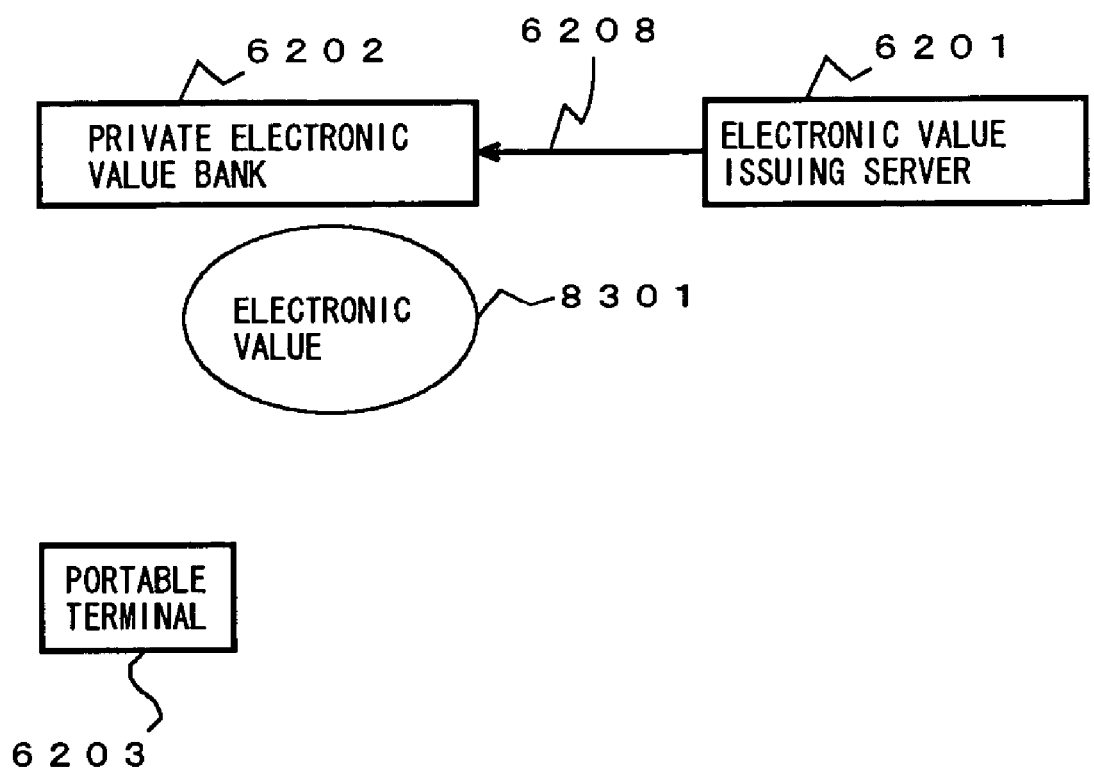
FIG. 83 is a view schematically showing data transfer in the ninth embodiment of the present invention.
Figure 84:
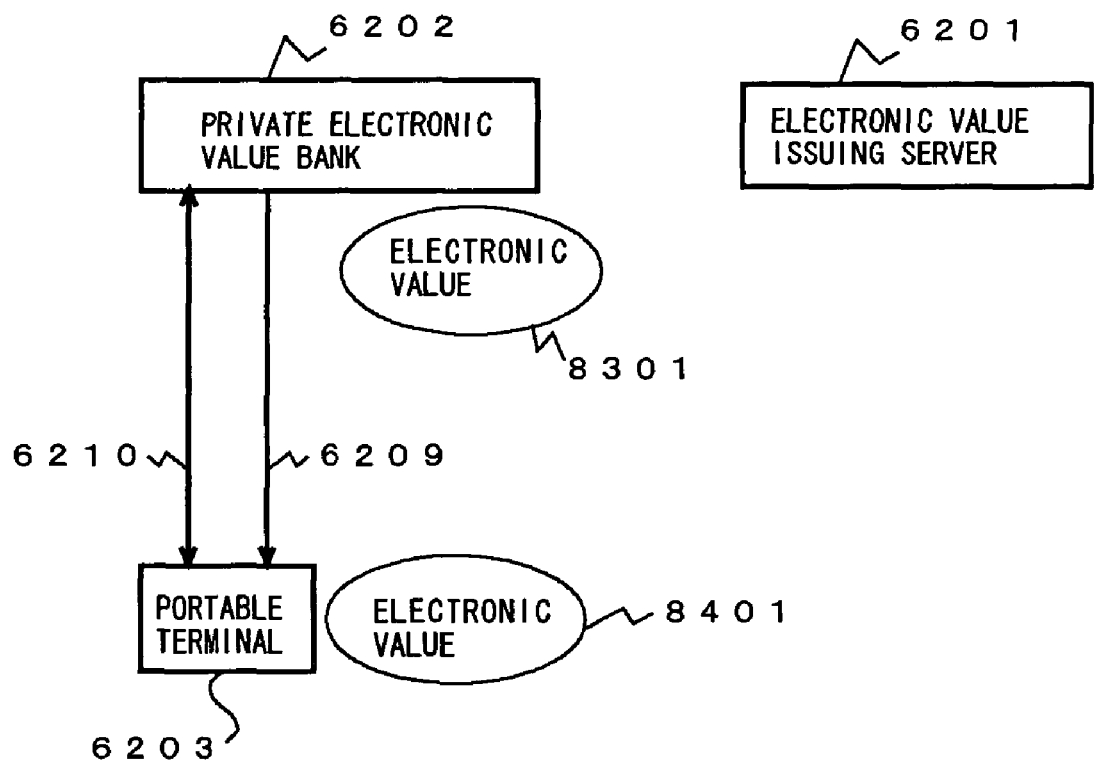
FIG. 84 is a view schematically showing data transfer in the ninth embodiment of the present invention.

FIGS. 79 to 84 schematically show data flow in this embodiment. As shown in FIG. 79, the portable terminal 6203 outputs an electronic value issue request 7901 to the electronic value issuing server 6201 (arrow 6204), and the electronic value issuing server 6201 transmits the purchase instruction to the portable terminal 6203 (arrow 6205). As shown in FIG. 80, communication between the portable terminal 6203 and the private electronic value bank 6202 starts (arrow 8001), and the portable terminal 6203 transmits an electronic value purchase instruction 8101 to the private electronic value bank 6202 as shown in FIG. 81 (arrow 6206). As shown in FIG. 82, the private electronic value bank 6202 transmits the electronic value purchase request to the electronic value issuing server 6201 based on the electronic value purchase instruction 8101 (arrow 6207), and as shown in FIG. 83, the electronic value issuing server 6201 transfers an electronic value 8301 to the private electronic value bank 6202 (arrow 6208). Then, the private electronic value bank 6202 transmits an electronic value 8401 to the portable terminal 6203 as shown in FIG. 84 (arrow 6209), and electronic value 8301 and the electronic value 8401 are controlled such that the private electronic value bank 6202 and the portable terminal 6203 share them (arrow 6210).

As described above, the electronic value issuing server 6201 transmits the purchase instruction in response to the electronic value issue request from the portable terminal 6203, and thus the electronic value issuing server 6201 shows the portable terminal 6203 the type and number of the electronic value that the server itself can issue or can specify a settlement method to obtain the electronic value. Further, since an actual obtaining process of the electronic value is performed by the private electronic value bank 6202 and the electronic value issuing server 6201, the electronic value can be obtained based on various kinds of protocol, and the process respond to a new protocol. Furthermore, the issued electronic value is shared by the private electronic value bank 6202 and the portable terminal 6203, so that the private electronic value bank 6202 has a back-up of the electronic value and there is no possibility to lose the electronic value even if a situation occurs where the portable terminal 6203 cannot be used such that the portable terminal 6203 is lost or the portable terminal 6203 breaks down. In addition, even if the portable terminal 6203 is not provided with the function to transmit the electronic value purchase instruction, it is possible to make the portable terminal 6203 have the function capable of transmitting the electronic value purchase instruction when the purchase instruction includes the plug-in allowing the terminal to have the function to transmit the electronic value purchase instruction. Still further, by transmitting the electronic value purchase instruction added with the signature to the private electronic value bank 6202, it is possible to detect the electronic value purchase instruction information that a malfunction or attempted security breach has occurred.

Tenth Embodiment

Figure 67:
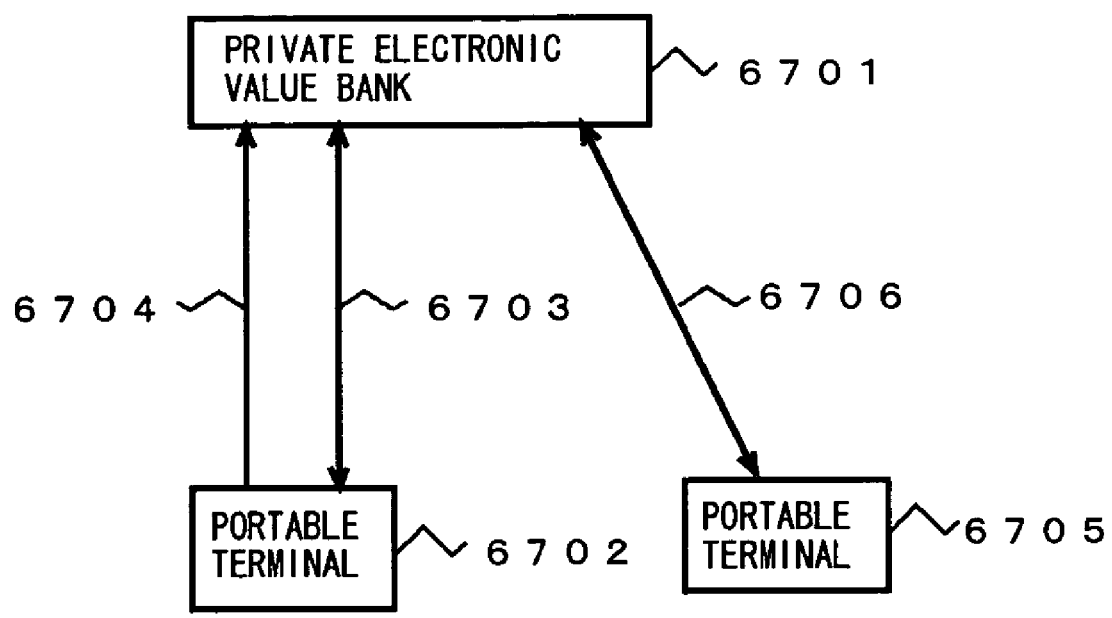
FIG. 67 is a view showing a constitution of the private electronic value bank system in a tenth embodiment of the present invention.

FIG. 67 is the view showing the constitution of the private electronic value bank system according to the tenth embodiment of the present invention. In this embodiment the private electronic value bank system includes a private electronic value bank 6701, a portable terminal 6702, and a portable terminal 6705. The private electronic value bank 6701 and the portable terminal 6702, and the private electronic value bank 6701 and the portable terminal 6705 control the electronic value so as to share it (arrow 6703, arrow 6706), the portable terminal 6702 outputs the electronic value transfer request to the private electronic value bank 6701 (arrow 6704), and this output makes the electronic value, which the portable terminal 6702 and the private electronic value bank 6701 share, become the electronic value that the portable terminal 6705 and the private electronic value bank 6701 share.

Figure 68:
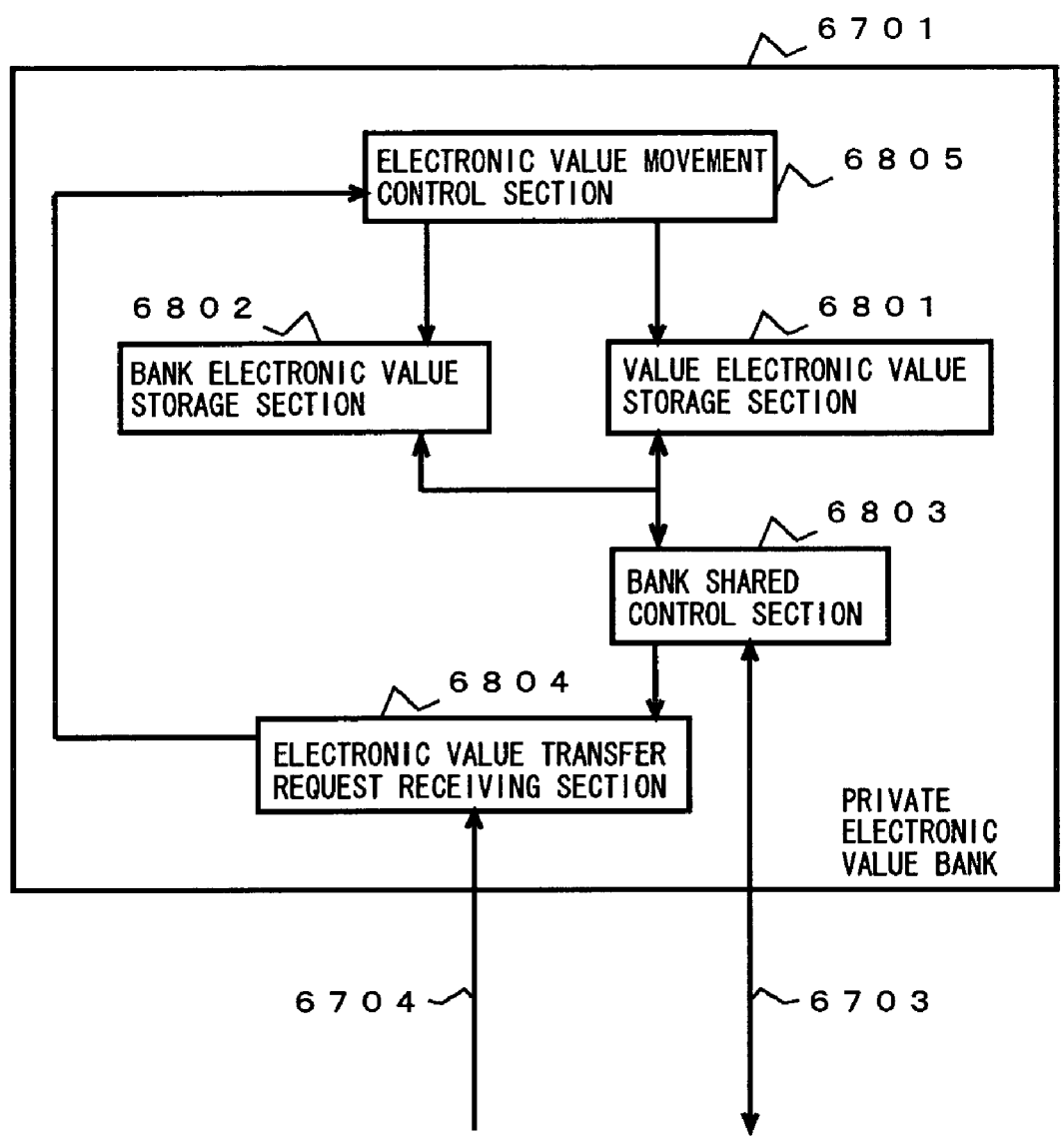
FIG. 68 is a functional block diagram of the private electronic value bank in the tenth embodiment of the present invention.

FIG. 68 exemplifies the functional block diagram of the private electronic value bank 6701. The private electronic value bank 6701 has at least two or more bank electronic value storage sections (6801, 6802), a bank shared control section 6803, an electronic value transfer request receiving section 6804, and an electronic value movement control section 6805.

The bank electronic value storage sections (6801, 6802) store the electronic value. One or a plurality of portable terminals correspond to the bank electronic value storage sections, and the bank electronic value storage section and the portable terminal that correspond to each other share the electronic value via the bank shared control section 6803 (described later).

The bank shared control section 6803 controls the electronic value stored by the bank electronic value storage sections (6801, 6802) and the electronic value stored by the portable terminal specified corresponding to the bank electronic value storage sections such that they are shared. Although only one bank shared control section is shown in FIG. 68 and it is designed to control sharing of the electronic values stored by all the bank electronic value storage sections and their corresponding portable terminals, one bank electronic value storage section may corresponds to one bank shared control section and the control section may control sharing of the electronic values between the bank electronic value storage section and the portable terminal.

The electronic value transfer request receiving section 6804 receives the electronic value transfer request from the portable terminal 6702. The 'electronic value transfer request' is a request for transfer of the electronic value, which is caused by moving the electronic value stored by the bank electronic value storage section to another bank electronic value storage section upon specifying it. To specify 'another bank electronic value storage section', it may be specified by a name that identifies the bank electronic value storage section in the private electronic value bank 6701, or the portable terminal corresponding to another bank electronic value storage section is specified. For example, the portable terminal is specified by a cell phone number, an address and the name of the owner, an IP address allocated for the portable terminal, an identification code of the portable terminal or the like, and the bank electronic value storage section corresponding to the specified portable terminal may be specified.

The electronic value movement control section 6805 executes the processing of moving the electronic value from the bank electronic value storage section, which corresponds to the portable terminal that has output the electronic value transfer request, to the bank electronic value storage section specified by the electronic value transfer request in response to the electronic value transfer request received by the electronic value transfer request receiving section 6804. For example, in the case where the bank electronic value storage section 6801 corresponds to the portable terminal 6702 and the portable terminal 6702 has output the electronic value transfer request on specifying the bank electronic value storage section 6802, the electronic value movement control section 6805 executes the processing of moving the electronic value from the bank electronic value storage section 6801 to the bank electronic value storage section 6802.

Figure 69:
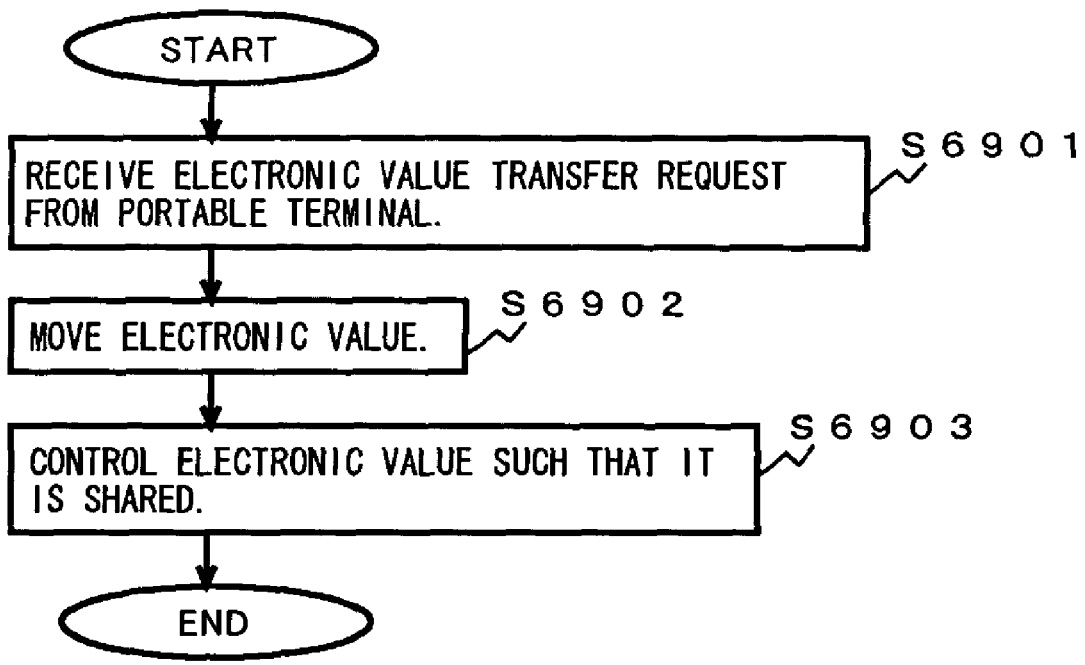
FIG. 69 is a flowchart explaining an operation of the private electronic value bank in the tenth embodiment of the present invention.

FIG. 69 is the flowchart explaining the operation of the private electronic value bank 6701. The electronic value transfer request receiving section 6804 receives the electronic value transfer request from the portable terminal first (step S6901), and the electronic value movement control section 6805 moves the electronic value (step S6903). Then, the bank shared control section 6803 controls the electronic value so as to be shared. Specifically, when the portable terminal corresponding to the bank electronic value storage section, to which the electronic value has been transferred, stores the transferred bank electronic value, it is deleted (or the status of the electronic value is changed to 'used'). Further, if necessary, the portable terminal corresponding to the bank electronic value storage section, to which the electronic value has been transferred, is made to store the transferred electronic value, and thus sharing the electronic value with the bank electronic value storage section.

Figure 70:
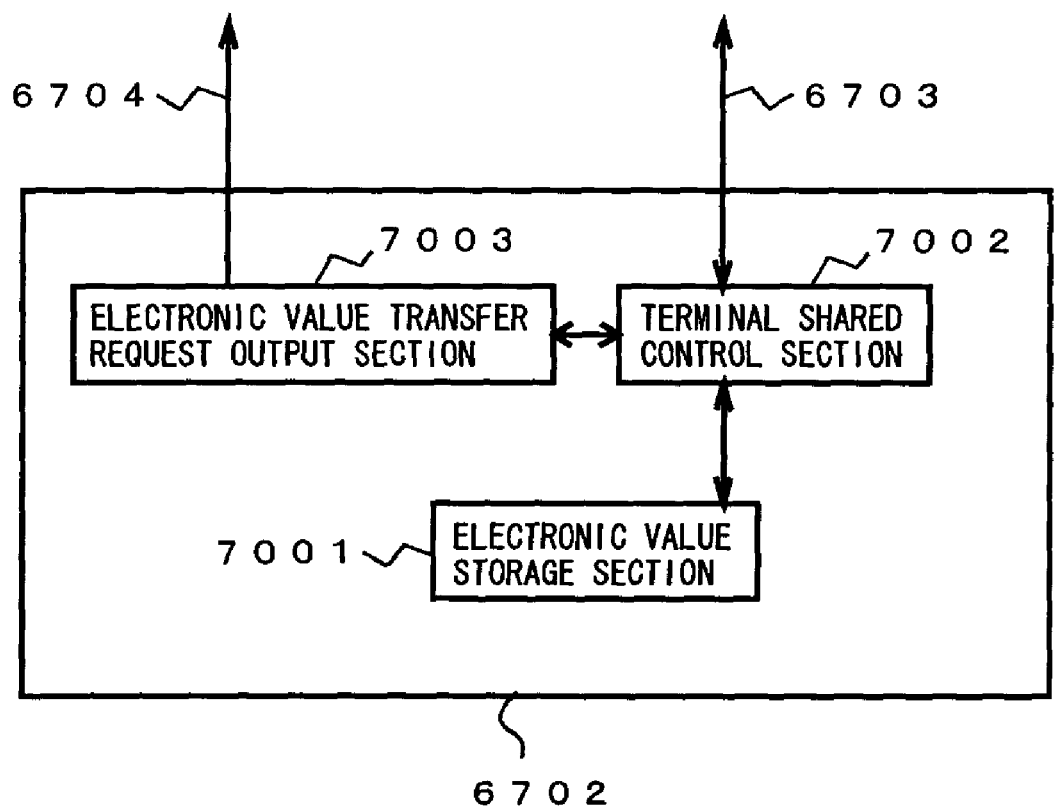
FIG. 70 is a functional block diagram of the portable terminal in the tenth embodiment of the present invention.

FIG. 70 exemplifies the functional block diagram of the portable terminal 6702. The portable terminal 6702 has an electronic value storage section 7001, a terminal shared control section 7002 and an electronic value transfer request output section 7003.

The electronic value storage section 7001 stores the electronic value.

The terminal shared control section 7002 controls the electronic value stored by the portable terminal 6702 and the electronic value stored by the bank electronic value storage section specified by the correspondence to the portable terminal 6702 such that they are shared.

The electronic value transfer request output section 7003 outputs the electronic value transfer request, which is a request of transfer by moving the electronic value on specifying another bank electronic value storage section, to the private electronic value bank 6701. As described above, there are cases where the bank electronic value storage section is specified and where the portable terminal corresponding to the bank electronic value storage section is specified in order to specify another bank electronic value storage section.

Figure 71:
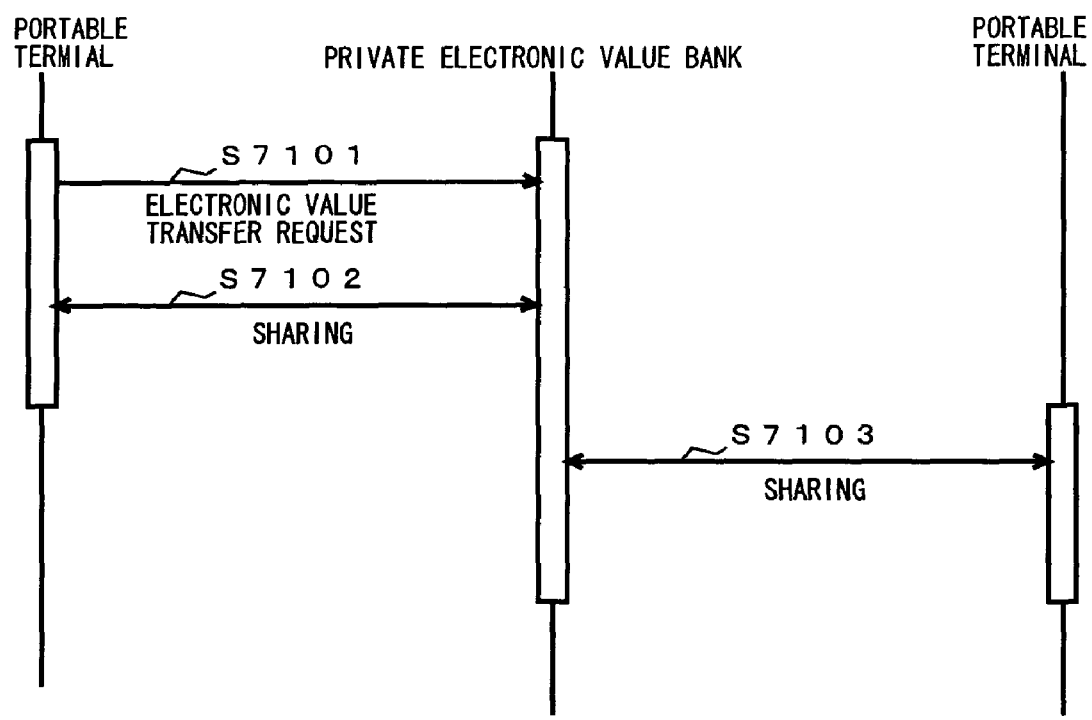
FIG. 71 is a sequence diagram showing an interaction between the portable terminal and the private electronic value bank in the tenth embodiment of the present invention.

FIG. 71 is the sequence diagram showing the interaction between the portable terminal and the private electronic value bank. In step S7101, the portable terminal outputs the electronic value transfer request to the private electronic value bank first. Then, control for sharing is performed in step S7102. Specifically, the transferred electronic value is deleted from the portable terminal. Then, in step S7103, control for sharing the electronic value is performed with the portable terminal corresponding to the bank electronic value storage section to which the electronic value has been transferred, and the transferred electronic value is shared between the bank electronic value storage section to which a child value has been transferred and the portable terminal corresponding to the bank electronic value storage section.

With this configuration, the electronic value can be transferred to the terminal even if it does not have a function to take over the electronic value, which corresponds to transfer of the electronic value. Further, since the transferred electronic value is shared by the private electronic value bank 6701 and the portable terminal, there is no possibility of losing the electronic value even if the portable terminal is lost or the portable terminal breaks down. In addition, by performing transfer of the electronic value via the private electronic value bank 6701, the history of transfers of the electronic value is recorded in the private electronic value bank 6701. If an unauthorized use of the electronic value occurs after the transfer of the electronic value (for example, a person who transferred the electronic value and lost possession of the electronic value uses the transferred electronic value), it is possible to detect the person who made an unauthorized use of the electronic value by the transfer history of the electronic value.

Embodiment Common to Second Embodiment to Tenth Embodiment

Figure 53:
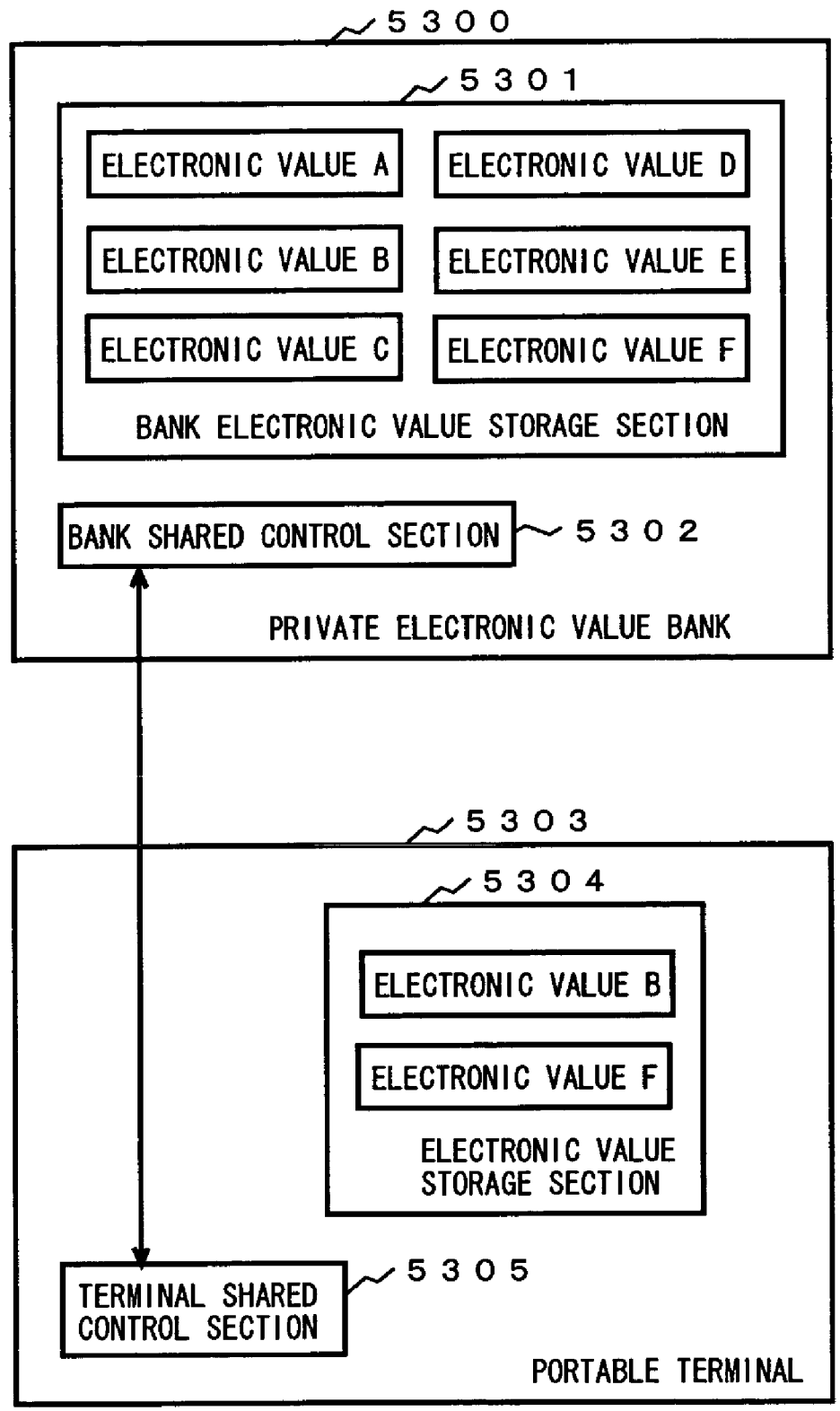
FIG. 53 is a view showing a state where an identifier of the electronic value stored by the private electronic value bank includes an identifier of the electronic value stored by the portable terminal.

In the second embodiment to the tenth embodiment, the electronic value may be designed such that it is identified by an electronic value identifier that uniquely identifies the electronic value. However, a range may be uniquely identified between the bank electronic value storage section of the private electronic value bank and the bank electronic value storage section of the portable terminal corresponding thereto. In such a case where the electronic value can be identified, the identifier of the electronic value should be called an 'electronic value identifier'. In this case, the bank shared control section of the private electronic value bank and the terminal shared control section of the portable terminal may perform control such that the electronic value identifier of the electronic value, which is stored by the bank electronic value storage section of the private electronic value bank, includes the electronic value identifier of the electronic value stored by the electronic value storage section of the portable terminal. FIG. 53 exemplifies this condition, in which the electronic value is uniquely identified by the identifier such as 'electronic value A', and electronic value B and electronic value F, which are the identifiers of the electronic values stored by the bank electronic value storage section 5304 of the portable terminal 5303, are designed to be included in the identifiers of the electronic values stored by the bank electronic value storage section 5301 of the private electronic value bank 5300. By performing as described above, the electronic value stored by the bank electronic value storage section of the portable terminal is necessarily stored by the bank electronic value storage section of the private electronic value bank corresponding thereto, so that even if the situation occurs where the portable terminal cannot be used due to loss of the portable terminal or breaking down of the portable terminal, the bank electronic value storage section of the corresponding private electronic value bank stores the electronic value, and thus there is no possibility to lose the electronic value. As described, in order to make the electronic value identifier of the electronic value, which is stored by the bank electronic value storage section of the private electronic value bank, include the electronic value identifier of the electronic value, which is stored by the electronic value storage section of the portable terminal, it can be realized when the electronic value transferred from the electronic value issuing server is designed to be necessarily transferred to the private electronic value bank.

Figure 18:
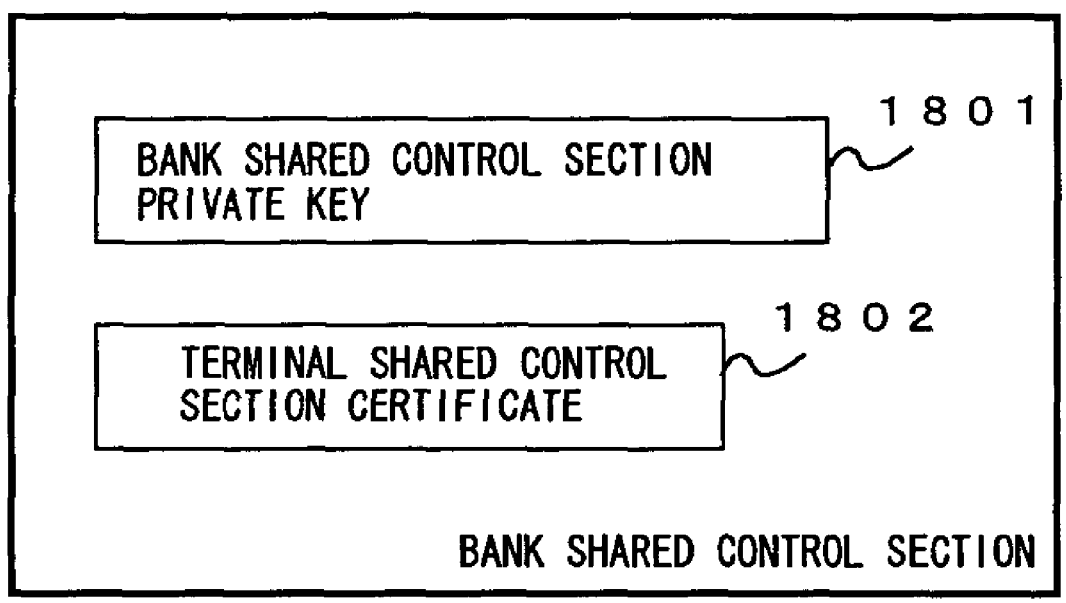
FIG. 18 is a view showing a state where the bank shared control section has a bank shared control section private key and a terminal shared control section certificate.
Figure 19:
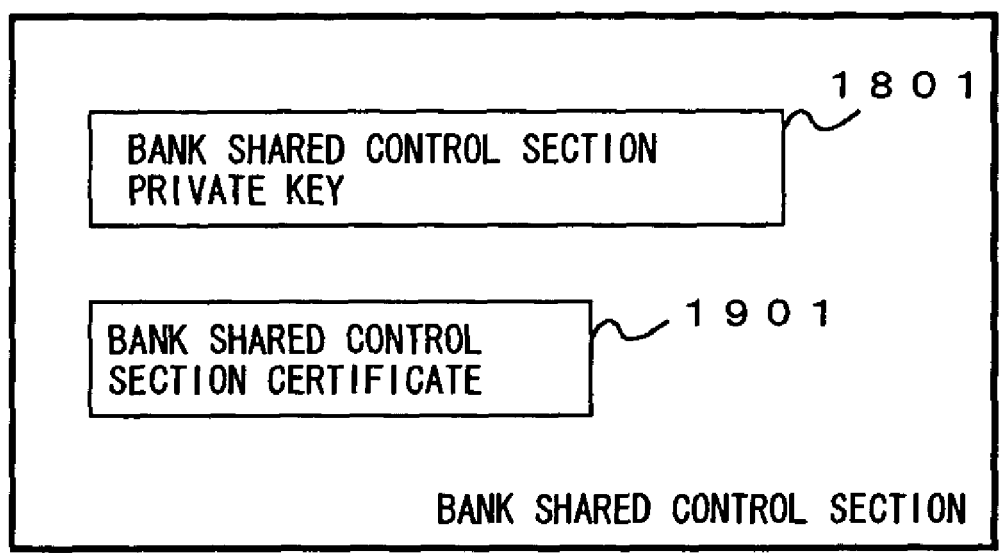
FIG. 19 is a view showing a state where the bank shared control section has the bank shared control section private key and a bank shared control section certificate.

The private electronic value bank and the portable terminal in the second embodiment through the tenth embodiment need to communicate with each other, and the control for sharing the electronic value is performed in this communication. Therefore, it is necessary that the communication be performed safely. Consequently, the bank shared control section may be designed, as shown in FIG. 18, to have a bank shared control section private key 1801 (equivalent to the electronic wallet private key 71 in FIG. 2) and a terminal shared control certificate 1802 (equivalent to the mobile electronic wallet certificate 52 in FIG. 2). The bank shared control section private key 1801 is a private key that the bank shared control section has, which is used in the communication of the public key encryption system, and the terminal shared control certificate 1802 is for authenticating the signature from the portable terminal, in which the third-party as an authenticating person has signed the public key that the terminal shared control section of the portable terminal has. The bank shared control section private key 1801 and the terminal shared control certificate 1802 can realize safely encrypted communication between the private electronic value bank and the portable terminal. Alternatively, as shown in FIG. 19, the bank shared control section may have the bank shared control section private key 1801 and a bank shared control section certificate 1901. The bank shared control section certificate 1901 is for authenticating the signature of the private electronic value bank in another portable terminal, in which the third-party has signed the public key that the bank shared control section of the private electronic value bank has. In the case where the private electronic value bank and the portable terminal communicate with each other, the private electronic value bank sends the bank shared control certificate 1901 to the portable terminal, and thus safe communication is performed.

Figure 20:
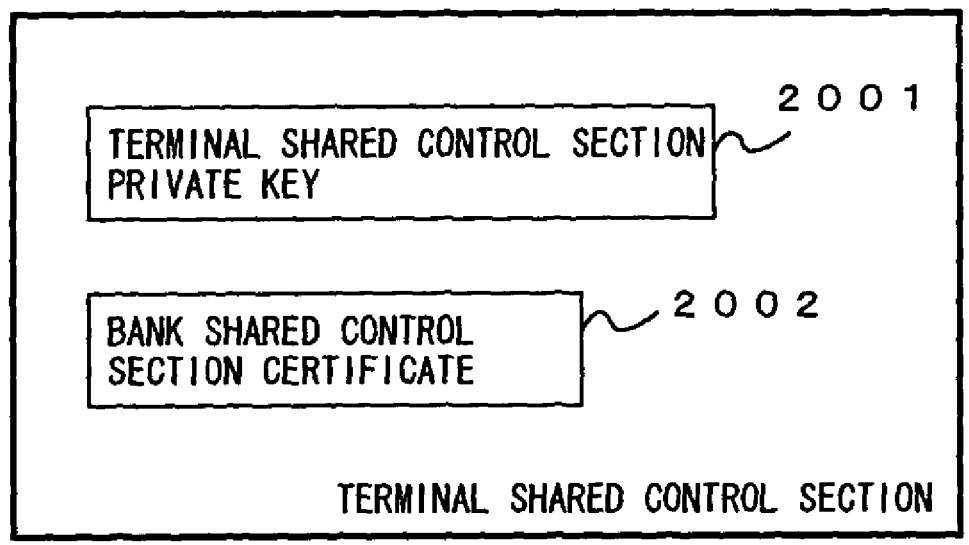
FIG. 20 is a view showing a state where the terminal shared control section has a terminal shared control section private key and the bank shared control section certificate.
Figure 21:
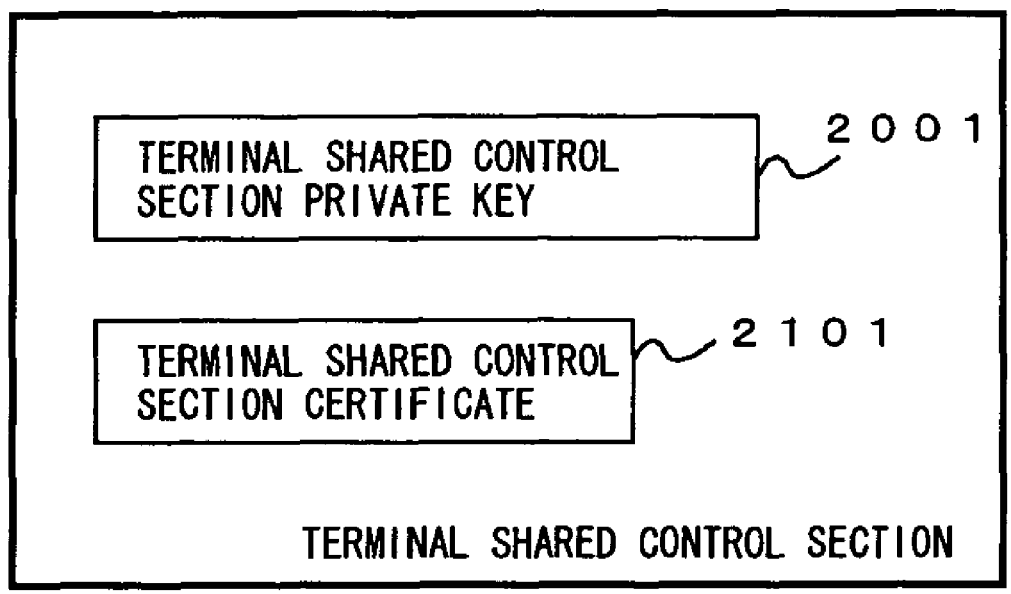
FIG. 21 is a view showing a state where the terminal shared control section has the terminal shared control section private key and the terminal shared control section certificate.

Similarly, as shown in FIGS. 20 and 21, the terminal shared control section may be designed to have a terminal shared control section private key 2001 and a bank shared control section certificate 2002 or a terminal shared control section certificate 2101. The terminal shared control section private key 2001 is used for encryption of the public key encryption system, which is a private key that the terminal shared control section of the portable terminal has. The bank shared control section certificate 2002 is for authenticating the signature from the private electronic value bank, and the terminal shared control section certificate 2101 is for authenticating the signature of the portable terminal in the private electronic value bank.

Note that the private electronic value bank may have a plurality of the bank electronic value storage sections corresponding to a plurality of terminals. In this case, one private electronic value bank may correspond to only one bank shared private key that the bank shared control section has. Further, a plurality of the bank shared private keys may exist corresponding to each of the bank electronic value storage sections that correspond to the portable terminals, and one private electronic value bank may correspond to a plurality of the bank shared private keys, as a result.

Furthermore, as shown in FIG. 11, the electronic value transmission section 1103 of the private electronic value bank 802 in the second embodiment, when transmitting the electronic value to the portable terminal 803, makes the bank shared control section 1104 encrypt the electronic value in order to perform encryption by the bank shared control section private key that the bank shared control section 1104 has, and may be designed to receive the result. This applies to the private electronic value bank in the other embodiments, and a section other than the bank shared control section that performs encrypted communication with the portable terminal may be designed to make the bank shared control section encrypt and decrypt (for example, it may be designed to make the bank shared control section decrypt in the case of receiving the electronic value issue request or the like from the portable terminal as well). Similarly, a section other than the terminal shared control section of the portable terminal that performs encrypted communication in the private electronic value bank may be designed to make the terminal shared control section encrypt and decrypt.

Further, the portable terminal may be designed such that an IC card such as the smart card can be attached thereto, and it may be designed such that a part of the function of the portable terminal is realized by using the IC card such as the smart card. For example, there is a mode that the terminal shared control section private key, that the terminal shared control section has, is stored in the IC card such as the smart card. In this mode, by attaching the IC card such as the smart card, in which the terminal shared control section private key is stored, to the portable terminal, the portable terminal can be made to function as the above-described portable terminal. Furthermore, there also is a second mode that the terminal shared control section private key is stored in the IC card such as the smart card and the electronic value is also stored therein, and thus the IC card such as the smart card realizes the electronic value storage section. Specifically, in the second mode, the IC card such as the smart card stores the terminal shared control section private key and has the electronic value storage section that stores the electronic value. By attaching the IC card such as the smart card to the portable terminal, the portable terminal can be made to function as the above-described portable terminal. In addition, there is a third mode that the terminal shared control section and the electronic value storage section are realized as an application for the IC card such as the smart card. In the third mode shown here as well, the terminal shared control section private key is stored in the IC card such as the smart card. Specifically, the application for the IC card such as the smart card realizes the terminal shared control section and the electronic value storage section, and by attaching such an IC card such as the smart card to the portable terminal, the portable terminal can be made to function as the above-described portable terminal. By issuing such a smart card and an IC card independently of the portable terminal, it is possible to implement the issuance of the smart card and the IC card into business.

According to the present invention described above, the electronic value of the user is controlled by the private electronic value bank, so that when the user uses the electronic value for the service in the real world, he/she uses the electronic value controlled on the second electronic wallet, updates it to associate electronic value on the first and second electronic wallets when the private electronic value bank and the portable terminal communicate later, and thus can use the electronic value for both services on the network and goods and services in the real world while ensuring security, convenience and economical efficiency.

Further, the electronic value controlled by the portable terminal of the user and the electronic value controlled on the private electronic value bank can be matched, and unauthorized use can be prevented as well.

Further, the electronic value can be used for services on the network while ensuring security, convenience and economical efficiency.

Further, the electronic value can be used for goods and services in the real world while ensuring security, convenience and economical efficiency.

Furthermore, since the electronic value issuing server and the private electronic value bank are independent of each other, the invention can be applied to various kinds of business.

In addition, security in issuing the electronic value via the network and control of the electronic value can be improved.

Further, security in issuing the electronic value via the network and its settlement can be improved.

Still further, it is possible to change the content after issuance of the electronic value and to transfer the electronic value.

What is claimed is:

1. An electronic value system, comprising:
a portable terminal;
an electronic value issuing server, which issues an electronic value; and
an electronic wallet section, which stores different types of electronic value,
wherein said portable terminal comprises,
an electronic value issue request transmitting section, which transmits an electronic value issue request to said electronic value issuing server,
a first electronic value receiving section, which receives the electronic value from said electronic wallet section, and
a first electronic value storing section, which stores the different types of electronic value received by said first electronic value receiving section,
said electronic value issuing server comprises,
an electronic value issue request receiving section, which receives an electronic value issue request from said portable terminal, and
an electronic value issuing section, which transmits the electronic value to said electronic wallet section based on the electronic value issue request,
said electronic wallet section comprises,
a second electronic value receiving section, which receives the electronic value transmitted from the electronic value issuing server,
a second electronic value storing section, which stores the electronic value received by said second electronic value receiving section, and
an electronic value transmitting section, which transmits a duplicate of the electronic value stored in said second electronic value storing section to said portable terminal, and
said first electronic value storing section is linked to said electronic wallet section for corresponding one-to-one with said second electronic value storing section,
said electronic value issue request transmitting section includes identification information of said electronic wallet section in the electronic value issue request,
said electronic value issuing section transmits the electronic value to the electronic wallet section specified by said identification information,
said second electronic value storing section stores the electronic value transmitted from said electronic value issuing section and said electronic value transmitting section transmits a duplicate of said electronic value to said portable terminal, and
said first electronic value storing section stores said duplicate of said electronic value transmitted from said electronic wallet section.

2. The electronic value system according to claim 1, wherein
said electronic value issue request transmitting section includes encrypted information for instructing acquisition of electronic value in the electronic value issue request,
said electronic value issuing section transmits said encrypted information for instructing acquisition of electronic value to said electronic wallet section specified by said identification information, and
said second electronic value receiving section decrypts said encrypted information for instructing acquisition of electronic value, and receives the electronic value from said electronic value issuing section based on said information for instructing acquisition of electronic value.

3. The electronic value system according to claim 1 or 2, wherein
said electronic value issue request transmitting section includes encrypted information for instructing settlement of payment for electronic value in the electronic value issue request,
said electronic value issuing section transmits said encrypted information for instructing settlement of payment for electronic value to said electronic wallet section specified by said identification information, and
said second electronic value receiving section decrypts said encrypted information for instructing settlement of payment for electronic value, and processes the settlement of payment for the electronic value with said electronic value issuing server based on said information for instructing settlement of payment for electronic value.

4. The electronic value system according to claim 1, wherein said electronic wallet section further comprises,
an electronic value updating section, which updates the electronic value, and
a managing section for electronic value, which manages the electronic value stored by said first electronic value storing section, and
in cases where said electronic wallet section receives a update request of electronic value from said electronic value issuing server,
said electronic value updating section updates the electronic value stored by said second electronic value storing section, and
said managing section for electronic value further updates the electronic value stored by said first electronic value storing section.

5. The electronic value system according to claim 1, wherein
said electronic wallet section further comprises,
a movement controlling section for electronic value, which controls transfer of the electronic value between the electronic wallet section, and
a second managing section for electronic value, which manages the electronic value stored by said first electronic value storing section, and
in cases where said electronic wallet section receives a transfer request of electronic value stored by said second electronic value storing section from said portable terminal,
said movement controlling section for electronic value moves the electronic value stored by said received electronic value storing section to another electronic wallet section, and
said second managing section for electronic value deletes the electronic value stored by said first electronic value storing section.

6. A portable terminal, comprising:
an electronic value issue request transmitting section, which transmits an electronic value issue request to an electronic value issuing server, which issues an electronic value,
an electronic value receiving section; which receives the electronic value from an electronic wallet section, which stores different types of electronic value, and
an electronic value storing section, which is linked to said electronic wallet section which corresponds one-to-one with the second electronic value storing section on said electronic wallet section, and stores the electronic value received by said electronic value receiving section, wherein
said electronic value issue request transmitting section includes identification information of said electronic wallet section in the electronic value issue request, and
said electronic value receiving section receives the electronic value, which is a duplicate of the electronic value, which is transmitted from said electronic value issuing server based on the electronic value issue request and is stored in the second electronic value storing section from said electronic wallet section and said electronic value storing section stores said received electronic value.

7. The portable terminal according to claim 6, wherein
said electronic value issue request transmitting section includes encrypted information for instructing acquisition of electronic value to said electronic wallet section in the electronic value issue request.

8. The portable terminal according to claim 6 or 7, wherein
said electronic value issue request transmitting section includes encrypted information for instructing settlement of payment for electronic value to said electronic wallet section in the electronic value issue request.

9. A smart card, which is to be attached to a portable terminal, comprising:
an electronic value issue request transmitting section, which transmits an electronic value issue request to an electronic value issuing server via said portable terminal,
an electronic value receiving section, which receives the electronic value from an electronic wallet section storing different types of electronic value online via said portable terminal, and
an electronic value storing section, which is linked to said electronic wallet section which corresponds one-to-one with the second electronic value storing section existing on said electronic wallet section, and stores the electronic value received by said electronic value receiving section, wherein
said electronic value issue request transmitting section includes identification information of said electronic wallet section in the electronic value issue request, and
said electronic value receiving, section receives the electronic value, which is a duplicate of the electronic value, which is transmitted from said electronic value issuing server bases on the electronic value issue request and is stored in the second electronic value storing section, from said electronic wallet section and said electronic value storing section stores said received electronic value.

10. The smart card according to claim 9, wherein
said electronic value issue request transmitting section further includes encrypted information for instructing acquisition of electronic value to said electronic wallet section in the electronic value issue request.

11. The smart card according to claim 9 or 10, wherein
said electronic value issue request transmitting section further includes encrypted information for instructing settlement of payment for electronic value to said electronic wallet section in the electronic value issue request.

* * * * *